US009083581B1

(12) United States Patent
Addepalli et al.

(10) Patent No.: US 9,083,581 B1
(45) Date of Patent: Jul. 14, 2015

(54) SYSTEM AND METHOD FOR PROVIDING RESOURCE SHARING, SYNCHRONIZING, MEDIA COORDINATION, TRANSCODING, AND TRAFFIC MANAGEMENT IN A VEHICULAR ENVIRONMENT

(75) Inventors: Sateesh K. Addepalli, San Jose, CA (US); Ashok K. Moghe, Pleasanton, CA (US); Lillian Lei Dai, Rockville, MD (US); Mohammand H. Falaki, Los Angeles, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 537 days.

(21) Appl. No.: 13/111,425

(22) Filed: May 19, 2011

Related U.S. Application Data

(60) Provisional application No. 61/433,138, filed on Jan. 14, 2011.

(51) Int. Cl.
*H04L 29/00* (2006.01)
*H04L 29/06* (2006.01)

(52) U.S. Cl.
CPC ................................ *H04L 29/06578* (2013.01)

(58) Field of Classification Search
CPC ...................................................... H04L 67/12
USPC ............................................................ 726/3
See application file for complete search history.

(56) References Cited

U.S. PATENT DOCUMENTS

| | | | |
|---|---|---|---|
| 5,428,666 A | 6/1995 | Fyfe et al. |
| 5,604,787 A | 2/1997 | Kotzin et al. |
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |

(Continued)

FOREIGN PATENT DOCUMENTS

| | | | |
|---|---|---|---|
| DE | 10146664 A1 | 2/2003 |
| EP | 1337119 A | 8/2003 |

(Continued)

OTHER PUBLICATIONS

WEP. (2003). In Webster's New World™ Computer Dictionary.*

(Continued)

*Primary Examiner* — William Powers
(74) *Attorney, Agent, or Firm* — Patent Capital Group

(57) ABSTRACT

A method in one embodiment includes maintaining a list of authorized devices; creating an association between a wireless device being operated by an end user and an onboard unit (OBU) element, which is provisioned in a vehicle; establishing a session over a designated port for an application to be executed on the OBU element; and accessing resources associated with the vehicle through the OBU element. In other examples, authentication of the wireless device can occur via a wired equivalent privacy (WEP) WiFi access point provided by the OBU element. Authentication of the wireless device can also occur via a radio-frequency identification (RFID) tag. The resources can include any number of items such as speakers, a display, a microphone, a global positioning system (GPS) receiver, or any other suitable element that may be provisioned in the vehicle.

32 Claims, 23 Drawing Sheets

(56) References Cited

U.S. PATENT DOCUMENTS

| | | |
|---|---|---|
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,516,357 B1 | 2/2003 | Hamann et al. |
| 6,526,272 B1 | 2/2003 | Bansal et al. |
| 6,574,734 B1 | 6/2003 | Colson et al. |
| 6,587,127 B1 | 7/2003 | Leeke et al. |
| 6,604,140 B1 | 8/2003 | Beck et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B1 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummett et al. |
| 7,363,056 B2 | 4/2008 | Faisy |
| 7,389,178 B2 | 6/2008 | Raz et al. |
| 7,412,313 B2 | 8/2008 | Isaac |
| 7,412,380 B1 | 8/2008 | Avendano et al. |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,631,033 B2 | 12/2009 | Zehler |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 | 12/2010 | Johnson |
| 7,904,569 B1 * | 3/2011 | Gelvin et al. ............... 709/229 |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,185,300 B2 | 5/2012 | Miura et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,244,909 B1 | 8/2012 | Hanson et al. |
| 8,249,087 B2 | 8/2012 | Takada et al. |
| 8,255,107 B2 | 8/2012 | Yang et al. |
| 8,294,420 B2 | 10/2012 | Kocher |
| 8,296,373 B2 | 10/2012 | Bosworth et al. |
| 8,335,493 B2 * | 12/2012 | Angelhag ............... 455/414.1 |
| 8,364,959 B2 | 1/2013 | Bhanoo et al. |
| 8,378,623 B2 | 2/2013 | Kusch et al. |
| 8,602,141 B2 | 12/2013 | Yee et al. |
| 8,719,431 B2 | 5/2014 | Reif et al. |
| 8,837,363 B2 | 9/2014 | Jones et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashihara et al. |
| 2002/0174360 A1 | 11/2002 | Ikeda |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0152038 A1 | 8/2003 | Oshima et al. |
| 2003/0191939 A1 | 10/2003 | Tsai et al. |
| 2004/0008677 A1 | 1/2004 | Cen |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0249915 A1 | 12/2004 | Russell |
| 2004/0256451 A1 | 12/2004 | Goman et al. |
| 2005/0009563 A1 | 1/2005 | Stenmark |
| 2005/0018883 A1 | 1/2005 | Scott |
| 2005/0020250 A1 | 1/2005 | Chaddha et al. |
| 2005/0039027 A1 | 2/2005 | Shapiro |
| 2005/0065678 A1 | 3/2005 | Smith et al. |
| 2005/0075137 A1 | 4/2005 | Reemtsma |
| 2005/0101323 A1 | 5/2005 | De Beer |
| 2005/0124288 A1 | 6/2005 | Karmi et al. |
| 2005/0162687 A1 | 7/2005 | Lee |
| 2005/0239504 A1 | 10/2005 | Ishii et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129848 A1 | 6/2006 | Paksoy et al. |
| 2006/0160532 A1 | 7/2006 | Buckley et al. |

(56) References Cited

U.S. PATENT DOCUMENTS

| | | |
|---|---|---|
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0040005 A1 | 2/2008 | Breed |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167724 A1 | 7/2010 | Haran et al. |
| 2010/0183016 A1 | 7/2010 | Bonk et al. |
| 2010/0202346 A1 | 8/2010 | Sitzes et al. |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Gurusamy Sundaram |
| 2011/0149982 A1 | 6/2011 | Hwang et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |
| 2014/0215491 A1 | 7/2014 | Addepalli et al. |
| 2014/0303807 A1 | 10/2014 | Addepalli et al. |

FOREIGN PATENT DOCUMENTS

| | | |
|---|---|---|
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 10/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/117,860, entitled "System and Method for Analyzing Vehicular Behavior in a Network Environment," filed May 27, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

(56) References Cited

OTHER PUBLICATIONS

U.S. Appl. No. 13/118,204, entitled "System and Method for Enabling a Vehicular Access Network in a Vehicular Environment," filed May 27, 2011, Inventors: Sateesh K. Addepalli et al.
U.S. Appl. No. 13/114,659, entitled "System and Method for Transport, Network, Translation, and Adaptive Coding in a Vehicular Network Environment," filed May 24, 2011, Inventors: Sateesh K. Addepalli et al.
EPO May 22, 2012 European Search Report and Written Opinion from EP 12150208.2.
EPO Jan. 21, 2013 EPO Response to Communication regarding Written Opinion from EP 12150208.2.
PCT Apr. 22, 2009 International Search Report for PCT/US08/88320; 3 pages.
PCT Jun. 29, 2010 International Preliminary Report on Patentability and Written Opinion of the International Searching Authority for PCT/US08/88320; 10 pages.
"TCG Mobile Trusted Module Specification." Trusted Computing Group, Specification version 1.0, Revision 6, Jun. 2008, 105 pages; http://www.trustedcomputinggroup.org/files/resource_files/87852F33-1D09-3519-AD0C0F141CC6B10D/Revision_6-tcg-mobile-trusted-module-1_0.pdf.
Alves, T., et al., "TrustZone: Integrated Hardware and Software Security," Information Quarterly, vol. 3, No. 4, 2004, pp. 18-24; http://www.iqmagazineonline.com/magazine/pdf/v_3_4_pdf/Pg18_24_custZone_Secur.pdf.
Arsenault, A., et al., "Securely Available Credentials—Requirements," IETF, Network Working Group, RFC 3157, Baltimore Technologies, Aug. 2001, 20 pages.
Bickhart, Ryan W., et al., "Transparent TCP-to-SCTP Translation Shim Layer," EuroBSDCon 2007, Copenhagen, Denmark; 14 pages.
Bilstrup, "A Survey Regarding Wireless Communication Standards Intended for a High-Speed Vehicle Environment," Technical Report IDE0712, Feb. 2007, 51 pages.
Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.
Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.
Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.
Hsu, WAVE/DSRC Development and Standardization, Industrial Technology Research Institute, 2010, 84 pages.
Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.
Scarfone, Karen et al., "Guide to Instrusion Detection and Prevention Systems (IDPS)," NIST (National Institute of Standards and Technology), Special Publication 800-94, Feb. 2007, 127 pages http://csrc.ncsl.nist.gov/publications/nistpubs/800-94/SP800-94.pdf.
Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.
Weigle, Dr. Michele, "Standards: WAVE/DSCRC/802.11p, CS 795/895 Vehicular Networks," Old Dominion University, Spring 2008, 19 pages.
U.S. Appl. No. 13/943,114, entitled "System and Method for Enabling a Vehicular Access Network in a Vehicular Environment," filed Jul. 16, 2013, Inventors: Sateesh K. Addepalli et al.
Blazevic, Ljubica, et al., "A Location-Based Routing Method for Mobile Ad Hoc Networks," IEEE Transactions on Mobile Computing, vol. 4, No. 2, Mar./Apr. 2005; 14 pages.
Freeman, Shanna, "How OnStar Works," HowStuffWorks.com, a Discovery Company; [Retrieved and printed Jul. 19, 2013] http://auto.howstuffworks.com/onstar2.htm/printable.
EPO Jul. 1, 2013 EPO Communication regarding EP 12150208.2; 5 pages, Nov. 29, 2013.
Wahab, et al.,"Driving Profile Modeling and Recognition Based on Soft Computer Approach," IEEE Transactions on Neural Networks, vol. 20, No. 4, Apr. 2009.
U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.
U.S. Appl. No. 13/071,367,605, entitled "System and Method for Wireless Interface Selection and for Communication and Access Control of Subsystems, Devices, and Data in a Vehicular Environment," filed Mar. 24, 2011, Inventors: Sateesh K. Addepalli et al.
U.S. Appl. No. 13/083,305, entitled "System and Method for Applications Management in a Networked Vehicular Environment," filed Apr. 8, 2011, Inventors: Sateesh K. Addepalli et al.
U.S. Appl. No. 13/087,884, entitled "System and Method for Discovery, Trusted Execution, and Admission Control in a Vehicular Environment," filed Apr. 15, 2011, Inventors: Sateesh K. Addepalli et al.
U.S. Appl. No. 13/104,737, entitled "System and Method for Internal Networking, Data Optimization and Dynamic Frequency Selection in a Vehicular Environment," filed May 10, 2011, Inventors: Sateesh K. Addepalli et al.
U.S. Appl. No. 13/108,631, entitled "System and Method for Real-Time Synthesis and Performance Enhancement of Audio/Video Data, and Noise Cancellation and Gesture Based User Interfaces in a Vehicular Environment," filed May 10, 2011, Inventors: Sateesh K. Addepalli et al.
Autonet Mobile, "Autonet Mobile Features, Technology Specifications," autonetmobile.com, 1 page; [retrieved and printed Apr. 8, 2011] http://www.autonetmobile.com/service/anmdev.html.
Autonet Mobile, "CARFI Features, Technology Specifications," autonetmobile.com, 1 page; [retrieved and printed Apr. 8, 2011] http://autonetmobile.com/service/carfidev.html.
Autonet Mobile, "It's What Your Car has been Waiting for," autonetmobile.com, 2 pages; [retrieved and printed Apr. 8, 2011] http://www.autonetmobile.com/service/.
"Cisco Mobile Network Solutions for Commercial Transit Agencies," Cisco.com, © 2008 Cisco Systems, Inc., 8 pages; http://www.cisco.com/en/US/prod/collateral/routers/ps272/white_paper_c11-4921115.html.
"Cisco Mobile Network Solutions for Public Safety," Cisco.com, 2008 Cisco Systems, Inc., 7 pages; http://www.cisco.com/en/US/prod/collateral/routers/ps272/prod_white_paper0900aecd806220af.html.
Farinacci, D. et al., "LISP Mobile Node," Network Working Group Internet Draft, Feb. 1, 2010, 22 pages; http://tools.ietf.org/id/draft-meyer-lisp-mn-01.txt.
Ibars, Christian et al., "Wireless Services in the Connected Vehicle Era," IEEE Communications Magazine, Dec. 23, 2010, 13 pages.
Robert Bosch GmbH, *Automotive Electrics Automotive Electronics, Systems and Components, New:.Networking Hybrid Drive,* 5$^{th}$ Edition, Nov. 2007, BentleyPublishers.com, 255 pages (two parts submitted: Part 1—121 pages; Part 2—131 pages).
Lillian Lei Dai, "*Proactive Mobile Wireless Networks: an infrastructureless wireless network architecture for delay-sensitive applications*," Massachusetts Institute of Technology, Jun. 2008 (two parts submitted: Part 1—105 pages; Part 2—97 pages).
Zeldovich, Nickalai et al., "Making Information Flow Explicit in HiStar," OSDI '06: 7$^{th}$ USENIX Symposium on Operating Systems Design and Implementation, Nov. 2006, 16 pages.
Zeldovich, Nickolai et al., "Security Distributed Systems with Information Flow Control," NSDI '08: 5$^{th}$ USENIX Symposium on Networked Systems Design and Implementation, Apr. 2008, 16 pages.
Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

(56) References Cited

OTHER PUBLICATIONS

U.S. Appl. No. 14/484,664, entitled "System and Method for Enabling Secure Transactions Using Flexible Identity Management in a Vehicular Environment," filed Sep. 12, 2014, Inventors: Sateesh K. Addepalli et al.

U.S. Appl. No. 14/485,050, entitled "System and Method for Wireless Interface Selection and for Communication and Access Control of Subsystems, Devices, and Data in a Vehicular Environment," filed Sep. 12, 2014, Inventors: Sateesh K. Addepalli et al.

U.S. Appl. No. 14/243,304, entitled "System and Method for Real-Time Synthesis and Performance Enhancement of Audio/Video Data, and Noise Cancellation and Gesture Based User Interfaces in a Vehicular Environment," filed Apr. 2, 2014, Inventors: Sateesh K. Addepalli et al.

U.S. Appl. No. 14/242,122, entitled "System and Method for Internal Networking, Data Optimization and Dynamic Frequency Selection in a Vehicular Environment," filed Apr. 1, 2014, Inventors: Sateesh K. Addepalli et al.

\* cited by examiner

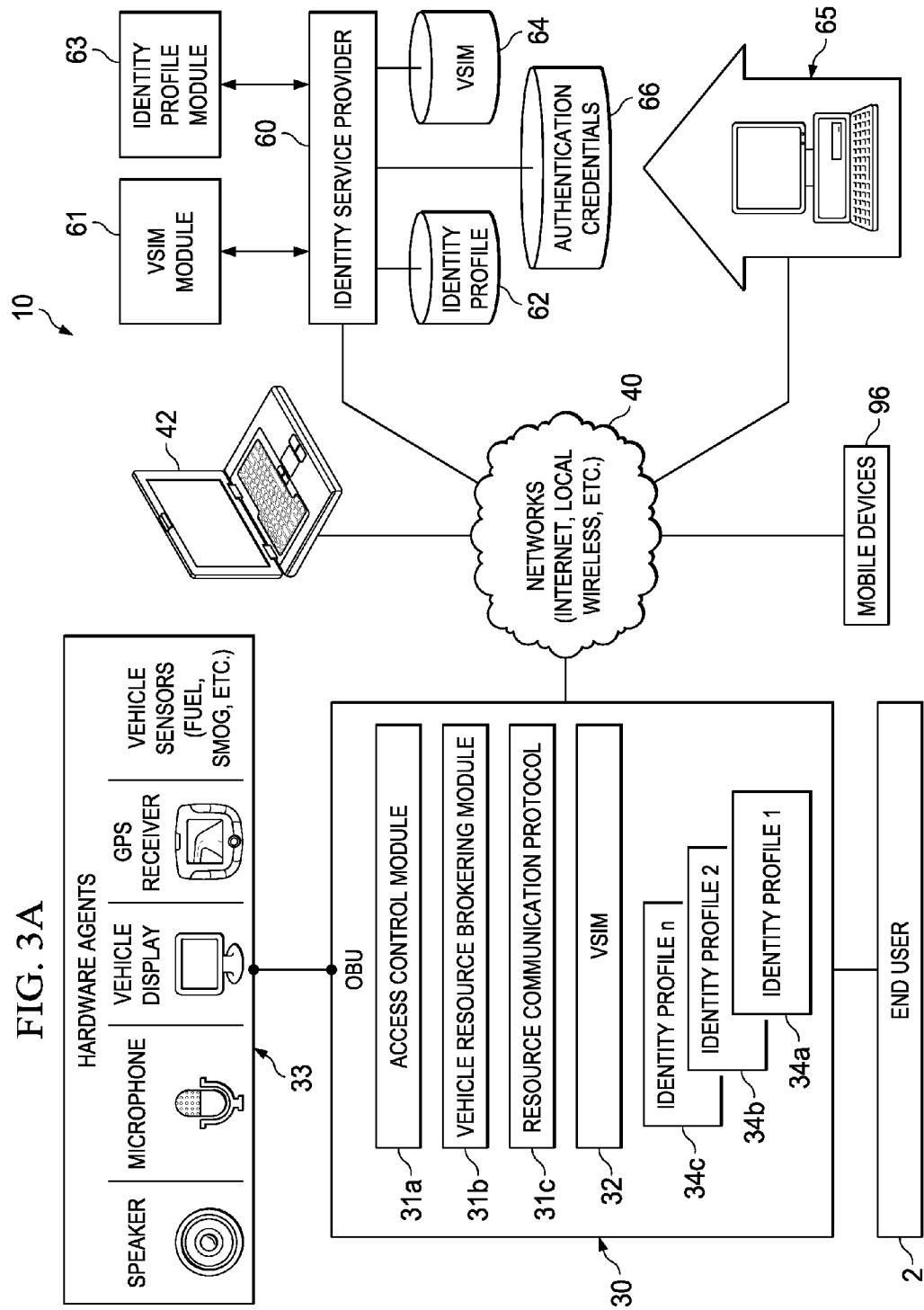

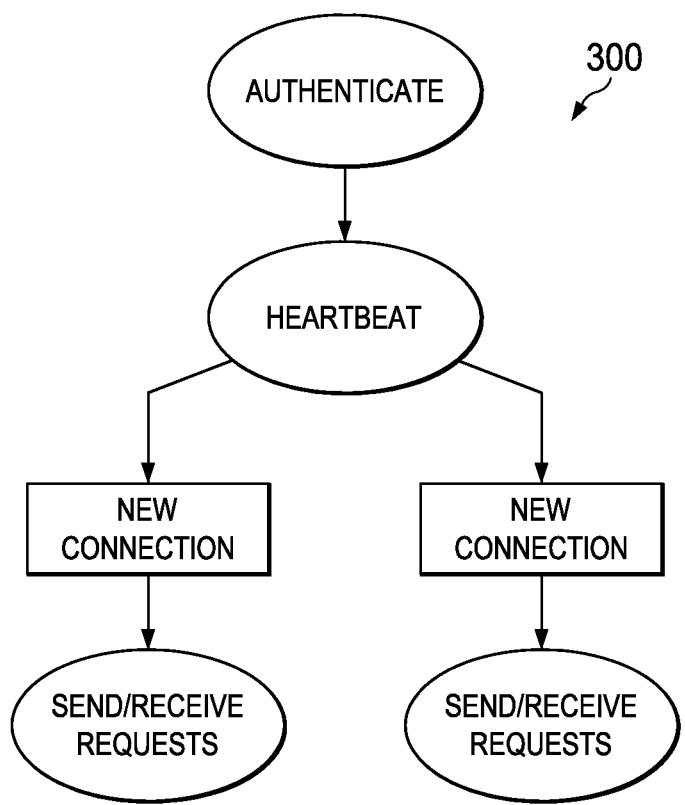

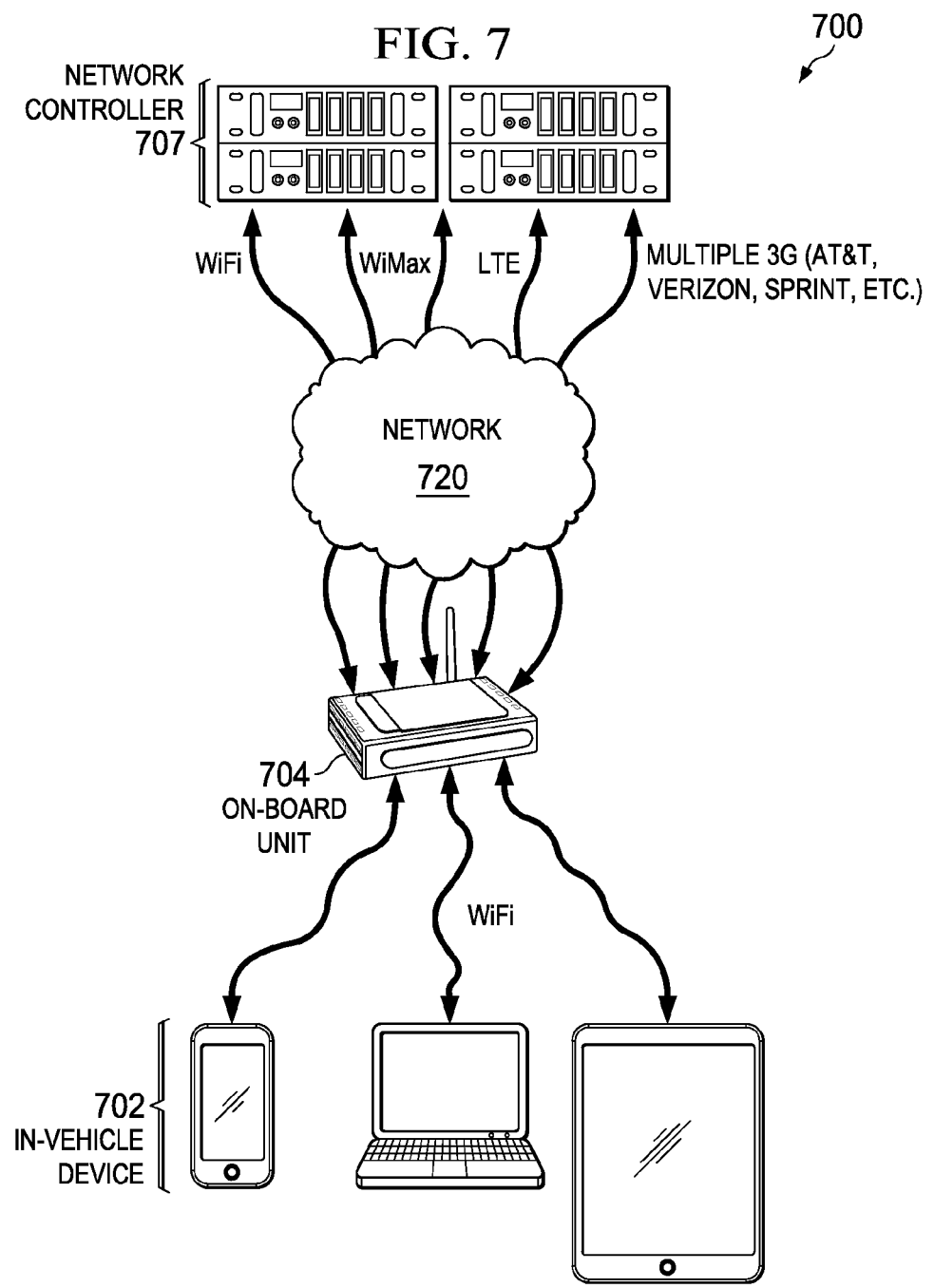

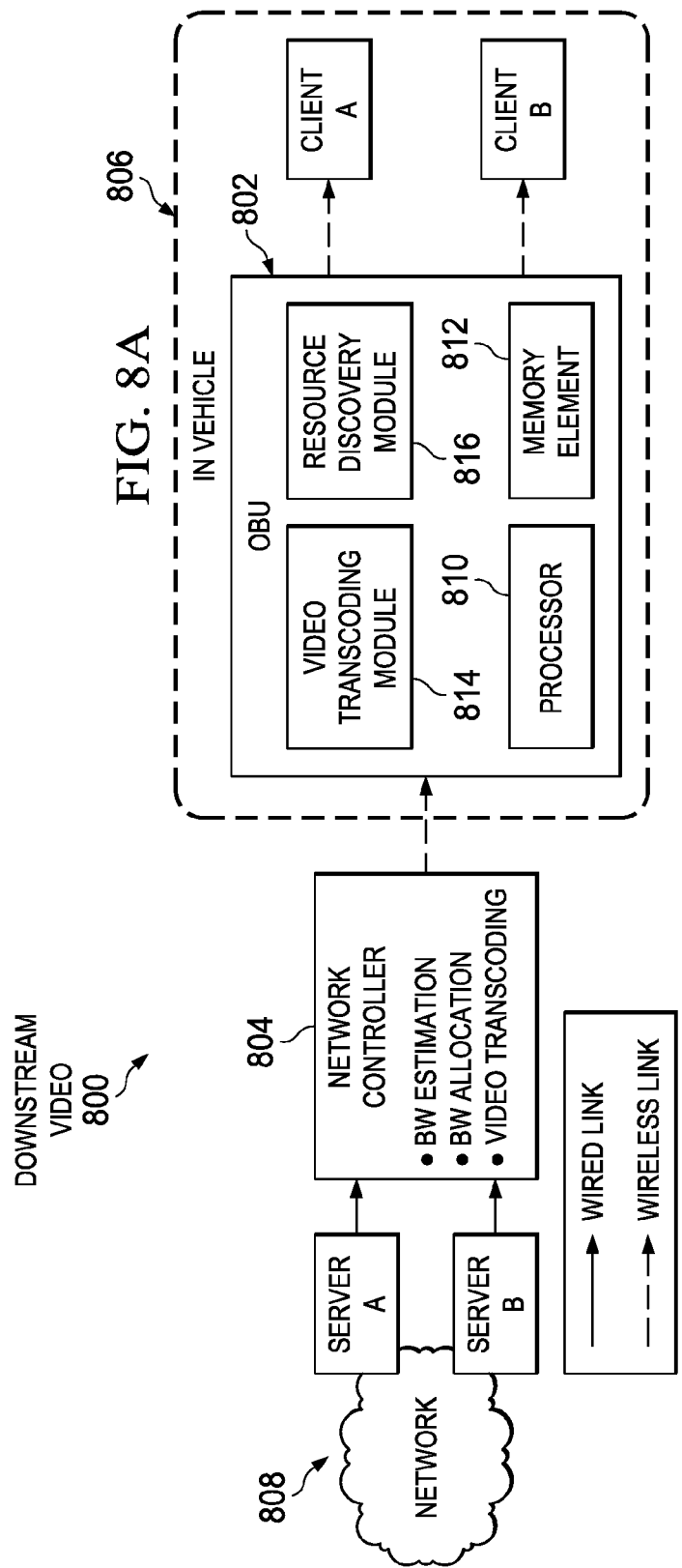

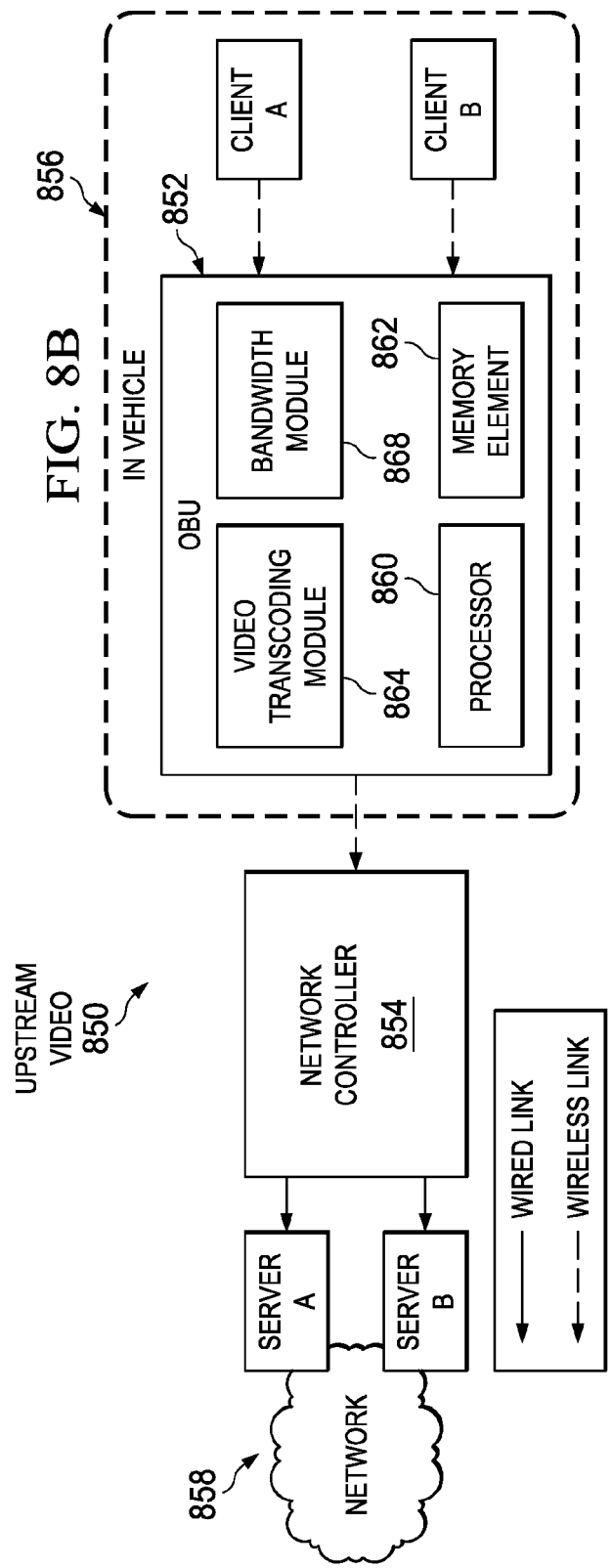

SYSTEM AND METHOD FOR PROVIDING RESOURCE SHARING, SYNCHRONIZING, MEDIA COORDINATION, TRANSCODING, AND TRAFFIC MANAGEMENT IN A VEHICULAR ENVIRONMENT

CROSS-REFERENCE TO RELATED APPLICATION

This application claims the benefit of priority under 35 U.S.C. §119(e) of U.S. Provisional Application Ser. No. 61/433,138, filed Jan. 14, 2011, by Addepalli et al., entitled "SYSTEM, METHOD, AND PROCESSES ASSOCIATED WITH CONNECTED VEHICLES," which is hereby incorporated by reference in its entirety.

TECHNICAL FIELD

This disclosure relates in general to the field of communications and, more particularly, to a system and a method for providing resource sharing, synchronizing, media coordination, transcoding, and traffic management in a vehicular environment.

BACKGROUND

Networking architectures have grown increasingly complex, where innovation that is more recent has focused on designing for particular communication environments. In particular, configuring suitable network architectures for vehicular environments (e.g., automobiles, airplanes, trains, boats, etc.) presents unique difficulties. Vehicles can be mobile across a large geographic area, can have internal networks related to the vehicle itself, can include more than one end user at a time, and can have more than one owner during the life of the vehicle. Providing the ability to conduct transactions in vehicular network environments in a secure manner and providing a flexible identity management framework for various elements conducting the transactions presents significant challenges to system designers, automobile manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is another simplified schematic diagram of the communication system in example network environments associated with embodiments of the present disclosure;

FIG. 3B is a simplified schematic diagram illustrating one example communication protocol associated with the present disclosure;

FIG. 7 is a simplified block diagram illustrating an example system architecture associated with transcoding video;

FIGS. 8A-8B are simplified schematic diagrams illustrating downstream and upstream scenarios associated with example implementations of the present disclosure;

DETAILED DESCRIPTION OF EXAMPLE EMBODIMENTS

Overview

Figure 1:
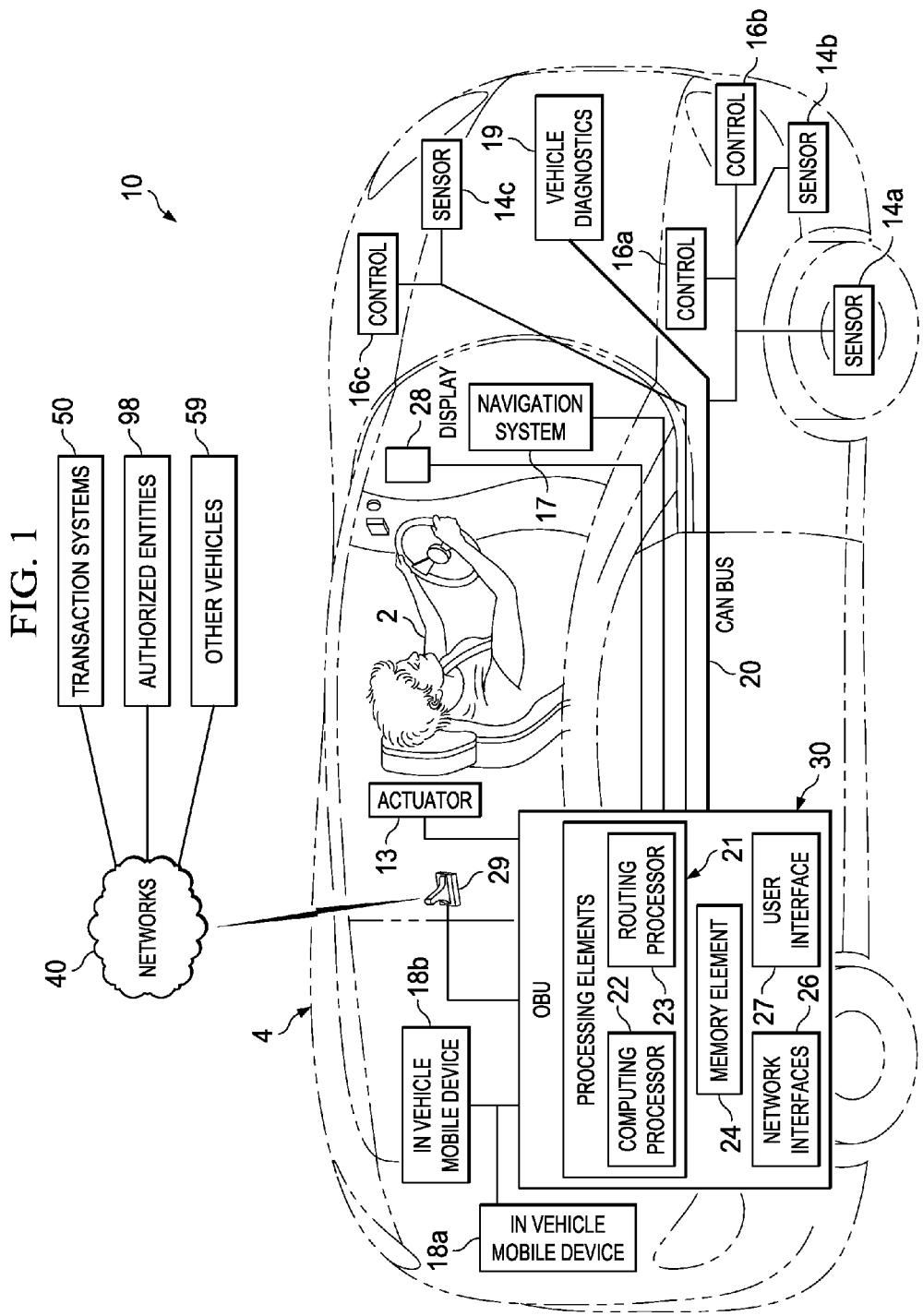
FIG. 1 is a simplified schematic diagram of a communication system for enabling secure transactions using flexible identity management in a vehicular environment in accordance with embodiments of the present disclosure.

A method in one example embodiment includes maintaining a list of authorized devices; creating an association between a wireless device being operated by an end user and an onboard unit (OBU) element, which is provisioned in a vehicle; establishing a session over a designated port for an application to be executed on the OBU element; and accessing resources associated with the vehicle through the OBU element. Authentication of the wireless device can occur via a wired equivalent privacy (WEP) WiFi access point provided by the OBU element. Authentication of the wireless device can also occur via a radio-frequency identification (RFID) tag. The resources can include any number of items such as speakers, a display, a microphone, a global positioning system (GPS) receiver, or any other suitable element that may be provisioned in the vehicle.

After successful authentication of the wireless device, the OBU element can respond to a request by the wireless device for a new data channel with a port number. In particular instances, a command connection is established between the wireless device and the OBU element. The command connection can be used to exchange requests for particular data associated with the resources of vehicle.

In a second aspect of the present disclosure, a method can include establishing a first connection between a first wireless device and a media hub element provisioned in a vehicle; receiving content from the first wireless device; and sharing the content with a second wireless device having a second connection with the media hub element. In more particular embodiments, the method can include receiving additional content generated by the first wireless device while operating in the vehicle, where the additional content is synchronized between the first wireless device and the media hub element.

In yet other instances, the method can include establishing a particular connection between the media hub element of the vehicle and a media hub element provisioned in a residential environment. The particular connection is used to synchronize content between the media hub elements.

Other example embodiments can include synchronizing selected content in the media hub element of the vehicle with a media hub element provisioned in a cloud network. The selected content can be associated with a backup protocol in which the selected content is replicated in the media hub element provisioned in the cloud network. The method can further include downloading particular content at the media hub element of the vehicle; caching the particular content; detecting a deficiency in network connectivity; and streaming the particular content to the wireless device based on the deficiency in network connectivity.

Other example implementations can include storing a portion of content at the media of element; and detecting a deficiency in network connectivity such that the portion of content continues to play uninterrupted on the wireless device. The method can further include receiving a search query at the media hub element; redirecting at least a portion of the search query to a next destination; and streaming particular content to the wireless device. The particular content can match criteria provided in the search query.

In a third aspect of the present disclosure, a method is provided that includes establishing a first connection between an OBU element of a vehicle and a first wireless device. The OBU element can be configured to execute a first application associated with the first wireless device. The method can also include establishing a second connection between the OBU and a second wireless device. The OBU element is configured to execute a second application and a third application associated with the second wireless device. The method may also include executing deep packet inspection as part of a classification protocol for traffic propagating through the OBU element. At least a portion of the traffic can be classified in a strict priority category such that its associated bandwidth characteristic is prioritized. The strict priority category is associated with safety related-messages and voice traffic. Voice traffic can be removed from the strict priority category as a result of deterioration in link capacity.

In particular implementations, the method can include selectively dropping at least some packets in order to comport with a particular queuing characteristic associated with the second wireless device. In other example scenarios, the method can include employing an approximate fair dropping (AFD) protocol in order to ensure that at least some flows are classified into a same queue for sharing a class of bandwidth.

The method can also include selectively altering a receive window in ACK packets in order to affect throughputs for particular flows that propagate through the OBU element. In particular scenarios, a packet identified as being in a high priority queue is provided a certain quality of service metric while remaining queues share a remaining bandwidth according to a preset ratio that factors in at least one network condition.

In a fourth aspect of the present disclosure, a method is provided that includes establishing a session between a wireless device and an OBU element provisioned in a vehicle; matching available bandwidth with requested bandwidth associated with the session, where the matching is provided through a network controller configured to allocate bandwidth among competing video streams; and converting a container format for packets associated with the session. The matching may include matching a container format, a frame rate, and a spatial resolution of an original stream to those associated with the wireless device.

Transcoding activities can be employed in order to requantize a transform parameter in a compressed stream associated with the wireless device. In other instances, transcoding activities are employed in order to decode and re-encode a particular stream associated with the wireless device. An update interval of a bandwidth measurement can be dynamically tuned based on a latency requirement of a particular video application associated with the wireless device.

A particular application having a particular latency requirement can receive a lower update frequency and a larger buffer allocation at the network controller. In other examples, a particular application having a particular latency requirement receives a higher update frequency such that a particular video rate is matched to an instantaneous rate of a particular wireless link. A particular rate can be allocated for a particular video stream bearing a higher spatial resolution.

A particular rate can be allocated in order to minimize a weighted sum of distortion of participating streams associated with the wireless device. A particular rate can be allocated in order to maintain equal quality amongst participating streams associated with the wireless device. Peak-signal-to-noise ratio (PSNR) measurements can be used in order to allocate a portion of bandwidth to the wireless device. User preference settings associated with artifacts in decoded video content can be used in order to allocate a portion of bandwidth to the wireless device.

EXAMPLE EMBODIMENTS

Turning to FIG. 1, FIG. 1 is a simplified block diagram of a communication system 10 for enabling intelligent packet management in a vehicular environment. In regards to the organization of certain sections of this Specification, a first aspect of the present disclosure addresses resource sharing between the vehicle and mobile devices. A second aspect of the present disclosure addresses vehicle/home/cloud dynamic and automatic synchronizing of information, along with management of media content. A third aspect of the present disclosure addresses transcoding video for particular applications. A fourth aspect of the present disclosure addresses quality of service and traffic management for multiple clients and heterogeneous applications in vehicular networks.

The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a plurality of sensors 14a-c, a plurality of controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time, where such devices may be associated with particular end users (passengers or driver) within vehicle 4. OBU 30 may also include capabilities associated with navigation system 17 (e.g., a global positioning system (GPS)). FIG. 1 also includes networks 40, representing various types of connectivity to vehicle 4 (e.g., via antenna 29). Each established network of networks 40 has a logical coupling to remote network nodes or other external electronic devices, which may include transaction systems 50, authorized entities 98, and other vehicles 59.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14a-c, controls 16a-c, actuator 13) in vehicle 4.

Embodiments of communication system 10 can enable secure transactions in a vehicular environment by using flexible identity management for agents associated with the transactions. Given the plethora of transaction agents (e.g., machine devices, humans, software agents, mobile devices, and authorized entities) and possible transactions (e.g., accessing one or more wireless/mobile/cellular networks and using network bandwidth and services, gaining access to various resources of the vehicle based on an identity profile and/or associated databases, gaining access to transaction applications in the vehicle, and engaging in commercial activities), numerous transaction scenarios may occur over the life of the vehicle. Such transaction scenarios may encompass, for example, toll or parking payments, vehicle miles traveled (VMT) systems, Internet commerce, original equipment manufacturer (OEM), gas and electric charging stations, roadside and/or drive-through kiosks, banking applications, vehicle dealer systems, location based service (LBS) system, vehicle system and its resources, mobile network operator system, travel agencies, rental and leasing agencies, network connection to Internet sites, vehicle-to-vehicle commerce, vehicle-to-mobile-device commerce, in-vehicle commerce systems, etc. Accordingly, it is important to have a unified, flexible, and secure identity and access framework to ensure that appropriate transactions can be executed by different agents over time in a secure manner. A unified identity management framework enables aggregation and association of these agents and transactions.

Communication system 10 may include OBU 30 that validates credentials of each agent, grants appropriate levels of access, manages potential conflicts (e.g., by assigning priority to different agents), and provisions the appropriate wireless/mobile connectivity. An agent may be provisioned for authentication and access to a particular vehicle by provisioning at least one virtual subscriber identity module (VSIM) and/or an identity profile in OBU 30 of communication system 10. For each agent, an individualized, multi-factor authorization process may be used to validate the particular agent's credentials for accessing OBU 30 and for authorizing transactions on OBU 30. Authentication and confidentiality schemes may be specified for transaction applications corresponding to the particular transactions. Finally, appropriate wireless/mobile connectivity may be dynamically determined by evaluating the transaction, the agent, and a current geographical location of the vehicle. Thus, vehicular transactions may be securely enabled by managing the identity and authentication of agents associated with transactions.

For purposes of illustrating the operational aspects of communication system 10, it is important to first understand the activities and problems that may be present in electronic communication scenarios in a vehicular environment such as the one shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles. For example, a controller-area network (CAN) bus, a geographical positioning system (GPS), and personal mobile devices (e.g., mobile phones, smart mobile phones/devices, e-book readers, tablets, laptops/net books, portable navigation systems, multimedia devices, etc.) facilitate the coexistence of some of the many possible networks within a single vehicle such as a personal automobile. A CAN bus is a vehicle bus standard designed to allow microcontrollers, sensors, and other devices associated with a vehicle to communicate with each other within the vehicle (e.g., without a host computer). CAN is a message based protocol, designed for and typically used by automotive applications. With appropriate network access, the CAN bus can be used to provide real-time vehicle diagnostics from associated sensors and controls to a manufacturer of the vehicle or to any other authorized entity. A separate network in the vehicle may exist for IP devices involved in the vehicle navigation system (e.g., GPS) and, possibly, another network associated with simple content delivery. Other networks could be used for Internet access for end users through, for example, mobile devices. Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

In a vehicle that does not offer combined networking capabilities for the various possible networks, each of the devices associated with a particular network (e.g., CAN bus sensors, mobile devices, GPS, etc.) may have a one-to-one mapping to either a human agent or to the vehicle. Network access and any resulting fees from such access are typically dictated by the human agent or vehicle mapped to the particular device. While some of these devices may be used by other human agents (e.g., another human agent borrows a cell phone, has account privileges on a laptop, borrows an automobile with a GPS, etc.) network access and fee accrual does not ordinarily accommodate the preferences of the new user. In some cases, a mobile router used to facilitate network access among various agents associated with a vehicle, could provide predetermined network access and billing, without regard to the particular agent or transaction.

In a vehicle that provides networking capabilities between entities inside the vehicle and the external world ("connected vehicle"), the amount of possible transactions and the changeability of agents associated with those transactions require a flexible framework to ensure security and appropriate network access. In a real-life scenario for a connected vehicle, multiple agents may use the vehicle and perform transactions on or via the vehicle over any given time period. Individual users such as, for example, an owner, a driver, a passenger, a temporary driver (e.g., borrower or renter), or a new owner of a used automobile, may use the vehicle as a personal computing and communication platform for navigational, recreational, and/or business-related purposes. A manufacturer of the vehicle may want to collect vehicle centric data from the vehicle and send firmware/software upgrades to the vehicle. Government entities may want to identify and locate the vehicle for law enforcement or government regulation (e.g., emissions controls) purposes. Vehicle dealers may want to obtain sensor data and other vehicle diagnostic information for maintenance updates and/or scheduling. Thus, a one-to-one exclusive mapping between an agent (e.g., a human or a device) and a connected vehicle does not exist.

In a contrasting example, a one-to-one mapping is typically provided between a mobile phone and a single user. In a mobile phone, credentials that bind the user and the device may be stored in a physical subscriber identity module (SIM)

or provisioning module. Thus, if the mobile device is subsequently operated by a new user (e.g., someone borrowing the mobile phone), the credentials in the current SIM, associated with the original user, can be used to access a cellular network and to bill for the network access usage. Thus, the original user mapped to the mobile phone can be billed for any network usage fees incurred by the new user. In some cases involving the same service provider, the mobile phone can be provisioned with the new user's credentials by physically replacing the existing SIM hardware with a SIM of the new user. However, SIM swapping or identity reassignment across different service providers is often problematic or simply not feasible in a mobile phone.

In a connected vehicle, agents may change over any given period of time, and it may be impossible or impractical to physically switch a SIM in the vehicle or to make a trip to a service center each time a new agent needs network access to or from the vehicle. In one example, a manufacturer of an automobile may want to use a transaction application to collect real time data from sensors in the vehicle. If the automobile is manufactured in one country and shipped to another country (e.g., manufactured in Japan and shipped to the United States), then before the automobile is even purchased it would have traveled across international boundaries and multiple telecom service provider areas. Thus, if the manufacturer (i.e., the agent) provisions the automobile with credentials for a first service provider usable in the first country, the manufacturer may prefer a different service provider to be provisioned in the automobile once the automobile is shipped to another country.

Another example of possible agent changes in a vehicle includes owners, drivers, renters, and passengers of a vehicle. When an automobile is sold to a customer, the new owner needs access rights to various transactions (e.g., toll payments, gas and charging stations, Internet commerce, personal vehicle settings, etc.) provided by the vehicle. In addition, the new owner may need wireless access to networks and devices external to the vehicle using an appropriate service provider and a desired billing scheme. These access rights may need to change each time the vehicle is driven by a different driver (e.g., another person in the owner's family, a current renter of a rental car, etc.). In addition, if the vehicle is sold again, a new owner and associated drivers and passengers also need access rights and the previously existing access rights need to be removed from the vehicle. Finally, multiple agents may want to access the vehicle concurrently, such as a driver and one or more passengers of the vehicle who desire access rights to at least some of the vehicle transactions. For example, a passenger may want to use an Internet commerce transaction to download music or videos, or the passenger may want to pay for transportation costs, such as toll expenses and/or gas and charging station expenses.

Supporting a multi-agent and multi-transaction vehicular environment may also require more protection layers than typically used in traditional authentication schemes such as a simple user identification ("user ID") and password. In one example, additional protection layers may be used for certain transactions and agents to avoid compromising security (e.g., highly sensitive transactions such as transactions allowing modifications by a manufacturer of the vehicle itself) and/or regulatory compliance of a transaction. Thus, flexible agent identity management is needed with a strong authentication component that provides adequate security for dynamically changing agents and transactions, such that security, privacy, authenticity, accountability, and regulatory compliance are not compromised.

A system for enabling secure transactions in a vehicular environment using flexible identity management for agents associated with the transactions, outlined by FIG. 1, can resolve many of these issues. In accordance with one example implementation of communication system 10, a method is provided for agent identity management that is flexible, secure, and allows network access to be switched dynamically for different agents. The method provides for authenticating an agent to OBU 30 of vehicle 4, provisioning an identity profile associated with the agent, and provisioning one or more virtual subscriber identity modules (VSIMs) associated with the agent. For a human agent, the identity profile can include individualized vehicle preferences (e.g., seat position, cabin temperature settings, radio or other media, navigation locations, etc.). Boundaries such as parental controls and transaction access controls may also be provided in an identity profile, which can be added by another agent having appropriate authority. The method also provides for verifying whether a particular transaction is authorized when the transaction is associated with the agent. For authorized transactions requiring remote network access to external devices, the method allows for opportunistic selection of network credentials, such as VSIMs, WiFi, etc., associated with the particular agent, which may be determined by evaluating the agent, the transaction, and a current geographical location of the vehicle. Thus, transactions are securely enabled for different agents by providing a dynamic identity framework for agents. In addition, network access can be opportunistically selected depending on one or more factors, including the agent, the transaction, and the current location of the vehicle.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, end user 2 can be associated with a human agent (e.g., a driver or passenger) having any type of relationship to the vehicle such as an owner, a renter, a temporary driver, a family member or friend of the owner, etc. End user 2 may initiate communication in communication system 10 via some network, and such communication may be initiated through any suitable device, inclusive of an in-vehicle mobile device 18a or 18b, display 28, and navigation system 17. In one embodiment, additional displays may be provided for one or more passengers in vehicle 4. In-vehicle mobile devices 18a-b are inclusive of mobile phones, smart mobile phones (smartphones), e-book readers, tablets, iPads, personal digital assistants (PDAs), laptops or electronic notebooks, portable navigation systems, multimedia gadgets (e.g., cameras, players, etc.), and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wired or wireless communication link and may be configured as a personal area network (PAN) or a wireless personal area network (WPAN) or any other appropriate architecture or system that facilitates communications in a network environment. Wired and wireless communication links may be inclusive of any electronic link such as wireless technologies (e.g., Bluetooth, Zigbee, IEEE 802.11x, WiFi Direct, 60 GHz, ultra wideband (UWB), etc.), a USB cable, an HDMI cable, etc. Connection between mobile devices and OBU 30 may be configured based on particular needs and logistics. In one particular example, an external mobile device may be connected to OBU 30 through a USB cable or wireless network when, for example, the external mobile device is a diagnostic tool used by a mechanic for servicing vehicle 4.

Networks 40 represent a series of points or nodes of interconnected communication paths for receiving and transmitting packets of information that propagate through communication system 10. Networks 40 offer communicative interfaces between any of the components of FIG. 1 and remote network nodes and other electronic devices (e.g., transaction systems 50, authorized entities 98, and other vehicles 59), and may be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x), satellite, cellular technologies (e.g., 3G, 4G, WiMAX/LTE, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks described herein. Such network interfaces 26 may be inclusive of multiple wireless interfaces (e.g., WiFi, WiMAX, 3G, 4G, white space, 802.11x, satellite, 60 GHz, Bluetooth, near field communication (NFC), LTE, GSM/WCDMA/HSPA, CDMA1x/EVDO, DSRC, GPS, etc.).

Other interfaces represented by network interfaces 26, may include physical ports (e.g., Ethernet, USB, HDMI, etc.), and the like. Similarly, each of the network elements and user equipment (e.g., mobile devices) of communication system 10 can also include suitable interfaces for receiving, transmitting, and/or otherwise communicating data or information in a network environment.

OBU 30 can include one or more memory elements (e.g., memory element 24) for storing information to be used in achieving operations associated with the enablement of secure transactions using flexible identity management, as outlined herein. Any of the memory or storage items discussed herein should be construed as being encompassed within the broad term 'memory element' as used herein in this Specification.

In example embodiments, the operations for enabling the four aspects outlined herein may be implemented (e.g., by OBU 30) by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 may include processing elements 21, including computing processor 22 and routing processor 23, that can execute software or algorithms to perform the activities to enable the four aspects (identified above). A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of OBU 30, any suitable permutation may be applied based on particular needs and requirements, including the design of the particular vehicle in which OBU 30 is implemented. OBU 30 could be a computing device, a simple processor, a microprocessor, a digital signal processor (DSP), a router, a proprietary device, an internal server, a switch, a gateway, or any other suitable element configured to exchange and/or manage data in a vehicular environment. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, etc.). OBU 30 may be implemented to provide one or more suitable communication interfaces (e.g., network interfaces 26) to legacy systems in vehicles such as, for example, a controller area network (CAN) a low speed network (LIN), a flexray communications protocol network, media oriented systems transport (MOST), and the like. Typically, multiple ECUs, with different embedded software, may be found in a single automobile and may communicate via a CAN bus. Sensors 14a-b may represent, for example, wheel and headlight sensors, respectively. Controls 16a-b may be inclusive of any embedded system or ECU that controls one or more of the electrical systems or subsystems in vehicle 4. Actuator 13 represents a vehicle-setting device such as, for example, a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communications in a LIN bus, in one embodiment. Sensor 14c represents a type of sensor or device that may be configured for communications via flexray communications protocol (e.g., a radar collision sensor). Control 16c, representing one or more ECUs, may be suitably integrated for controlling the flexray network and sensors and other associated components. Additionally, OBU 30 may be implemented to provide one or more suitable communication interfaces (e.g., network interfaces 26) to an Internet Protocol (IP) network, user datagram protocol (UDP) network, or any other suitable protocol or communication architecture provided to enable network communication with machine devices in vehicle 4.

In this particular example, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, entertainment systems (e.g., speakers, radio, DVD, CD, etc.), and the like.

Figure 2:
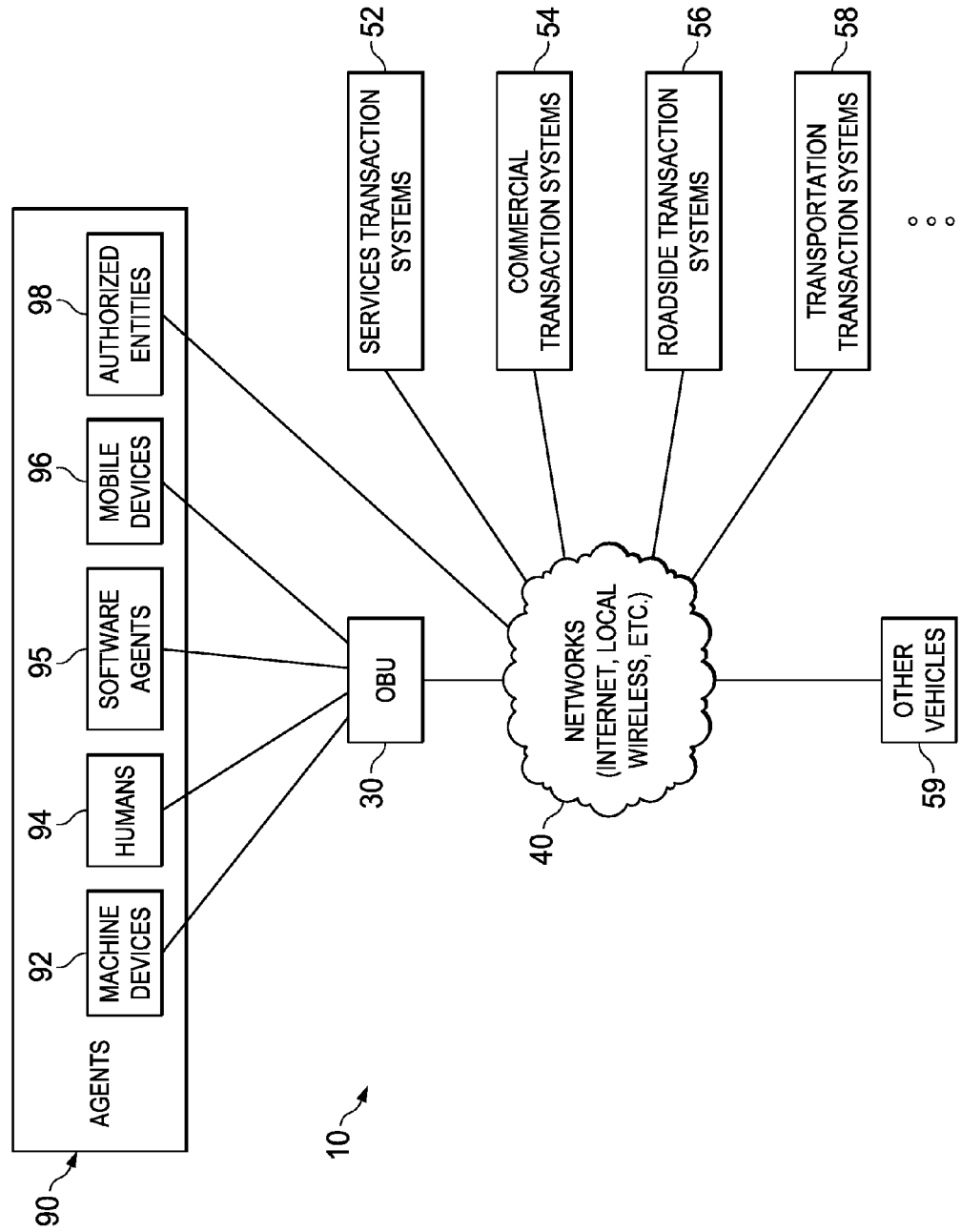
FIG. 2 is a simplified schematic diagram of the communication system in example network environments associated with embodiments the present disclosure.

Turning to FIG. 2, communication system 10 is illustrated with OBU 30 shown coupled to agents 90 and networks 40. As previously discussed herein, agents 90 can include machine devices 92, humans 94, and mobile devices 96. In addition, agents can also include software agents 95 and authorized entities 98. Software agents 95 can include any executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A network node of such authorized entities will typically be remotely located from OBU 30 and, therefore, accessible from OBU 30 through networks 40 such as the Internet or other WANs and any available communication link (e.g., 3G, 4G, LTE, local wireless, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of directly accessing the manufacturer's network through a LAN or WLAN. Similarly, when a vehicle 4 is taken to a dealer for maintenance, the OBU 30 may connect to the dealer network through a communication link that does not include the Internet or any other wide area network.

Networks 40 may also facilitate communication between certain agents 90 (e.g., machine devices 92, humans 94, software agents 95, mobile devices 96) and transaction systems 50. By way of example, transaction systems 50 may include services transaction systems 52, commercial transaction systems 54, roadside transaction systems 56, and transportation transaction systems 58 on network nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc. In some implementations, however, a vehicle rental and leasing entity may be provisioned as an agent of the OBU, such as when the vehicle itself is owned by the rental and leasing entity. In this particular scenario, the rental and leasing agency could be an authorized entity of vehicle 4, and any authorized employees could be human agents of the vehicle. Commercial transaction systems 54 may include entities facilitating commercial transactions through the Internet (e.g., video and music download sites, online retailers, etc.), etc. Roadside transaction systems 56 may include various entities providing roadside services such as gas and electric charging stations, kiosks (both roadside and drive-through), etc. Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. The transaction systems 52, 54, 56, and 58, as categorized, are provided for purposes of illustration and ease of understanding, and it can be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU or similar device). The communicative pathway between vehicle 4 and other vehicles 59 could be established as a single hop or multi-hop vehicle-to-vehicle network through DSRC, WiFi, WiMAX, or any other suitable wireless technologies allowing a sustained connection between vehicle 4 and other vehicles 59. Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained.

Turning to activities associated with resource sharing between a vehicle and mobile devices, FIG. 3A is a simplified block diagram that includes an example instance of communication system 10. This particular implementation illustrates a more detailed representation of certain elements of OBU 30, and of networks 40 providing a communication pathway to a particular service transaction system 52 (i.e., an identity service provider 60). In addition, end user computer 42 and mobile devices 96 are also shown with network access to identity service provider 60.

In accordance with a certain embodiment of the present disclosure, an access control module 31a, a vehicle resource brokering module 31b, and a resource communication protocol 31c may be provisioned in OBU 30. In addition, a number of hardware agents 33 are illustrated in FIG. 3A. These may include a speaker, microphone, a vehicle display, a GPS receiver, vehicle sensors, or any other suitable hardware agents that may be applicable to certain end users. Additionally, FIG. 3A illustrates a home 65 in which a computer can be synchronized (or have its media coordinated) in accordance with the teachings of the present disclosure, as further discussed below.

In an example implementation, OBU 30 can be connected to available hardware (sensors, GPS, etc.) and user interfaces (display, speaker, microphone) in the vehicle. Mobile devices in the vehicle can communicate with OBU 30 via wireless links (e.g., WiFi, WiFi Direct, Bluetooth, wireless-HDMI), via a docking station, etc. In operation, a mobile device such as smartphone, tablet, etc. can have access to valuable information about its respective user. Information such as contacts, text messages, emails, locations of interest, frequently visited Internet pages, etc. are available to the mobile device. The computing platform of the vehicle (e.g., OBU 30) can benefit from the information and the resources of mobile devices.

Similarly, a mobile device can benefit from the computing, communication, and sensory resources of the vehicle. The computing platform of the vehicle can have access to a host of information about the vehicle such as fuel level, location, speed, temperature, etc. Further, the platform may be connected to networks with significantly higher bandwidth, in comparison to the mobile device. In addition, the processing unit of the vehicle is not limited in computing power in contrast to the battery limitations of the mobile devices. The vehicle has other resources, where applications on the mobile device can use the speaker, onboard display, microphone, etc.

Note that different combinations of resources available on the mobile device and the vehicle can be used to offer new services to the user of the two devices. The exact usage of each resource can depend on the logic of the application. The present architecture can be configured to provide a systematic way to programmatically invoke resources of either the mobile device or the vehicle from an application running on the other device.

Consider an example use case in which a smartphone user is talking on her phone. As she enters her vehicle, she would like to continue her conversation using the vehicle speaker and microphone. Separately, she would also like to take advantage of the higher bandwidth interfaces available on the OBU, and subsequently migrate navigation directions on the phone to the vehicle display. Upon successful association and authentication, the smartphone can turn off its cellular interface and begin using the OBU as the default gateway to the Internet. It can also launch a special user interface that is suitable for the vehicle (i.e., switches to "vehicle mode"). When the vehicle mode is enabled during an ongoing voice call, if a headset is not engaged (e.g., plugged-in), the call can be played on the vehicle speakers and the vehicle microphone can be used to receive voice.

In the vehicle mode, the phone can listen for voice commands to invoke different functionalities. An example command could include launching the navigation application. When the navigation application is launched, the phone can receive location information from the vehicle platform over the WiFi connection. This can offer more accurate GPS readings (the GPS receiver of mobile devices is designed to be low power and, therefore, is not as accurate as the vehicle GPS receive can be). Upon leaving the vehicle, the phone can detect that the OBU is no longer available. At that point, calls and applications can be migrated back to the smartphone.

Similarly, the vehicle can take advantage of the resources and information on the mobile device. For example, the navigation system of the vehicle can load the mailing addresses of the contact directory of the user on her mobile device. This way the user can ask for directions to "John's home address" instead of having to input the address. As another example, a user can run an application available on a smartphone or tablet from the vehicle OBU user interfaces without having to download the application to the OBU. The application can take advantage of the more powerful user interfaces in the vehicle. When multiple mobile devices are present in the vehicle, the OBU can access different applications on the different devices.

Vehicular communications can occur over wireless pathways (e.g., WiFi AP, Bluetooth, wireless high-definition multimedia interface (WHDMI), or onboard dock1 sharing resources of the vehicle with a mobile device through the OBU. In operation, OBU 30 can perform access control, vehicle resource brokering, and execute the resource communication protocol. For the access control, either the OBU keeps a list of authorized users/devices, or password protects the system to prevent unauthorized access to its resources. As an example, the OBU may provide a WEP-enabled WiFi access point (or any other local network access technology could be used such as Bluetooth, WHDMI, etc.). When the driver enters her vehicle, her mobile device detects the designated WiFi SSID (or local access network identifier) and associates to it. Upon successful association, the mobile device establishes a connection over a designated port to the software service running on the OBU. Using this connection, the mobile device authenticates with the OBU. This ensures that only authorized mobile devices can take advantage of the vehicle resources.

The mobile device may have similar access control measures to prevent unauthorized access to its resources. The authentication process can be further facilitated through RFID tags. Future mobile devices can include RFID tags as a way of automatic identification. The OBU can be connected to an RFID reader and use it to detect the presence of the mobile device (and readily authenticate with it).

In regards to resource brokering, some of the vehicle resources (e.g., speakers and displays) have limitations as to the number of applications that can simultaneously utilize the resource. However, multiple users and multiple mobile devices can connect to the OBU at the same time. To resolve conflicts and broker such resources, the resource can be allocated to the mobile device and/or application in order of priority. Any suitable methodology can be used to address this priority metric.

In regards to the resource communication protocol, to enable efficient communication with several mobile device platforms (such as iPhone OS, Android, Symbian, Windows Mobile, etc.) a protocol should be capable of being implemented on all platforms. The exclusive local access connection inside the vehicle, and the possibility of spawning new connections for requests and commands, engenders a synchronous API to be implemented on the mobile device. Therefore, applications on the mobile device can be agnostic as to whether their requested resource is coming from the mobile device, or the OBU. Note that one example resource communication protocol flow is discussed below with reference to FIG. 3B.

Turning to potential identity management protocols, one or more virtual subscriber identity modules 32 (referred to collectively herein as VSIMs 32) may be provisioned in OBU 30 for each agent authenticated to the OBU and having a subscription with a mobile network operator providing cellular services (e.g., AT&T, Verizon, T-Mobile, Sprint, PCS, etc.). VSIMs 32 each include a unique identifier or key that identifies an agent on mobile telephony devices such as OBU 30. VSIMs 32 may also contain security authentication to authenticate the agent to the corresponding mobile network operator. In addition, one or more VSIMs 32 may be provisioned in OBU 30 for each agent of OBU 30, and multiple VSIMs for one or more agents can be stored in OBU 30 concurrently. Multiple VSIMs 32 provisioned in OBU 30 can enable flexible and opportunistic use of available mobile network operators to provide one or more network access links from OBU 30 to a remote node, and can also enable these network access links (i.e., communication pathways) on behalf of multiple agents using OBU 30 as a communication source.

In one embodiment, OBU 30 is equipped with a Universal Integrated Circuit Card (UICC) that allows for multiple universal subscriber identity module (USIM) applications to accommodate VSIMs 32. In this embodiment, one or more of VSIMs 32 having a desired mobile network operator may be opportunistically selected, if certain criteria are met, so that the desired one or more mobile network operators can be utilized for network access from OBU 30. In another implementation, multiple SIM cards may be connected to OBU 30 to accommodate a corresponding number of VSIMs. In this implementation involving multiple SIM cards, a software module could be configured to opportunistically select an appropriate one or more SIM cards corresponding to a desired one or more mobile network operators if certain criteria are met. In yet another implementation, VSIMs could be simply soft SIM information stored in a storage repository of OBU 30 such as part of an identity profile of a corresponding agent. Once downloaded, VSIMs 32 can reside in OBU 30 in accordance with whatever particular implementation is employed, until an expiration of the VSIM or until the VSIM is replaced, updated, or removed by an agent with appropriate authentication and authorization.

OBU 30 may also be provisioned with one or more identity profiles 34a, 34b, and 34c (referred to collectively herein as identity profiles 34), with each identity profile 34 corresponding to an agent that can authenticate to OBU 30. Identity profiles 34, as further detailed below, can include credentials and profile information for a particular agent. Credentials contain information that uniquely identifies an agent (e.g., a personal identifier (PID)) and that may be used for authentication purposes. Examples of credentials may include one or more of name, address, phone number, driver's license number, social security number, business license number, IP address, user ID/password, biometrics, personal device identifier (e.g., authentication information corresponding to key fob, access card, credit card, mobile phone, etc.), security keys, and certificates (e.g., public key infrastructure (PKI) certificate, trusted third party (TTP) certificate, etc.).

Profile information aggregates agent attributes, account information, preferences, and/or settings, which can enable appropriate transactions by authenticated agents. For example, profile information can include vehicle settings, dashboard preferences, wireless interface preferences (e.g., VSIM information, WiFi account information, etc.), web account information (e.g., multimedia, social networking, etc.), mobile device list (e.g., smartphones, mobile phones, tablets, laptops, etc.) including network configurations for mobile devices, network service provider membership account information, insurance information, credit card/payment account information, manufacturer web account information, network interface account information, GPS favorite locations, and phone contact list.

The information included in a particular identity profile can be at least partially dependent upon the particular agent to which it corresponds. For example, an authorized entity (e.g., a manufacturer of the vehicle, etc.) would not need vehicle settings, GPS favorite locations, or multimedia information in its identity profile. In addition to agents, a profile identity may be provisioned for a vehicle itself including information to distinctly identity the vehicle (e.g., a vehicle identification number (VIN)). It will be apparent that the examples provided herein of credentials and profile information are not all-inclusive, and any other suitable information or data could be included as credentials or profile information.

Various implementations can accommodate identity profiles 34 in OBU 30. For example, in one embodiment identity profiles 34 are stored in dedicated hardware (e.g., physical SIM card, memory card, etc.). Software can be configured to virtually switch between different hardware or the hardware itself may be programmable to store different agent identity information over time. In another embodiment, identity profiles 34 are stored in a programmable storage module or virtual identity module that can store one or more identity profiles 34. Generally, identity profiles 34 may be kept in any suitable memory element, software, hardware, or in any other suitable component, device, element, or object where appropriate and based on particular needs. In addition, identity profiles 34 may be provided in any database, register, cache, queue, control list, or storage structure.

In example embodiments of the present disclosure, VSIMs 32 and identity profiles 34 may be provisioned and managed through one or more identity service providers, represented by identity service provider 60 in FIG. 3A. In one embodiment, identity service provider 60 could be a third party provider (e.g., in the cloud) and could offer identity services to mobile network operators. In other embodiments, identity service provider 60 could be a mobile network operator, a vehicle manufacturer, a vehicle rental and leasing agency, a vehicle dealer, a government agency, or any other entity having an interest in managing identities associated with a vehicle over the life of the vehicle. Moreover, identity profiles 34 and/or VSIMs 32 can be managed through the same or different identity service providers. By storing a VSIM and/or an identity profile in a remote cloud, the VSIM and identity profile can be associated with an agent rather than to a particular vehicle. Consequently, a human agent (e.g., driver, passenger, owner, renter, etc.) can retrieve his VSIM and identity profile in any vehicle. Depending on the make/model of the vehicle, the human agent can leverage relevant parts of the identity profile for available features in virtually any vehicle.

Provisioning and managing an identity profile or VSIM through identity service provider 60 can be accomplished in various ways. In one scenario, a user could access identity service provider 60 through the Internet or other available network from computer 42 (e.g., home computer, publicly accessible computer, business computer, etc.) or mobile devices 96. Additionally, end user 2 could access identity service provider 60 by bootstrapping a communication link through OBU 30 (e.g., accessing a home WLAN through WiFi, using a preprogrammed VSIM in OBU 30, using another agent's VSIM already provisioned in OBU 30, etc.) In other scenarios, the identity service provider 60 may be accessed through a local network (e.g., manufacturer who is an identity service provider locally accessing provisioning modules of OBU 30 prior to shipping the vehicle, etc.) or other wireless networks (e.g., user accessing mobile network operator through a cellular network if the mobile network operator is its own identity service provider, etc.).

Identity service provider 60 may provide modules allowing the creation of an account with authentication credentials 66 (which may be saved for future access of the account) for an agent. A VSIM module 61 may be provided by identity service provider 60 to allow a user to provision a VSIM for an agent, with the VSIM being associated with a desired mobile network operator and stored, for example, in VSIM database 64. An identity profile module 63 may also be provided by identity service provider 60 to allow the user to provision an identity profile for the agent and to store the identity profile in, for example, identity profile database 62. In some scenarios, a user is the agent and provisions a VSIM and/or an identity profile for himself. In other scenarios, the user may provision a VSIM and/or an identity profile for another agent (e.g., a vehicle dealer provisioning a VSIM and/or an identity profile for a new vehicle owner, a vehicle rental agency provisioning a VSIM and/or an identity profile for an agent renting a vehicle, a user at an OEM provisioning a VSIM and identity profile for a software agent configured in the OBU to make network connections to the OEM from the OBU, etc.).

VSIM 32 and identity profile 34 may be dynamically added, removed, and updated via local or remote network access. After provisioning a VSIM and/or identity profile with identity service provider 60, the VSIM and/or identity profile may be downloaded using control channels or otherwise provided to OBU 30 if the agent associated with the VSIM and/or identity profile has been authenticated to OBU 30. In one example, to download VSIMs 32 and/or identity profiles 34, the agent (e.g., end user 2) may bootstrap a communication link in OBU 30 (e.g., WiFi, an available VSIM, etc.) to access identity service provider 60 using control channels through the Internet or other network. In another example, end user 2 may access a local network of an identity service provider if a vehicle is in close physical proximity to identity service provider 60. Once identity service provider 60 is accessed, the user can authenticate to identity service provider 60 via authentication credentials 66, access the desired account, and download one or more associated VSIMs 32 and/or identity profiles 34. Similarly, if a new VSIM for the same agent is provisioned or the identity profile is updated in identity service provider 60, then the associated agent can use an available VSIM or other available communication link in OBU 30 to access identity service provider 60 to download the new VSIM and/or updated identity profile. In another scenario, the VSIM and/or identity profile may be stored on a transportable memory element (e.g., USB stick, CD, etc.), which may be provided locally to OBU 30 by a user, such as end user 2. The VSIM and/or identity profile can then be downloaded to OBU 30 from the transportable memory element.

In other example scenarios, an identity profile may be dynamically created and managed (e.g., removed or updated) locally, directly through OBU 30. For example, OBU 30 may provide an identity profile creation tool through display 28 for a user to enter desired credentials and profile information and associate such information with an agent. In another embodiment, the identity profile creation tool may be accessible through a user's mobile device. In these scenarios, the identity profile would not be accessible through identity service provider 60 and could only be accessed in the particular vehicle containing the identity profile.

Turning to FIG. 3B, FIG. 3B is a simplified state diagram 300 illustrating one possible implementation of the aforementioned resource communication protocol. Semantically, after authentication, the mobile device requests a new data channel. The vehicle responds with a port number and waits for a new connection request on that port. The original connection (e.g., referred to as a control connection), remains open, and heartbeats can be sent by the mobile device to the vehicle at regular intervals. The control connection can also be used by both the mobile device and the vehicle computer to negotiate new connections (e.g., referred to as command connection), which can be as many as needed.

On each command channel, both the mobile device and the vehicle computer can send requests to the other end (and also respond to requests). The requests in either direction can follow the same syntax, where each request can be either a GET or a SET. For the GET requests, a GET command requests the value of any sensor on the other end. For example, "GET FUEL LEVEL" from the mobile device to the vehicle is a request to get the fuel level. Similarly, "GET BATTERY TEMPERATURE" is a request from the vehicle to the mobile device. If the "GET" keyword is followed by the keyword "STREAM", the requester is demanding a constant stream of the requested information. In this case, the other end would respond with a port number, and start sending UDP packets with the requested value every specified interval. Furthermore, the vehicle can send UDP packets with GPS information every 30 seconds on port number 8686. For example:

Smartphone: GET STREAM 30 GPS
Vehicle: PORT 8686

For the SET requests, such requests can be used to change parameters on the other end. For example, "SET SPEAKER VOLUME 50%" as a request from the mobile device to the vehicle commands the vehicle to set speaker volume to 50%. The set command, along with the defined protocol, allows the system to arrange for resources on both the mobile device and the vehicle. For example, the vehicle can set up network address translation (NAT) on the mobile device and, thus, use its network connection to the Internet. SET requests correspond to permission levels, where in order to be able to send a SET request, a mobile device should demonstrate its privilege during the authentication phase. Any SET request can be reversed with a matching UNSET command.

In terms of a resource-sharing example, using the proposed simple GET/SET language, the mobile device and the OBU can share resources. Consider the following examples that demonstrate how different resources can be shared. For a network connection, after associating with the vehicle, the mobile device can automatically start using any network resource of the OBU. If the vehicle computer seeks to use the cellular connection of the mobile device, it can do so by sending a request to set up network address translation on the mobile device. For example:

Vehicle: SET NAT
Mobile device: DONE

If the mobile device is not capable of setting up network address translation, it can return the keyword "ERROR" with further human readable information regarding the error. For example:

Vehicle: SET NAT
Mobile device: ERROR "Verizon tethering service is not enabled."

When the service is not needed anymore, it can be stopped. For example:

Vehicle: UNSET NAT
Mobile device: DONE

For GPS, either the vehicle or the mobile device can retrieve a stream of GPS location information from the other device. The following is an example of a mobile device using the GPS of the vehicle computer:

Mobile device: GET STREAM 60 GPS
Vehicle: PORT 9595

The vehicle can broadcast UDP packets with GPS updates on port 9595. When the mobile device does not need the location update stream, it can quickly stop it. For example:

Mobile device: UNSET STREAM 60 GPS
Vehicle: DONE

In terms of the display, the vehicle can be equipped with one or more displays. The OBU can make the display available to a mobile device inside the vehicle. In this case, the mobile device can use virtual network computing (VNC) over WiFi to present its user interface inside the vehicle. If the mobile device is equipped with a WHDMI interface, it can be used to stream HDMI video to the display.

Mobile device: GET DISPLAY VNC
Vehicle: PORT 9595

In this example, 9595 is the port number for the VNC connection.

In terms of the speaker, both the vehicle and the mobile device can broadcast audio using the speaker on the other device. The following is an example of the vehicle using the speaker of a mobile device:

Vehicle: GET SPEAKER MP3
Mobile device: PORT 9090

The mobile device can be listening on port number 9090 for an MP3 stream. The vehicle can stop the lock on the speaker as follows:

Vehicle: UNSET SPEAKER MP3
Mobile device: DONE

The display can be shared between the two devices in a similar way.

Figure 4:
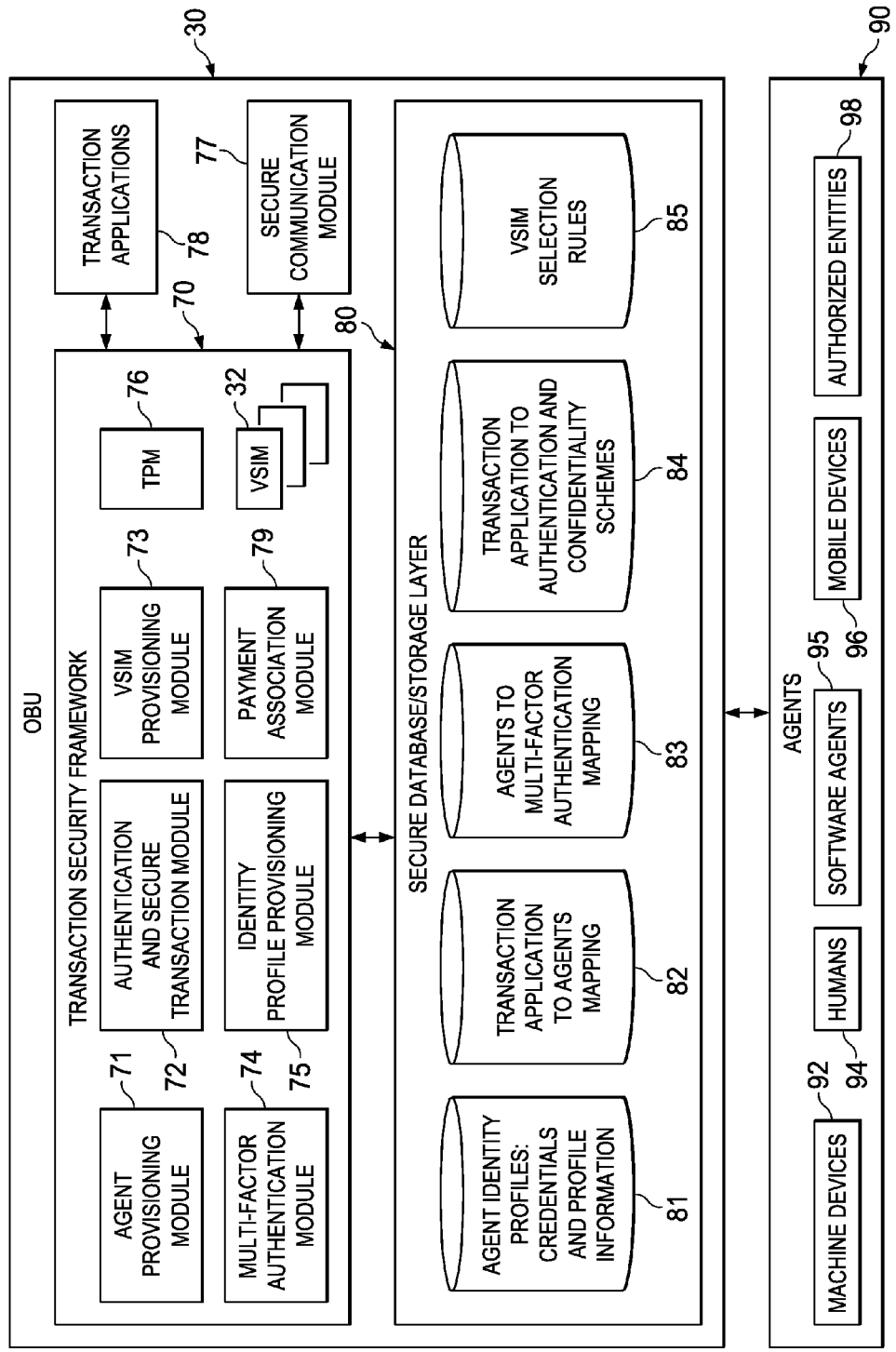
FIG. 4 is a simplified block diagram of an on-board unit of the communication system and possible agents of the on-board unit.

With reference now to FIG. 4, a block diagram illustrating an embodiment of the overall identity management and secure transaction processing architecture is shown. OBU 30 includes a transaction security framework 70, a secure database/storage layer 80, transaction applications 78, and a secure communication module 77. Transaction security framework 70 may include multiple software modules, VSIMs 32, and a trusted platform module (TPM) 76. The software modules can include agent provisioning module 71, authentication and secure transaction module 72, VSIM provisioning module 73, multi-factor authentication module 74, identity profile provisioning module 75, and payment association module 79.

Agent provisioning module 71 provides the overall flow for provisioning and authenticating an agent to OBU 30. Agent provisioning module 71 allows provisioning new agents, provisioning new and updated VSIMs 32, provisioning new and updated identity profiles 34, authenticating agents to OBU 30, and activating any applicable identity profiles 34. In addition, agent provisioning module may also invoke payment association module to determine whether to associate a payment method available through the agent (e.g., in the identity profile or through an associated VSIM) to certain transaction applications not typically initiated by an agent having a payment method (e.g., automatic toll payment transactions, automatic parking transactions, etc.)

Multi-factor authentication module 74 provides a flow for using one or more predefined authentication credentials to authenticate an agent to OBU 30 and to ascertain that the agent is authorized to conduct a particular transaction on OBU 30. In one embodiment, multi-factor authentication module 74 may be invoked upon initial authentication of an agent to gain access to OBU 30 and in addition, when particular transactions are initiated on OBU 30. Authentication credentials may include who, what, and where criteria related to the agent. By way of example, authentication requirements for machine devices and some mobile devices could include one or more of machine hardware signature, challenge-response, predefined certificate (e.g., PKI certificate, TTP certificate, etc.), and physical location relative to OBU 30. Authentication requirements for a human agent 94 (accessing OBU 30 through a mobile device or directly through a user interface such as display 28) could include one or more of biometrics, (e.g., fingerprinting, etc.), challenge-response, key fob, access card, mobile phone, user ID and password, a one-time password (OTP), and physical location relative to OBU 30. Authentication requirements for authorized entities could include challenge-response, predefined certificate, and the like.

In one embodiment, the authentication requirements for each agent may be provided in an agents-to-multi-factor mapping database 83 of secure database/storage layer 80. In some embodiments, the predefined authentication credentials that are required to authenticate to OBU 30 are specific to the particular agent being authenticated. For example, a key fob may allow an owner agent to authenticate to a vehicle, but only a simple user name and password may be required for a child of the owner to authenticate. In this case, a lesser amount of security may be required for the child to authenticate because the child may have limited access to transaction applications and resources of OBU 30. Furthermore, authentication requirements to gain access to OBU 30 may be different from authentication requirements for a particular transaction. By way of example, an owner of a vehicle may only need to use a key fob to gain access to OBU 30, but additional authentication may be required for the owner to access various transaction applications and resources of OBU 30. Security can be strengthened as the number and diversity of authentication requirements mapped to a particular agent is increased.

Implementation of the authentication requirements can be accomplished with any appropriate hardware and/or software. For example, TPM 76 is a hardware approach that can authenticate an agent, once the agent has provided appropriate credentials. TPM 76 is a secure processor that performs cryptographic functions and can store cryptographic keys for protecting information. In another embodiment, a software container (e.g., a secure virtualized operating system container) could be provided with appropriate authentication logic to authenticate an agent once credentials are provided. Thus, any hardware, software, or suitable combination thereof can be implemented to accomplish the authentication requirements of multi-factor authentication module 74.

TPM 76 can also be used to protect data and transaction applications. For data, TPM 76 can be a safe store for an encryption key so that only an authorized agent who properly authenticates to TPM 76 can access the encryption key to decrypt protected data (e.g., data in secure database/storage layer 80). TPM 76 can also be used to ensure the integrity of transaction applications 78 executing on OBU 30, which can be achieved locally or remotely depending on the particular transaction application and associated agent. Locally, the OBU 30 can self-ensure that the operating system is on a trusted platform. Transaction applications 78 may each include a signature that can be verified prior to execution.

Transaction applications 78 can also be verified remotely to third parties, such as authorized entities 98. For example, an authorized entity such as a manufacturer may access a transaction application that monitors the brakes and accelerator of vehicle 4. Before the transaction application executes, TPM 76 can be used to verify the integrity of the application to the manufacturer. Based on the information provided, the manufacturer can respond accordingly (e.g., process data received from the transaction application if the transaction application is verified, cease execution of the transaction application if the transaction application is not verified).

In one embodiment, TPM 76 has a permanent identity associated with vehicle 4 and does not change even if vehicle ownership changes. Similarly, a vehicle identity (vehicle ID) of vehicle 4, such as a vehicle identification number (VIN) is also a permanent identity associated with vehicle 4. A TPM endorsement key, which can be used to encrypt data, may have a public key part that can be used as a TPM identifier (TPM ID). Although vehicle ID and TPM ID do not ordinarily change, if TPM 76 or OBU 30 is replaced during the life of vehicle 4, then a new TPM ID would need to be associated to vehicle 4.

VSIM provisioning module 73 and identity profile provisioning module 75 allow the provisioning of new or updated VSIMs and/or identity profiles on OBU 30. Such provisioning may include downloading new or updated VSIMs and identity profiles from an identity service provider either locally or remotely. Provisioning may also include downloading new or updated VSIMs and identity profiles from a transportable memory element or mobile device. In addition, identity profiles may also be manually created in OBU 30, without involving an identity service provider.

Authentication and secure transaction module 72 provides a flow for detecting an event for a transaction, determining whether the transaction is authorized, authenticating an associated agent if required, and obtaining network credentials and other profile information as needed. Network credentials may include one or more VSIMs' information, user ID and password, and/or security certificates (e.g., asymmetric/symmetric key pair, etc.), and any other information to facilitate vehicle internal network access or external network access via an available wired or wireless communication link. In order to perform authentication and evaluations to ensure secure transaction processing, this module may be configured to query secured storage such as transaction-to-agents mapping database 82, transaction-to-authentication-and-confidentiality-schemes mapping database 84, agents-to-multi-factor-authentication mapping database 83, and agent identity profiles database 81. As used in this Specification, a mapping of data, elements, objects, or components is intended to mean an electronic association, correspondence, relationship, or correlation between the data, elements, objects, or components, provided in electronic devices and/or networks. In one embodiment, these databases, in addition to any other databases or memory elements in secure database/storage layer 80, can be maintained in a secure manner using the default security credentials obtained from TPM 76. Moreover, various confidentiality schemes can be used to protect the data stored in the various memory elements of secure database/storage layer 80 such as, for example, cryptographic algorithms including Data Encryption Standard (DES/3DES), Secure Hash Algorithm (SHA-1/2), Advanced Encryption Standard (AES), etc.

Transaction-to-agents mapping database 82 indicates which transactions are authorized for which agents. Mapping database 82 may include mappings of agent identities to user-level and system-level transaction applications corresponding to transactions and also to types of transactions (e.g., transactions requiring remote network credentials, transactions requiring payment information, etc.). Thus, once an agent has authenticated to OBU 30, only transaction applications that are mapped to the agent, or that correspond to a type of transaction that is mapped to the agent, are authorized and accessible to the agent. Example mappings that could be found in database 82 include: 1) a manufacturer mapped to transaction applications for accessing vehicle sensor data (e.g., in order to perform diagnostics), for performing software or firmware upgrades, and for accessing a "black box" of the vehicle, 2) a dealer mapped to transaction applications for accessing sensor data (e.g., read only access in order to schedule maintenance services), 3) an emergency service provider mapped to transaction applications for controlling the vehicle (e.g., opening a vehicle door, disabling a vehicle engine, etc.), 4) a public entity mapped to transaction applications for accessing sensor data or other vehicle diagnostic data (e.g., for inspection, security, surveillance, etc.), 5) an owner of the vehicle mapped to all transaction applications except those allowing "write" or "modify" access to vehicle software and/or firmware, 6) a passenger mapped to a subset of transaction applications and features available to an owner of the vehicle, and 7) a sensor mapped to a transaction application compiling diagnostic data.

Additionally, different agents may have different levels of authorization. For example, a dealer may only need to read vehicle sensor data for maintenance scheduling purposes. Consequently, the dealer would be mapped to a transaction application that only allows read operations of vehicle sensors to be performed. On the other hand, a manufacturer may need to read and update vehicle sensors and controls for performing firmware and/or software upgrades and fixes. Therefore, the transaction applications mapped to the manufacturer could allow read and update functions to be performed.

In one embodiment, a software agent may be a system-level transaction application that does not have a separate agent initiating its execution or otherwise associated with it. For example, the software agent could be a low-level application that automatically initiates processing based upon predefined criteria (e.g., specific time periods, whenever network connectivity is detected, etc.). Accordingly, authorization for the software agent to execute could be provided in any suitable way, including an appropriate indication in transaction-to-agents mapping database 82 (e.g., mapping the software agent to a type of transaction, mapping the software agent to itself).

Authentication and secure transaction module 72 may also determine which authentication and confidentiality schemes to use for particular transactions for exchanging data between OBU 30 and transaction systems in the network cloud. Examples of authentication protocols that can be used include secure socket layer (SSL), Internet Protocol Security (IPSEC), Extensible Authentication Protocol (EAP-*), Hypertext Transfer Protocol Authentication (HTTP Auth), Kerberos, Simple Authentication and Security Layer (SASL), Web Service Security (WS-Security), etc. Examples of confidentiality schemes that can be used include encryption or cryptographic algorithms such as DES/3DES, SHA-1/2, AES, etc. Accordingly, transaction-to-authentication-and-confidentiality-schemes mapping database 84 may provide a mapping of which types of transactions and particular transaction applications require which authentication and confidentiality schemes. One example database mapping could be a banking application's related data and other sensitive information mapped to a desired encryption mechanism. Furthermore, in certain implementations, the criticality of the communication may dictate the applicable authentication method (e.g., different types of authentication may be required for highly sensitive transaction applications). In some embodiments, mapping database 84 may also indicate which types of transactions and particular transaction applications require multi-factor authentication to be performed for an associated agent.

In scenarios in which multi-factor authentication is required for an agent, authentication and secure transaction module 72 may also access agents-to-multi-factor-authentication mapping database 83. For example, a human agent 94 accessing benign features such as gaming, video, and the like may require a simple user name and password during the initial authentication to OBU 30. However, once the human agent 94 decides to access a banking transaction application, additional authentication (e.g., physical presence in the form of biometric authentication, etc.) may be required. In another example, highly critical functions such as software/firmware changes by a manufacturer, or emergency services by an emergency service provider, may require multiple layers of authentication by the manufacturer or emergency services provider. These multiple layers of authentication could be satisfied by the agent in the initial authentication to OBU 30, or additional required layers may need to be satisfied when the agent initiates access to the particular transaction application requiring the additional authentication.

Secure database/storage layer 80 may also provide an agent identity profiles database 81, for storing identity profiles 34 provisioned locally (e.g., using a transportable memory element to download an identity profile, creating an identity profile directly through OBU 30) or remotely (e.g., downloading an identity profile from identity service provider 60). In addition, agent identity profiles database 81 may also include security keys, certificates, and credentials corresponding to various transaction applications and agents.

Secure communication module 77 of OBU 30 may enable secure communication to various networks (e.g., networks 40 as shown in FIGS. 1-3). Secure communication module 77 selects secure and authenticated network access for an agent and associated transaction application. In addition, secure communication module 77 may also provide opportunistic selection of a VSIM available to the agent, when multiple VSIMs are available for use. VSIM selection rules database 85 may be configured to provide a pre-specified mapping of rules that represent preferences regarding which single VSIM, multiple VSIMs, and/or other wireless communication option (e.g., WiFi) to select for network access. In one embodiment, rules may include combinations of an agent, a transaction application (or type of transaction), and/or a geographical location of the vehicle mapped to a VSIM or other wireless communication. Examples of such rule combinations include agent and transaction application, agent and location, or agent, transaction application, and location. For illustration purposes, if an agent and transaction application combination is mapped to a VSIM, then the VSIM can be used when the agent and transaction application are associated with a network access request, regardless of where the vehicle is physically located. If an agent and location combination is mapped to a VSIM, then the VSIM can be used if the vehicle is physically located in the mapped location and if the agent is associated with the network access request, regardless of which particular transaction application is associated with the network access request.

Multiple VSIMs and/or other wireless communication options can also be mapped to transaction applications or types of transactions, agents, and/or geographical locations to allow a network connection to be split among the designated multiple VSIMs and/or other wireless communication options. In one example scenario, a large file download may utilize multiple VSIMs (e.g., two different 3G mobile networks) in order to split the file to increase the speed of the download. To accomplish this, a transaction application and agent associated with the file download may be mapped to two or more VSIMs provisioned in OBU 30 for the agent.

In certain scenarios, one VSIM may be preferred over another VSIM due to the vehicle location because of the mobile network operator rate. To illustrate this case, assume Agent X and California are mapped to VSIM 1 and Agent X and New York are mapped to VSIM 2. If Agent X is traveling in California, then VSIM 1 can be used for any network access requested by Agent X. If Agent X is traveling in New York, then VSIM 2 can be used for any network access requested by Agent X. In another scenario, a human agent 94 may prefer to have particular types of transactions tied to different VSIMs or combinations of VSIMs (e.g., home transactions mapped to VSIM 1, work related transactions mapped to VSIM 2, child's transactions mapped to VSIM 1). Such mappings can be configured in VSIM selection rules mapping database 85 with appropriate authorization. The VSIM selection rules mapping could also be provided in any other suitable memory element including, for example, an identity profile associated with the agent. In this alternative implementation, only transaction application and/or location may need to be mapped to available VSIMs and/or other wireless communication options.

In addition to pre-specifying VSIM selection rules, VSIMs may also be opportunistically selected in real-time. A real-time VSIM selection may occur based on current network conditions/demands, mobile network rate plan of an agent, remaining data/minutes of a mobile network rate plan. In addition, network performance characteristics such as, for example, data rate, signal level, congestion, etc. may also be evaluated in real-time and used to opportunistically select a suitable one or more VSIMs, other wireless communication options, or any suitable combination thereof.

Transaction applications 78 represent a plethora of user-level and system-level transaction applications that may be configured on OBU 30. With proper authentication to OBU 30 and authorization through transaction-to-agents mapping database 82, however, numerous types of transactions using transaction applications 78 may be performed through OBU 30. Generally, types of transactions are inclusive of 1) accessing one or more wireless/mobile/cellular networks and using network bandwidth and services, 2) gaining access to various resources of the vehicle based on an identity profile and/or associated databases, 3) gaining access to applications in the vehicle, and 4) engaging in commercial activities (e.g., paying for receiving goods or services, or receiving payment for selling goods or services). These general transactions may overlap in certain cases, for example, where an agent accesses a cellular network in order to connect to an online retailer (e.g., commercial transaction system 54) in order to pay for purchased goods, and uses an Internet commerce transaction application to enable a secure transaction.

The user-level and system-level transaction applications of OBU 30 may be mapped to any appropriate agent 90 (e.g., machine devices 92, humans 94, software agents 95, mobile devices 96, and authorized entities 98) in transaction-to-agents mapping database 82. Example transaction applications 78 can include applications facilitating external network access such as banking applications, LBS applications, travel agency applications, vehicle rental & leasing agency applications, Internet commerce applications, kiosk applications, gas & electric charging applications, transportation charging applications, vehicle-to-vehicle applications, vehicle-to-mobile applications, dealer transaction applications, OEM transaction applications, and the like. Other transaction applications 78 may include hardware and/or software applications involving internal access of OBU 30 such as gaining access to various resources, vehicle subsystems, or software applications not involving remote network access. A unified identity management framework, as illustrated in FIG. 4, is capable of aggregation and association of all agents 90 and transaction scenarios into a unified system. In one embodiment, application programming interfaces (APIs) may be exported to integrate these agent identities with various transaction applications.

Authorized entities 98 may access appropriate transaction applications (e.g., dealer transaction application, OEM transaction application, etc.) after gaining access to OBU 30 through an authenticated software agent 95. The software agent 95 may first authenticate to OBU 30 and can then establish a network connection to the authorized entity using an appropriate VSIM (e.g., the manufacturer's VSIM). The authorized entity to which the software agent establishes a network connection may need to authenticate to OBU 30 before being able to access transaction applications on OBU 30, such as transactions applications related to vehicle sensor data, diagnostic data, firmware/software upgrades, emissions data, etc. Thus, for example, an OEM software agent on OBU 30 may be configured to establish a network connection to the OEM whenever internal connectivity to a network is detected on OBU 30. OEM software agent may first authenticate to OBU 30 and, for example, VSIM 1 may be selected for network access. Once a network connection is established between OBU 30 and the OEM using VSIM 1, the OEM may update the VSIM 1 to VSIM 2 if, for example, the OEM has negotiated a new rate with a different mobile network provider and wishes to update its VSIM. In some embodiments, a VSIM being updated (e.g., VSIM 1) may need to remain active and available for use by the associated agent for a specified period of time, until the new VSIM (e.g., VSIM 2) has been successfully provisioned (and possibly tested) in OBU 30. Additionally, the OEM may need to be authenticated to OBU 30 and authorized in transaction-to-agents mapping database 82 in order to update the VSIM or to access an OEM transaction application (e.g., one of transaction applications 78), which could be configured to access various vehicle components (e.g., vehicle sensors, vehicle firmware/software, etc.).

Machine devices 92 may also authenticate to OBU 30 and then provide an automatic network connection to an external entity or transaction system 50. For example, a machine device agent (e.g., a detector) may sense a toll system and initiate a transportation charging application. After the detector is authenticated to OBU 30, transaction-to-agents mapping database 82 may be evaluated to determine whether the detector is mapped to the transportation charging application. Once the detector is determined to be authorized to access the transportation charging application, network credentials and payment information may be obtained so that transportation charging application can connect to the toll system and provide appropriate payment.

Figure 5:
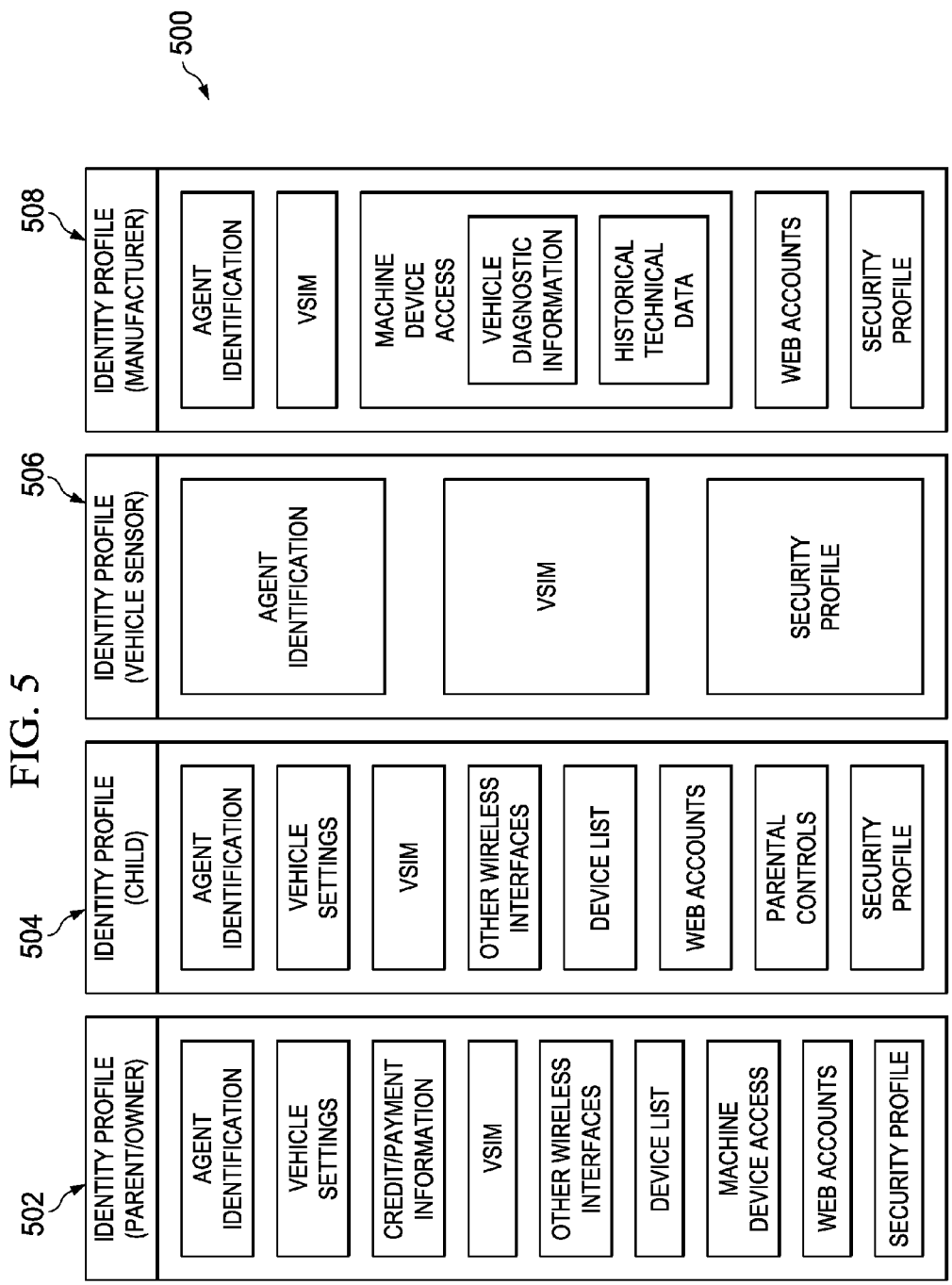
FIG. 5 is a block diagram of a plurality of identity profiles in an example scenario of the communication system.

Turning to FIG. 5, an example selection of identity profiles that could be provided in an OBU is illustrated. Identity profiles are included for a parent/owner 502, a child 504, a vehicle sensor 506, and a manufacturer 508. Common elements in each of the identity profiles include agent identification, VSIM, and security profile. Agent identification could include credentials information such as a key fob for the parent/owner 502, a birth date for the child 504, a device identifier for the vehicle sensor 506, and a name for the manufacturer 508. The security profile information could also be credentials such as a user name and password for the parent/owner 502 and child 504, a security key for the vehicle sensor 506, and a PKI certificate for the manufacturer 508.

Identity profiles for human agents, such as parent/owner 502 and child 504 may also include vehicle settings, other wireless interfaces, device list, and web accounts. The vehicle settings may include items such as preferred seat positions as a driver and a passenger, temperature controls, music or radio settings, and the like. Other wireless interfaces and preferences may include, for example, a WiFi account established with a mobile network provider. Wireless interface information can be included in the identity profiles so that whenever the vehicle is near a hotspot of the mobile network operator, network connections by the parent/owner or child can be made through the WiFi interface. Identity profiles for the parent/owner 502 and child 504 may also include specific web accounts, such as those related to social networking and media.

Device lists may include any personal mobile devices of the parent/owner or child. The device list could include network interface accounts, passwords, and network configurations. Thus, the device list is essentially an identity profile for mobile devices within identity profiles of the parent/owner 502 and child 504. The device list information is provided to allow each of the identified mobile devices to be recognized and connected to the OBU 30 and to other networks in a desired manner. For example, if the child wants to download a movie from the Internet to a mobile device (e.g., a laptop, iPad, etc.) and the mobile device is included in the device list of the child's identity profile 504, then the mobile device could be connected to OBU 30 through a local wireless connection and OBU 30 could route traffic to the Internet through appropriate and available network connections from OBU 30 to the Internet (e.g., using a VSIM identified in the identity profile of the child 504). Thus, OBU 30 may be used as a communication link to the Internet for mobile devices identified in a device list of an identity profile of another agent.

Identity profile of parent/owner 502 may also include other profile information of a sensitive nature such as credit/payment information. Credit/payment information may be included in an identity profile to allow the agent of the identity profile to use his own credit/payment information for various charges/payments incurred during commercial transactions (e.g., transportation charging, gas and charging stations, kiosks, Internet commerce, rental and leasing, travel, etc.). The credit/payment information may be associated with authorized transaction applications during provisioning of the identity profile or at other times. By way of example, during the provisioning of an identity profile of an owner of vehicle 4, the owner's credit/payment information may be set as the default credit/payment method for various transaction applications. In a further example, payment information associated with transaction applications for transportation and gas and charging systems could be changed during a trip in vehicle 4 when a passenger offers to use his own credit/payment information to pay for such expenses. OBU 30 could provide an interface to allow modification to appropriate settings to effect such a change using proper authentication and authorization. In another example, each time a driver is authenticated to vehicle 4, the driver's credit/payment information may be associated with the various transportation, gas, and charging transaction applications. However, if the driver is not the default payer/creditor, then OBU 30 could provide confirmation screens to notify the driver that his credit/payment information can be used and to receive confirmation and approval of this change.

Identity profile of parent/owner 502 may also include machine device access. While a manufacturer or an OEM may have access to vehicle machine devices to read and update or modify firmware or software of such machine devices, an owner of a vehicle may only be allowed to retrieve data from vehicle sensors. Accordingly, machine device access can indicate which machine devices the owner is authorized to access and what type of access is allowed. In addition, other passengers may not be allowed any type of access to the vehicle sensors and actuators, for example, and therefore, machine device access information may be omitted from identity profiles associated with other human agents.

Identity profile of child 504 may also contain parental controls and may not contain certain information that allows use of particular resources or transactions. Parental controls may be included to allow a parent to set desired limits on a child's use of OBU 30 resources and the vehicle itself. For example, any type of common computer parental controls related to accessing networks such as the Internet could be provided in parental controls. In addition parental controls could relate to particular activities of the vehicle. For example, if the child is authenticated as a driver, parental controls could require a notification be sent to the parent (e.g., via an email account, a text message, to a messaging center of the OBU 30, etc.) if the vehicle is driven beyond a specified boundary or perimeter or if the vehicle is driven beyond a specified speed. Parental controls could also be configured to limit certain vehicle functions (e.g., vehicle speed, entertainment systems, etc.). In addition, identity profile of child 504 may not have credit/payment information if the child is not allowed to engage in commercial transactions through OBU 30.

Identity profile of manufacturer 508 may also include machine device access information, which can indicate which machine devices the manufacturer is authorized to access and what type of access is allowed. In addition, the identify profile of manufacturer 508 may also include information related to diagnostics of vehicle 4 and a history of vehicle technical problems. Thus, when the manufacturer accesses vehicle 4, valuable historical information related specifically to vehicle 4 can be readily available for the manufacturer. Web accounts may also be provided in identity profile of manufacturer 508. Such information could allow the manufacturer to communicate with the driver/owner and provide information including, for example, marketing information such as coupons or sales events.

Figure 6:
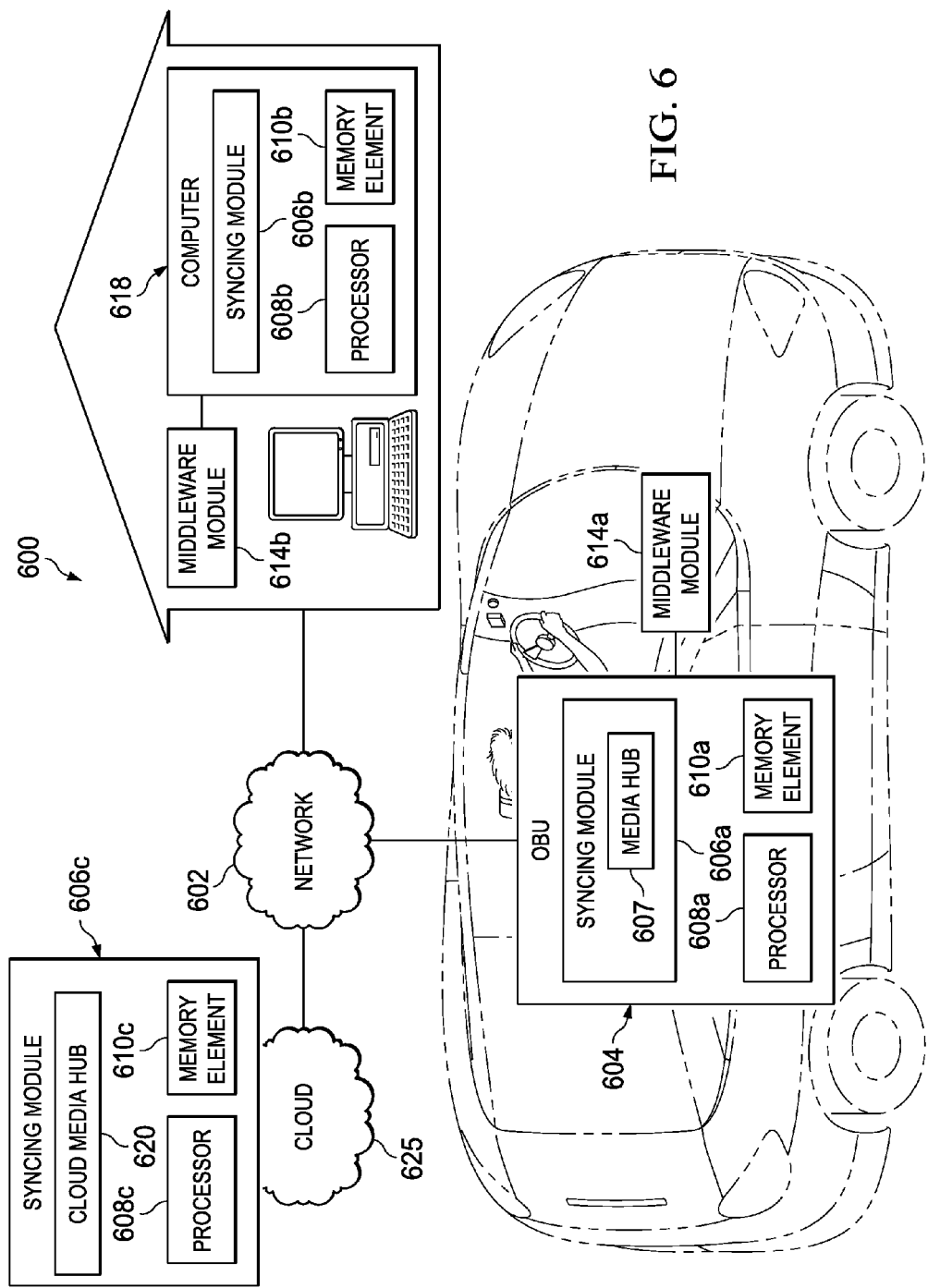
FIG. 6 is a simplified block diagram illustrating an example arrangement associated with synchronizing and managing media content.

FIG. 6 is a simplified block diagram illustrating a communication system 600 associated with the present disclosure. This particular implementation includes a network 602 and an OBU 604, which includes a media hub 607. Additionally, this particular architecture includes a residential element, which may include a computer 618. Also, this particular implementation includes a cloud 625, which may include a cloud media hub 620. Computer 618, OBU 604, and cloud media hub 620 may include a respective syncing module 606*a-c*, a respective processor 608*a-c*, and a respective memory element 610*a-c*. In addition, a middleware module 614*a* may be provisioned in the vehicle, while a counterpart middleware module 614*b* may be provisioned at the residential element. Such middleware may optionally be provisioned in cloud 625, which is representative of any type of appropriate network configuration (e.g., Internet, enterprise repository, Intranet, etc.).

Before turning to some of the capabilities of the architecture of FIG. 6, some preliminary contextual information is provided. Most home media content is being moved from a traditional storage format to a digital format. Moreover, the prices of mass digital storage devices (such as hard disk) have been consistently declining. Further, with the ubiquity of consumer wireless technologies, the consumer devices including mass storage devices and computing devices (e.g., laptop, smart devices) come with built-in wireless connectivity. To simplify access to (and interaction with) digital content, media hub technology can be used to gather, organize, and present the digital video, photos, and music that users have spread amongst various devices in the home. Today, using such technology, consumers can enjoy their media through an easy-to-use interface that is not only accessible in the home, but throughout the world via a web browser (or via smart devices such as iPhone/iPad/Android Phones etc.). Similarly, with the popularity of a network DVR at home, users can pause their favorite TV program at home TV, and move the program to other TVs or mobile devices.

Because the vehicle of the present disclosure is connected to the home and enterprise cloud, there is a need to extend this rich media access. This can eliminate the need for CD/DVD players in the vehicle and, further, enable a media hub functionality for the vehicle media system. Similarly, a network DVR functionality can be added to the vehicle entertainment system.

In a particular example implementation, the architecture of FIG. 6 can be used for providing a vehicle entertainment system with media hub functionality. This would allow for the sharing media on multiple devices within the vehicle. For example, each passenger in the vehicle can play his/her favorite content from the vehicle entertainment media hub. Devices in the vehicle can generate media and automatically back-up or sync-up with the vehicle entertainment media hub. For example, Flip Camera/smartphone in the vehicle can automatically connect to the vehicle media hub and sync-up its streaming content, or upload a media file to a vehicle entertainment media hub. Similarly, local vehicle radio channels can be provisioned in the vehicle media hub, which can be played or shared locally on other devices.

In regards to synchronizing between the vehicle media hub and the home media hub, this can allow the vehicle and home media hub to exchange media content of choice. For example, before embarking on a trip, the vehicle media hub can be connected over a wireless link to the home media hub to download content of choice either by pushing a button, or via explicit selection, or via automatic sync setup. A similar operation can be used for synchronizing the vehicle media content to the home media hub. For example, when the user returns from a vacation trip (where the vehicle media hub synchronized up with lots of media), the platform would upload/sync the content to the home media hub for backup and sharing purposes.

For synchronizing between the vehicle media hub and the cloud virtual media hub, it is valuable to synchronize media content of choice from vehicle to the cloud. For example, one can create a virtual media hub in the cloud and upload/back-up/sync-up required media content from the vehicle media hub for sharing and protection purposes. Similarly, a vehicle can select one or more virtual media hub(s) hosted in the cloud (e.g., to sync-up content to the vehicle media hub). For example, the user can select his or his/her family/friends media content, and sync-up/download content to the vehicle media hub to play on the vehicle system (or share with the devices on the vehicle).

Consider the vehicle media hub client accessing the remote media hub in the cloud or at home. Given that vehicles can be connected, this can enable vehicle users to play media content directly streaming from home, or virtual media hub from cloud. This can also allow users to download and cache contents of interest locally. This can allow media to be played in the vehicle during times when there is no network connectivity for direct streaming. Additionally, the media hub can operate with a network DVR functionality for stored and live media. For example, to counter intermittent disconnections or facilitate delayed media play, the media hub at home/cloud can be enabled with network DVR providing pause, replay functionality. In addition, using a universal plug-and-play (U-PnP) functionality, the home/cloud media hub can also be connected with a live TV/set-top box, so it can receive streams, and act as network DVR for live programs.

For a vehicle-to-vehicle media hub functionality, one or more of the above functionalities can be achieved between vehicle media hub servers or media hub client. Separately, for a media hub search from the connected vehicle, the user can search for content of interest from his/her media hub server or client in the vehicle. If the content is available locally, it can be presented back to the user. If it is not local, the media hub server or client in the vehicle can redirect the search query to the permission-based accessible media hub (e.g., at a family/friend/own home), or in a cloud virtual media hub or other vehicle hub. Once accessed, the platform can start downloading/streaming content that matches the criteria. For predictive content access from a location-based media hub search from the vehicle, one or more of the above can be based on location (e.g., home, garage, etc.), user profile, connection availability (enable DVR or Don't enable DVR), user preferences (e.g., automatic sync or manual sync, remote streaming versus local download and play, etc.), access rights, and security policies.

FIG. 7 is a simplified schematic diagram illustrating one example implementation 700 of the present disclosure in which transcoding of video for a particular application is being performed. The example architecture of FIG. 7 includes a network controller 707, a plurality of in-vehicle devices 702, and an OBU 704. Network controller 707 may interface with OBU 704 via a network 720. Operationally, OBU 704 can pool together Internet connections from multiple available access networks and, further, serve as an access point for mobile devices inside the car. The wireless links shown are for illustrative purposes only. In general, these links can be any wired or wireless technology.

Note that future vehicles equipped with advanced wireless routers (on-board unit) may be connected to the Internet via multiple interfaces (e.g., 3G/4G, LTE, WiFi), while providing various voice and video services to in-vehicle clients (also referred to as in-vehicle devices). This can include built-in music, and movie players, laptops, smartphones, iPads, other handheld devices, sensors in vehicles, etc. The roadside device could be a user device or an infrastructure device such as base station, access point, satellite, etc. Additionally, network controller 707 is a generic term for network devices in the Internet that can perform any number of functions (e.g., ID/location mapping, traffic shaping and processing, proxy, etc.).

Operationally, the architecture is configured to allow for video transcoding either at OBU 704, or at network-controller 707, so as to better match the received video quality with the highly dynamic available bandwidth in the vehicular environment. Note that video transcoding at the edge of cellular networks can match the different container formats (e.g., fly, avi, mpg, etc.) and form factors (e.g., display size, supported temporal resolutions) supported by different end user devices. The scheme of the architecture of FIG. 7 implements a proxy, which can operate for different types of access networks, (e.g., WiFi, WiMAX, LTE, etc.). Additionally, such an architecture can be functional for both downstream and upstream video.

It should also be noted that the design of the transcoding activities is targeted for the highly dynamic vehicular environment, where fast-changing bandwidth, highly variable latency, and persistent packet losses are common. In operation in downstream video instances, the architecture contains two stages of transcoding. One stage is provided at the network controller for matching the available bandwidth. Another stage at the on-board-unit focuses on a conversion of container format, spatial resolution, and frame rates, as appropriate for individual in-vehicle clients. Such a framework can help to reduce the computational burden at the network controller.

Turning to FIGS. 8A-B, these illustrations reflect downstream and upstream video activities, respectively. In a particular example implementation 800 depicted by FIG. 8A, a network controller 804 is coupled to a server A and a server B (indicated generally at 808), where the servers have a suitable network connection. An OBU 802 includes a processor 810, a memory element 812, a video transcoding module 814, and a resource discovery module 816. Turning to the example implementation 850 of FIG. 8B, this particular architecture may include a server A and a server B (indicated generally at 858), which may be coupled to a network controller 854. In a paradigm similar to that described in FIG. 8A, an OBU 852 of FIG. 8B may include a bandwidth module 868, a video transcoding module 864, a processor 860, and a memory element 862.

For the downstream video scenario, in-vehicle clients can be streaming video from web servers, or can be receiving video feeds from a two-way conferencing session. In such instances, the network controller can be responsible for estimating the bottleneck wireless link bandwidth (or path bandwidth, possibly with help from the OBU). The network controller can also be responsible for allocating bandwidth among competing video streaming, and for transcoding each video stream on behalf of its server. In addition, a second video transcoding proxy at the on-board unit can also be used to further match the supported container formats and form factors of the in-vehicle devices.

In the case of upstream video, in-vehicle clients act as senders, for instance when uploading some user-generated contents, or feeding the camera capture from a two-way conferencing session. In this case, the on-board unit is in charge of bandwidth estimation (possibly with help from the network controller), bandwidth allocation, and video transcoding on behalf of the in-vehicle devices. Due to scalability considerations, it may be more advantageous for the majority of computation and decision making to occur at the OBUs.

For bandwidth estimation, multiple measurement methods can be applied to estimate the available bandwidth between the network controller and the on-board unit. Note that multiple modes of access (3G, WiFi, 4G-LTE/WiMAX, etc.) may exist over this hop and, therefore, the aggregate bandwidth across all access links is of interest. Note that one important parameter in such scenarios is the update interval of the bandwidth measurement. While frequent updates are needed to track the dynamically changing wireless bandwidth, the frequency also needs to be limited to avoid excess overhead introduced by the measurement method (e.g., when using packet-train/pair-based methods).

In certain implementations, this parameter should be dynamically tuned based on the latency requirement of the video application. For example, for applications with more relaxed latency requirements (e.g., watching YouTube), a lower update frequency is appropriate, and a larger buffer at the network controller can help to smooth out the instantaneous rate fluctuations over the wireless links. For applications with more stringent latency requirements (e.g., video conferencing), additional buffering is not a viable option. In this case, a more frequent update is needed to match the video rate and quality to the instantaneous rates of the wireless links.

For bandwidth allocation, given the total bandwidth estimate and the characteristics of competing video streams, the video transcoding proxy at either the network controller (in the downstream case) or the on-board-unit (in the upstream case) can make a centralized decision on how much rate to allocate to each of the video streams, so as to jointly optimize their overall quality. In general, it is favorable to allocate higher rates for streams bearing higher spatial/temporal resolutions, containing more dynamic scenes, and/or demanding a higher priority. The optimal rate can be calculated based on several alternative media-aware criteria to minimize the weighted sum of distortion of all participating streams, and to maintain equal quality of all participating streams. The quality metric can either be objective (e.g., commonly adopted measurements based on peak-signal-to-noise-ratio (PSNR)), or subjective, which can be based on extensive prior study of user preferences for various artifacts in the decoded video content.

For video transcoding, the objective of video transcoding at either the network controller or the on-board-unit is twofold. First, its aim is to dynamically match the stream source rate with its allocated bandwidth, so as to fully utilize the wireless link resource, while avoiding buffer overflows or frame freezes at the receiver. Second its aim is to match the container format, frame rate, and spatial resolution of the original stream to those of the receiving device.

Any number of suitable transcoding methods can be employed in the architecture discussed herein. These can range from fully decoding and re-encoding the traversing stream, to simply requantizing the transform parameters in the compressed streams. The latter approach incurs significantly lower latency and computational complexity, by reusing the motion estimation and compensation, mode selection, and transform results embedded in the original stream; however, such a paradigm typically incurs a penalty in terms of rate-quality efficiency. The architecture of FIGS. 8A-8B is general and flexible enough to adopt either approach. The tradeoff between computational complexity, latency, and efficiency can be chosen based on the demand of the video application, as well as the capability of the network device (i.e., the on-board-unit and the network controller).

Figure 9:
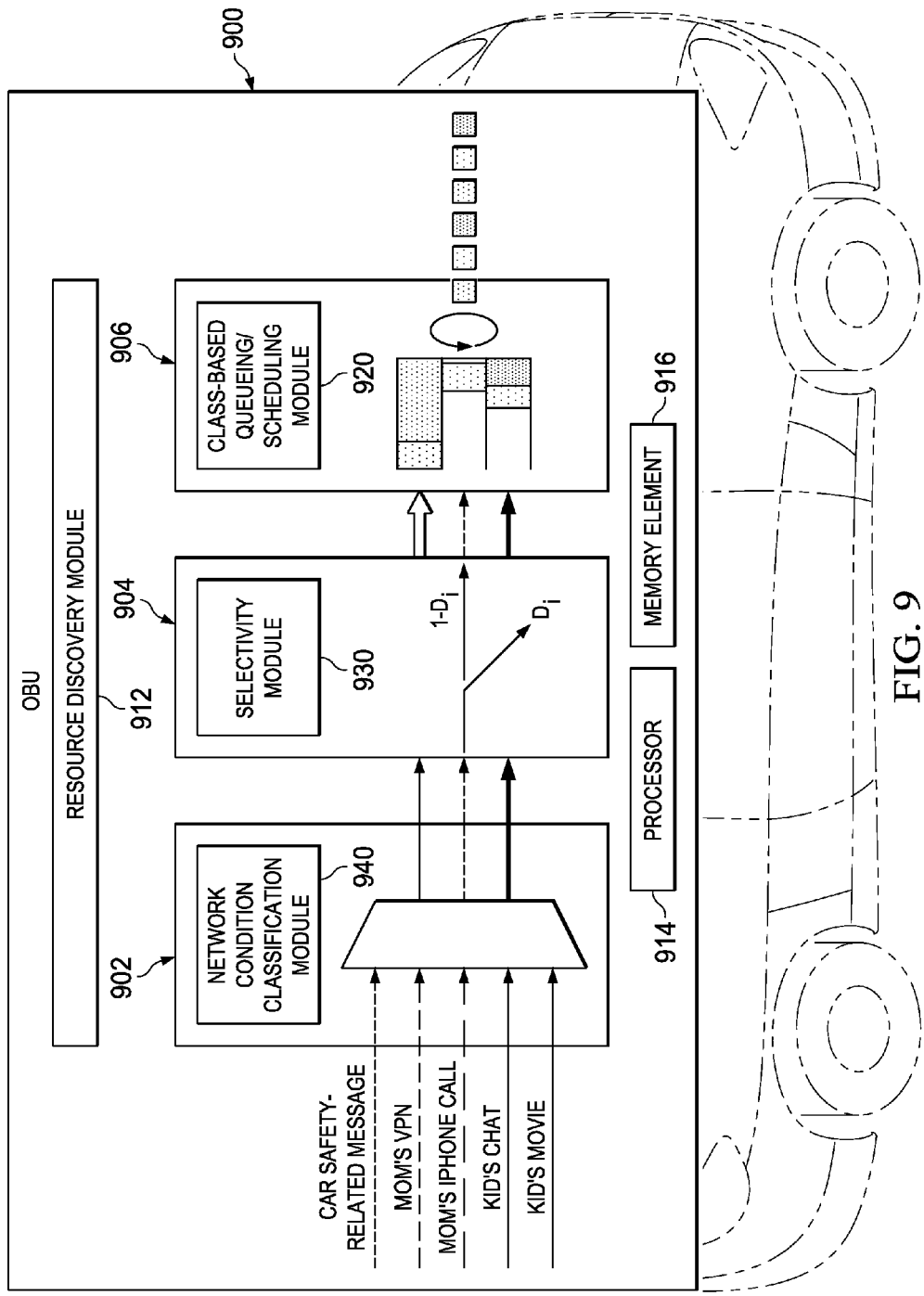
FIG. 9 is a simplified schematic diagram illustrating an example framework associated with particular networks in accordance with one embodiment of the present disclosure.

Turning to FIG. 9, FIG. 9 is a simplified quality of service (QoS) framework for vehicular networks. The example architecture of FIG. 9 includes an OBU 900, which includes a network condition aware classification element 902, a selective dropping/selective packet header adaption element 904, a network condition aware class-based queuing/scheduling element 906, a resource discovery model 912, a processor 914, a memory element 916, a class-based queuing/scheduling module 920, a selectivity module 930, and a network condition classification module 940.

Before delving into some of the operational capacities of the architecture of FIG. 9, some contextual information is provided to help guide the descriptions. In a vehicular network, fast changing, and sometimes harsh, vehicular environments makes supporting QoS a challenging task: especially when there are multiple applications from different clients competing for the scarce, fast-varying, unpredictable bandwidth. The architecture of FIG. 9 provides a framework for multi-client, heterogeneous applications. Although vehicle networks could involve both on-board units and roadside devices, the method discussed herein can be applied at both locations.

In operation, there is an assumption that there are multiple clients running various applications that share a bottleneck link that has a varying capacity, bit error rate (BER), and varying link delay. The scheme of the architecture provides a best service available to the most important applications, while enabling weighted fair sharing of the remaining bandwidth for other less-critical applications. The scheme can also adapt smoothly with changing network conditions.

Certain key components of the vehicular QoS system are shown in FIG. 9. In one particular implementation, there are three components in the framework: network-condition-aware classification; selective dropping or selective packet header adaptation, and network-condition-aware class-based queuing and scheduling.

The first component in the QoS framework is network condition aware classification. Since there is a small number of clients and applications running within a vehicle (or even at a network controller, for example at a WiFi access point), the architecture can employ deep packet inspection as part of the classification protocol. Unlike more common methodologies, the classification rules of FIG. 9 are adaptive to mobile/wireless channel conditions. For example, given enough bandwidth, safety-related messages and voice call traffic can be classified into the strict priority and their bandwidth requirement is assured. However, if the link capacity becomes low, the architecture can classify safety-related messages to have a strict priority, and also classify the voice traffic into different classes, which may incur drops packets.

User-specified rules can also be incorporated in the classification unit. Users can specify the relative importance among different clients and different applications. For example, parents' traffic can have a higher priority over children's traffic. Alternatively, and in more general terms, voice traffic can have higher priority than WebEx sessions, etc.

After a packet has been classified, it can propagate through a selective dropping or packet header modification unit, which may be referred to as the 'SEL' unit. Packets are selectively dropped in such a way that the class queue would not become congested. Additionally, the architecture can ensure that flows that are classified into the same queue can share the class bandwidth in a weighted fair manner. In the particular example, approximate fair dropping (AFD) methodologies are adopted to achieve this task. For applications that use TCP as the transport protocol, selective dropping may not be an ideal choice, as TCP may be sensitive to packet drops. In such scenarios, the architecture can choose to selectively alter the receive window in TCP's ACK packets to effectively control TCP throughputs for different flows.

For the network condition aware class-based queuing and scheduling, once a packet is queued into one of the class-based queues, it is ensured of being sent out. The delay it would incur and the bandwidth its class would receive depend on the network condition aware scheduler. Traditional schedulers send out packets from a different class according to preset rules. For example, a packet in a strict priority queue would universally be served regardless of other classes, where the remaining class queues would share the remaining bandwidth according to a preset ratio. In the system of FIG. 9, such ratio can be adaptive to network conditions. The enhanced layer traffic from a video application may receive 20% of the link capacity when the link is an excellent condition. Furthermore, it would receive less, as the network condition worsens (i.e., until complete starvation). This occurs because when the network condition is excellent, sending enhancement layer information would improve the users' experience. Conversely, when the link is poor, it is reasonable to remove the enhancement layer traffic.

In terms of advantages, one advantage of the design of FIG. 9 is that it is based on a cross-layered approach. Physical links' conditions can be sent back to the QoS framework to engender intelligent management decisions for handling service users' applications. This may be important in vehicular networks that are dynamic and error-prone. Typical architectures are not adaptive enough to be used directly in such an environment, whereas the architecture of FIG. 9 can adapt quickly to the varying link capacity, high BER, and/or highly inconsistent delays.

Turning to FIGS. 10-15, simplified flowcharts illustrating various aspects of embodiments of the present disclosure are shown. For ease of reference, FIGS. 10-15 will be described herein with reference to various elements, objects, modules, and components of the present disclosure as provided in preceding FIGS. 1-9B.

Figure 10:
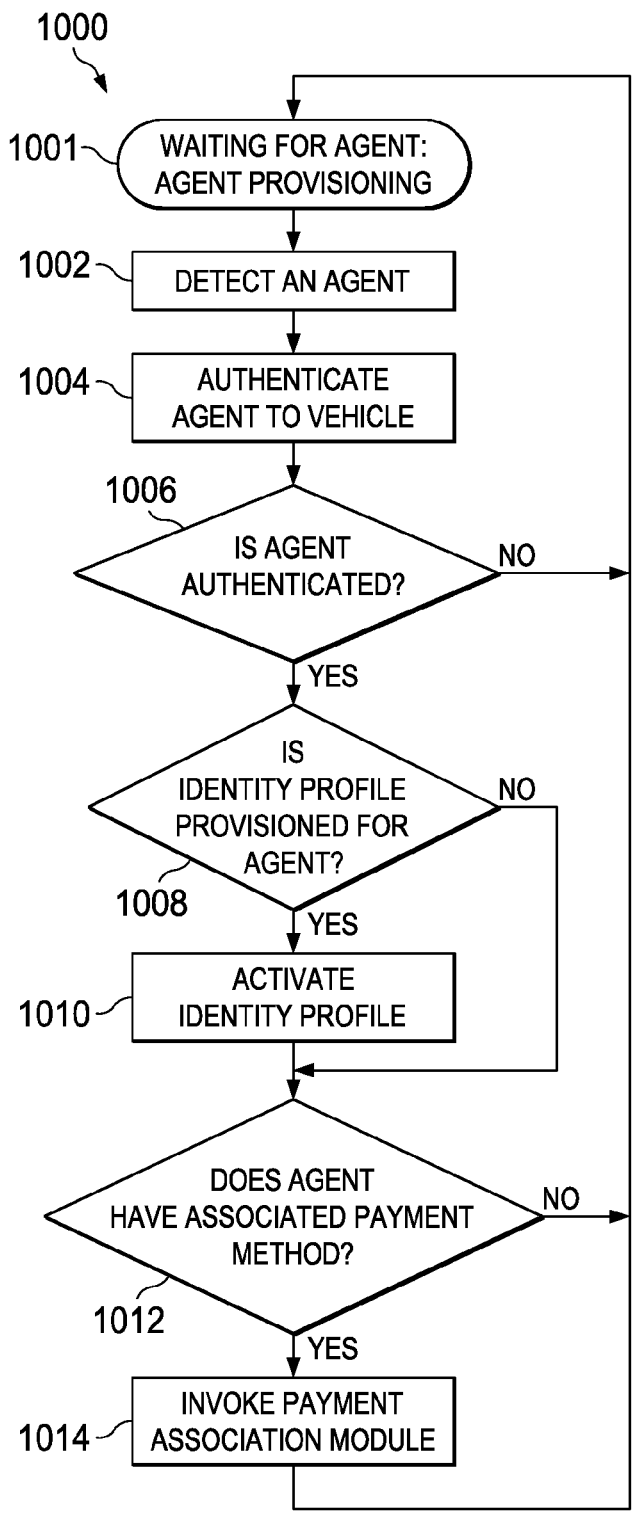
FIGS. 10-19 are simplified flowcharts illustrating example activities associated with the present disclosure.

FIG. 10 is a simplified agent provisioning flow 1000 providing example steps of agent provisioning module 71 for provisioning an agent to OBU 30, which may be configured as a background process open and running whenever OBU 30 is booted up. Agent provisioning flow 1000 begins at step 1001, waiting for an agent. When an agent attempts to gain access to OBU 30, flow moves to step 1002 and an agent is detected. This can occur whenever a new or existing agent initiates a vehicle-based transaction via OBU 30. For example, when a human 94 (e.g., an owner, a renter, a borrower, etc.) enters a vehicle such as vehicle 4 and OBU 30 is powered on (e.g., by using a key fob to enter the vehicle, by starting the vehicle or otherwise providing power to OBU 30).

Agent provisioning flow 1000 may also occur when a mobile device 96 is powered on within vehicle 4, when a software agent 95 is initiated, when a machine device 92 is activated (e.g., by powering on vehicle 4) or attempts to access resources or transaction applications of OBU 30 (e.g., vehicle sensor or actuator sending data or information to OBU 30, detector initiating a transportation transaction application after detecting proximity to a toll system), when an authorized entity 98 attempts to access OBU 30 (e.g., after a corresponding software agent 95 has established network access to the authorized entity 98 from OBU 30). Furthermore, agent provisioning may also occur when a human agent provisions another agent (e.g., machine device, software agent, mobile device, authorized entity), typically for the first time.

Once an agent has been detected in step 1002, flow passes to 1004 to perform authentication of the agent to the vehicle, which will be described in more detail with reference to FIGS. 11-14B. During the authentication, VSIMs and/or an identity profile may be provisioned for the agent if the agent is properly authenticated. Flow then passes to decision box 1006 where a determination is made as to whether the agent was properly authenticated to the vehicle. If the agent was not properly authenticated then flow passes back to step 1001 to wait for another agent. If the agent was properly authenticated as determined in decision box 1006, however, then the flow passes to decision box 1008 to determine whether an identity profile is provisioned for the agent. If the agent has a corresponding identity profile, then flow passes to step 1010 to activate the identity profile, including determining agent priority and role in the vehicle, adjusting vehicle settings, configuring agent preferences, and the like, which will be further described herein with reference to FIG. 15.

After the identity profile is activated in 1010, or if the agent does not have a corresponding identity profile in OBU 30, then flow passes to decision box 1012 to determine whether the agent has an associated payment method (e.g., payment method information in identity profile, VSIM that can be used for payment). If the agent has an associated payment method, then flow passes to step 1014 to invoke payment association module, which will be further described with reference to FIG. 16. After the payment association processing is completed in step 1014, or if the agent does not have an associated payment method as determined in decision box 1012, then flow passes back to step 1001 to wait for another agent. Certain agents (e.g., vehicle machines such as a brake sensor or a seat actuator, a human agent without payment information in an identity profile, etc.) may not have associated payment methods because these agents may not engage in commercial transactions through OBU 30 and, therefore, may not interact with transaction applications requiring payments.

Figure 11:
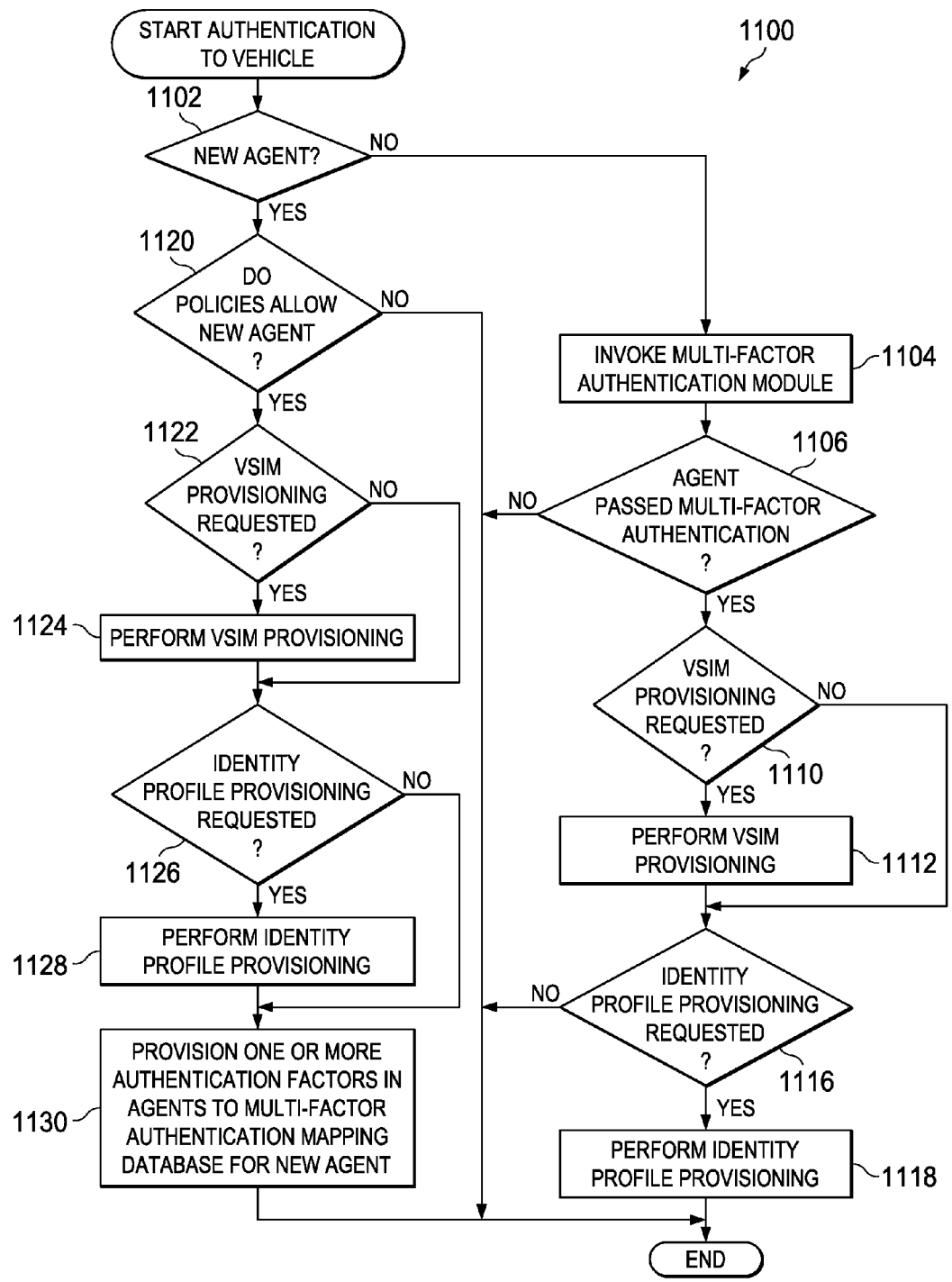

FIG. 11 is a simplified authentication to vehicle flow 1100, which may be performed at 1004 of FIG. 10 and which illustrates example steps for authenticating an agent to the vehicle. Authentication to vehicle flow 1100 begins at step 1102 where a determination is made as to whether the detected agent is a new agent. "New agent" refers to an agent that does not have any authentication credentials, profile information, or VSIMs currently provisioned in OBU 30. New human agents could include, for example, a new owner, rental or lease driver, borrower, or passenger who has not previously been provisioned on the vehicle. Other types of new agents include, for example, a new mobile device attempting to access a local network of OBU 30, a new machine device (e.g., sensor, actuator, etc.) added to the vehicle, or a new software agent installed on OBU (e.g., a new dealership adds a software agent to automatically initiate connection with the dealership).

In one embodiment, agent identity of a human can be inferred from a key fob used by the human agent to enter the vehicle. In certain embodiments, when a driver enters a vehicle, display 28 can prompt the driver to confirm that his identity matches the displayed owner identity (or provisioned default driver) of the vehicle. If other identities of human agents have been provisioned in the vehicle, then the display could also provide a list of provisioned identities from which the agent can choose to authenticate. Display 28 could also provide the option to select "New Driver", "New Passenger", or the like.

If the agent is determined to be a new agent in decision box 1102, then flow may pass to decision box 1120 where a query is made as to whether policies allow a new agent to be provisioned. In some embodiments, OBU 30 may include a policy module that allows various policy controls, including new agent provisioning. Thus, for example, for an added layer of security, an owner may set policies that by default block any new agents from being added to OBU 30. Thus, whenever a new agent needs to be added, the owner would have to reset or override the policy with credentials to allow the new agent to be provisioned. Such policy settings can be controlled through a policy settings interface by an appropriate agent (e.g., the owner or other superagent with a specified high level of authority for conducting transactions and configuring policies in OBU 30). If the policies do not allow new agents as determined in decision box 1120, then authentication to vehicle flow 1100 ends and flow returns to agent provisioning flow 1000 with the agent not authenticated.

If policies allow new agents to be provisioned as determined in decision box 1120, however, then the flow passes to decision box 1122 where a determination is made as to whether VSIM provisioning is requested. In the case of a human agent, a display screen may offer the choice to the agent to provision a VSIM. If VSIM provisioning is requested, then flow passes to step 1124 to perform VSIM provisioning, which will be further described with reference to FIGS. 13A and 13B. VSIM provisioning allows an agent to create or update one or more VSIMs with an identity service provider (e.g., third party identity service provider accessible through the Internet), and/or to download one or more VSIMs (e.g., from the identity service provider, from a transportable storage medium, from a mobile device) to OBU 30.

After the one or more VSIMs are provisioned in step 1124, or if VSIM provisioning was not requested, flow passes to decision box 1126 to determine whether identity profile provisioning is requested. In the case of a human agent, a display screen may offer the choice to the agent to provision an identity profile. If identity profile provisioning is requested, then flow passes to step 1128 to perform identity profile provisioning, which will be further described herein with reference to FIGS. 14A and 14B. Identity profile provisioning allows an agent to create or update an identity profile through an identity service provider (e.g., third party identity service provider accessible through the Internet) or directly onto OBU 30. If an identity profile is created or updated through an identity service provider, or if an identity profile is stored on transportable storage medium or mobile device, then the identity profile can be downloaded to OBU 30.

After the identity profile is provisioned in step 1128, or if identity profile provisioning was not requested, flow passes to step 1130, where one or more authentication factors or requirements may be provisioned for the new agent in agents-to-multi-factor-authentication mapping database 83. Such factors could include user ID and password, biometrics, key fob, access card, etc., and one or more of these factors could be obtained by accessing the agent's identity profile credentials. For example, if an identity was provisioned and if it included a user ID and password, the agent could be prompted to confirm that the user ID and password from the identity profile should be included as one of the authentication factors. After the authentication factors are provisioned in step 1130, flow returns to agent provisioning flow 1000 of FIG. 10.

Referring again to decision box 1102, if the detected agent is determined to be an existing agent (e.g., with authentication credentials, VSIMs, identity profile), then flow passes to step 1104 to perform multi-factor authentication, which will be described in more detail herein with reference to FIG. 12. Multi-factor authentication requires the detected agent to authenticate himself using one or more factors provided in agents-to-multi-factor-authentication mapping database 83. After the multi-factor authentication is performed, flow passes to decision box 1106 to determine whether the detected agent passed the required multi-factor authentication. If the agent did not pass, then authentication to vehicle flow 1100 flow ends and returns to agent provisioning flow 1000 without the detected agent being authenticated.

If in decision box 1106, it is determined that the detected agent passed the multi-factor authentication, however, then the flow passes to 1110 through 1118. These steps essentially perform the same function as steps 1122 through 1128 with regard to VSIM and identity profile provisioning. Thus, the existing, authenticated agent is allowed to provision (by creating or updating) one or more VSIMs and/or an identity profile and to download such data to OBU 30.

Figure 12:
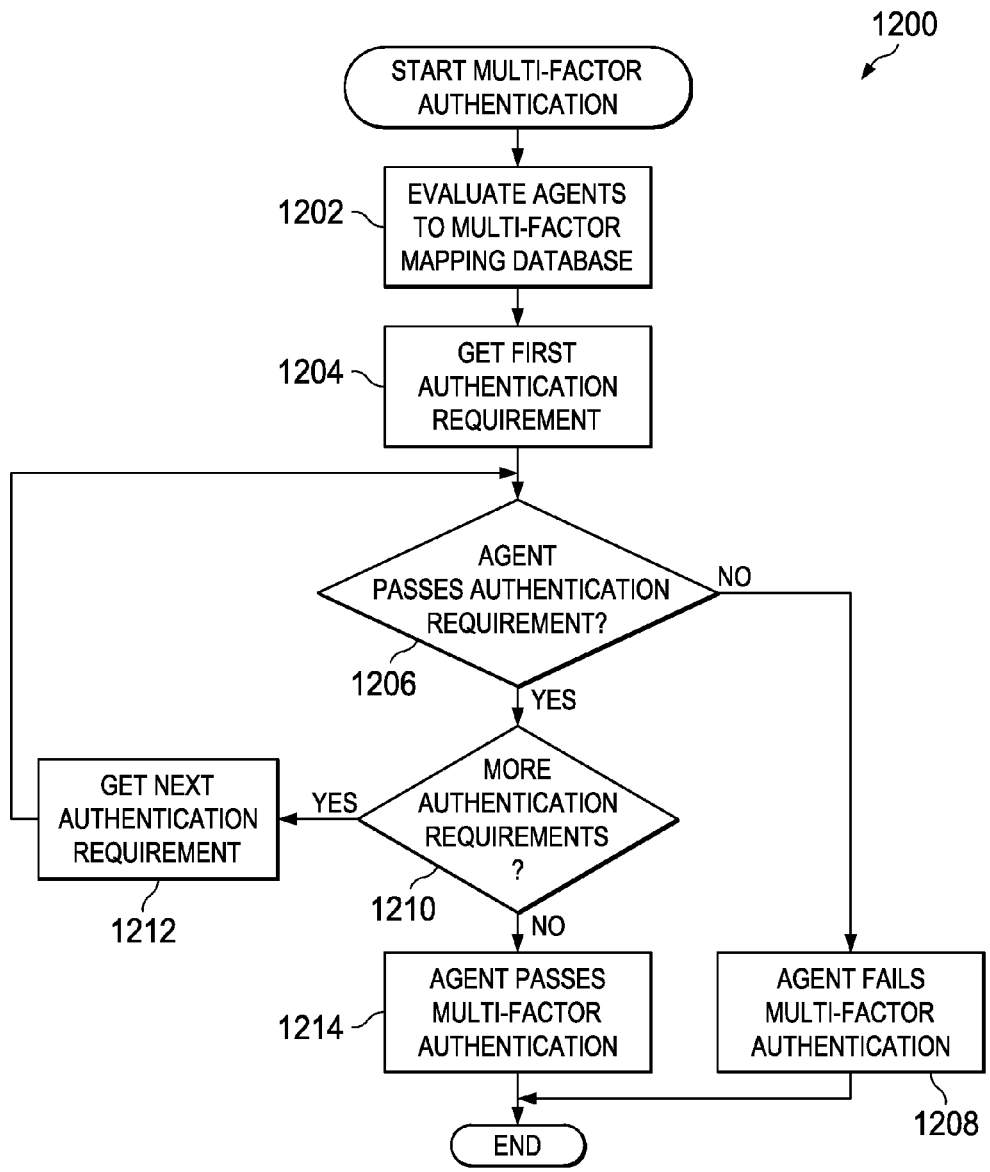

Turning to FIG. 12, a multi-factor authentication flow 1200 is shown, which may be invoked in step 1104 of FIG. 11, to authenticate the agent to access OBU 30. Multi-factor authentication flow 1200 may also be used to authenticate the agent when the agent is attempting to conduct particular transactions through OBU 30, which will be further described herein with reference to FIG. 17. The flow begins at step 1202 where agents-to-multi-factor-authentication mapping database 83 is evaluated. In one embodiment, the agent can be mapped to one or more authentication requirements for authenticating to OBU 30. Moreover, each agent provisioned in OBU 30 could have various required authentication requirements and various numbers of such requirements. For example, an owner having significant privileges and access to OBU 30 and its resources may have several authentication requirements, whereas a passenger in the vehicle with limited access to OBU 30 and its resources may only need to provide a user ID and password. The flow moves to step 1204 to get a first authentication requirement from mapping database 83. In one embodiment, a key fob used to open a door for a human agent could be the first authentication requirement for a driver or owner of the vehicle.

Flow then passes to decision box 1206 where a determination is made as to whether the agent passes the authentication requirement (e.g., entering a correct user ID and password, providing a matching fingerprint, providing a valid PKI certificate, etc.). If the agent passes the authentication requirement, then flow moves to decision box 1210 where a determination is made as to whether more authentication requirements are identified in agents-to-multi-factor-authentication mapping database 83. If additional requirements are appropriate to authenticate the agent, flow passes to step 1212 to identify the next requirement, and then passes back to decision box 1206 to repeat the steps determining whether the agent passes the authentication requirement. This processing continues until the agent has passed all of the authentication requirements or until the agent fails one of the authentication requirements. If the agent passes all of the authentication requirements, then the agent is authenticated to the vehicle, as indicated in step 1214, and multi-factor authentication flow 1200 ends. If, however, the agent fails one of the authentication requirements, then the agent is not authenticated to the vehicle, as indicated in step 1208, and the multi-factor authentication flow 1200 ends.

Figure 13A:
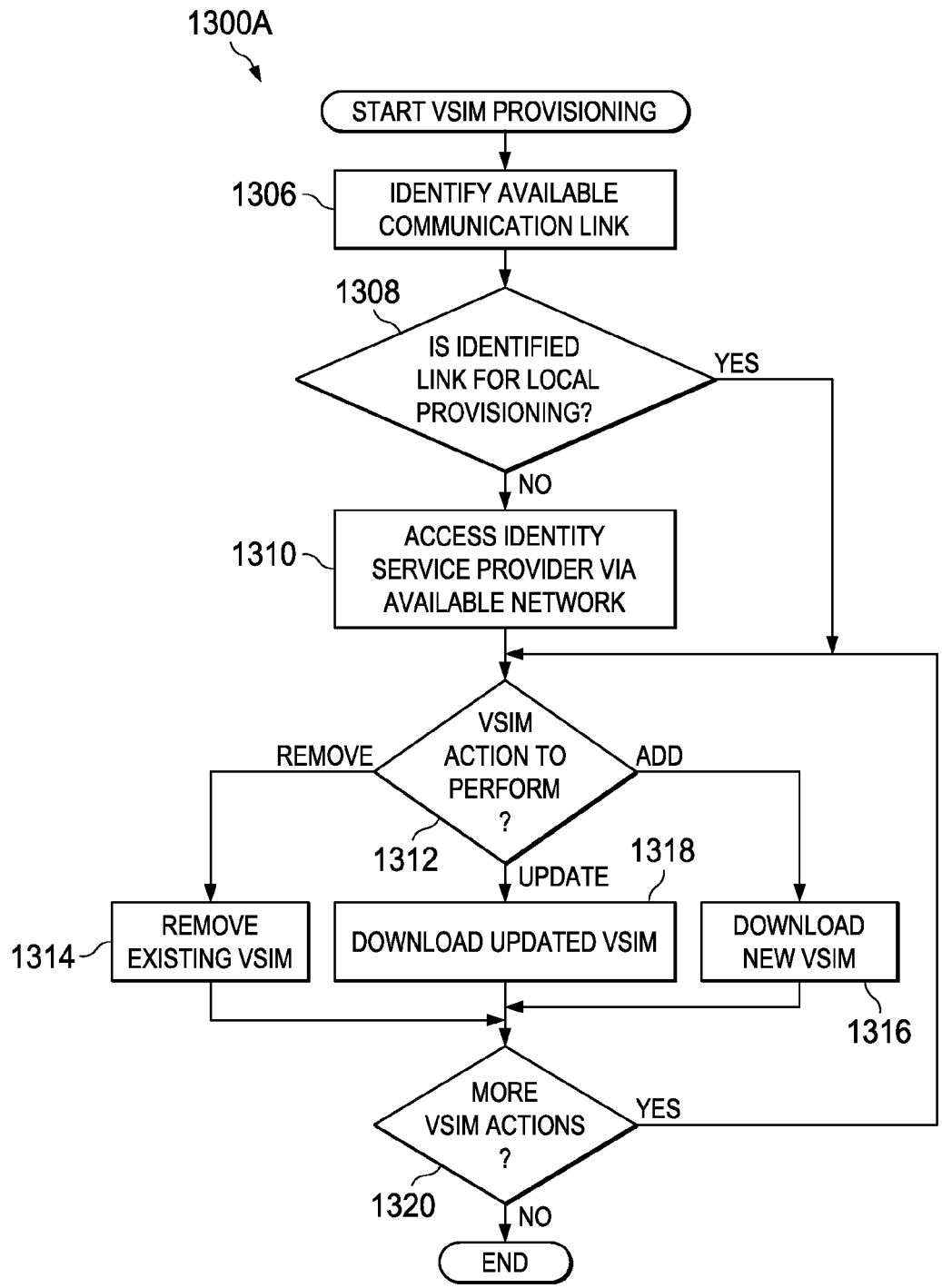
Figure 13B:
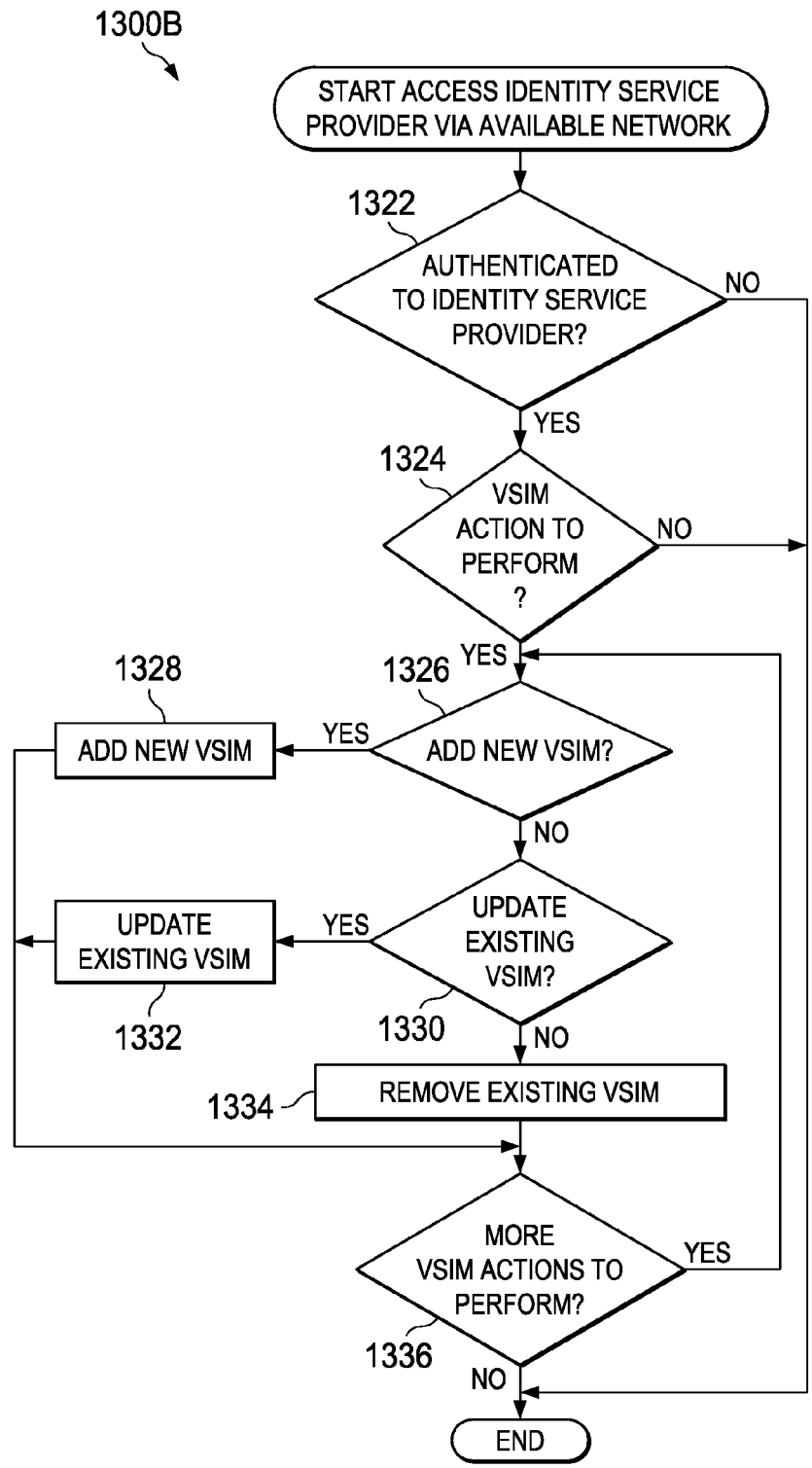

Turning to FIGS. 13A and 13B, simplified flowcharts of a VSIM provisioning flow 1300A and an identity service provider access flow 1300B, respectively, are illustrated. VSIM provisioning flow 1300A may represent at least a portion of the flow of VSIM provisioning module 73 of OBU 30. In one embodiment, flow 1300A can be invoked during authentication to vehicle flow 1100 and also at any time during which an agent is authenticated to OBU 30.

Flow begins at step 1306 where an available communication link is identified. Various communication links may be used to provision a VSIM, including some form of wireless communication (e.g., WiFi, WiMAX, 3G, 4G, LTE, white space, 802.11x, satellite, etc.) to connect to identity service provider 60, a local network within vehicle 4 (e.g., local WiFi, Bluetooth, Ethernet, etc.) to connect to a mobile device, or a direct connection to a transportable medium (e.g., USB, CD, etc.). Flow passes to decision box 1308 to determine whether the identified link is for local provisioning. If the identified communication link is not for local provisioning, then flow passes to step 1310 to access identity service provider 60 via an available network. Example processing of identity service provider 60 will be described in more detail herein with reference to FIG. 13B.

When a network connection has been established to identity service provider 60 in 1310, or if the available communication link was identified for local provisioning, flow passes to decision box 1312. In decision box 1312, a determination is made with regard to what VSIM action to perform. If a VSIM is to be removed from OBU 30, then flow passes to step 1314 to remove the VSIM. If a VSIM on OBU 30 is to be updated, then flow passes to step 1318 to download a VSIM using the identified communication link (e.g., from identity service provider 60, from a transportable storage medium directly connected to OBU 30, from a mobile device) to update an existing VSIM.

Finally, if a new VSIM is to be added to OBU 30, flow passes to 1316 to download the new VSIM using the identified communication link (e.g., from identity service provider 60, from a transportable storage medium directly connected to OBU 30, from a mobile device). Once the desired action (i.e., remove, update, or add) has been performed, flow passes to decision box 1320 to determine whether more VSIM actions are to be performed. If more VSIM actions are to be performed, then flow passes back to decision box 1312 to repeat the determination of whether to remove, update, or add a VSIM and to perform the desired action accordingly. This processing may continue until all VSIM actions have been completed. In one embodiment, an agent may be associated with multiple VSIMs provisioned in OBU 30. Therefore, multiple VSIM actions may occur during a single VSIM provisioning process.

Turning to FIG. 13B, a simplified flowchart illustrates possible processing steps of identity service provider 60 providing identity services for managing VSIMs, including accessing and downloading VSIMs to connected vehicles. As previously described herein, VSIMs may be managed and stored by identity service provider 60 in a memory element such as VSIM database 64. Flow 1300B will be described with reference to a user, which includes a human provisioning the VSIM for any type of agent (e.g., software agent, machine device, authorized entity, human agent), including provisioning the VSIM for himself as a human agent. Flow could start at decision box 1322, where a determination is made as to whether the user accessing identity service provider 60 has been authenticated to the identity service provider. For example, the user may log on to an account created with identity service provider 60. If the user is not authenticated, then flow ends. Although not shown in FIG. 13B, the user could potentially create a new account with identity service provider 60.

If the user is authenticated to identity service provider 60, then flow passes to decision box 1324 to determine whether there is a VSIM action to perform. If, for example, a VSIM was previously created by the user (e.g., a user on a computer or mobile device creating a VSIM through identity service provider 60), then the user may simply need to access and download the existing VSIM to OBU 30. However, if the user needs to create, update, and/or remove a VSIM, then flow passes to decision box 1326 to determine whether to add a new VSIM to OBU 30. If a request is made to add a new VSIM (e.g., to VSIM database 64), then flow passes to step 1328 to add the new VSIM. If adding a new VSIM is not requested, as determined in decision box 1326, then flow passes to decision box 1330 to determine whether a request was made to update an existing VSIM. If an update request was made, then flow passes to step 1332 where an existing VSIM is updated. If an update request is not made, as determined in decision box 1330, however, then the flow passes to step 1334 where an identified VSIM is removed.

After a VSIM is either added (1328), updated (1332), or removed (1334), flow passes to decision box 1336 where it is determined whether there are more VSIM actions to perform. If more VSIM actions are requested, then flow passes back to decision box 1326 and steps 1326 through 1336 continue to be processed until no more VSIM actions are requested. Once no more VSIM actions are requested, or after it is determined that there are no VSIM actions to perform, then the connection to identity service provider 60 from OBU 30 may continue until one or more VSIMs are downloaded to OBU 30. In addition, it will be apparent that flow 1300B may also occur when a user establishes a network connection to identity service provider 60 from a remote computer or mobile device to manage his associated VSIMs.

Figure 14A:
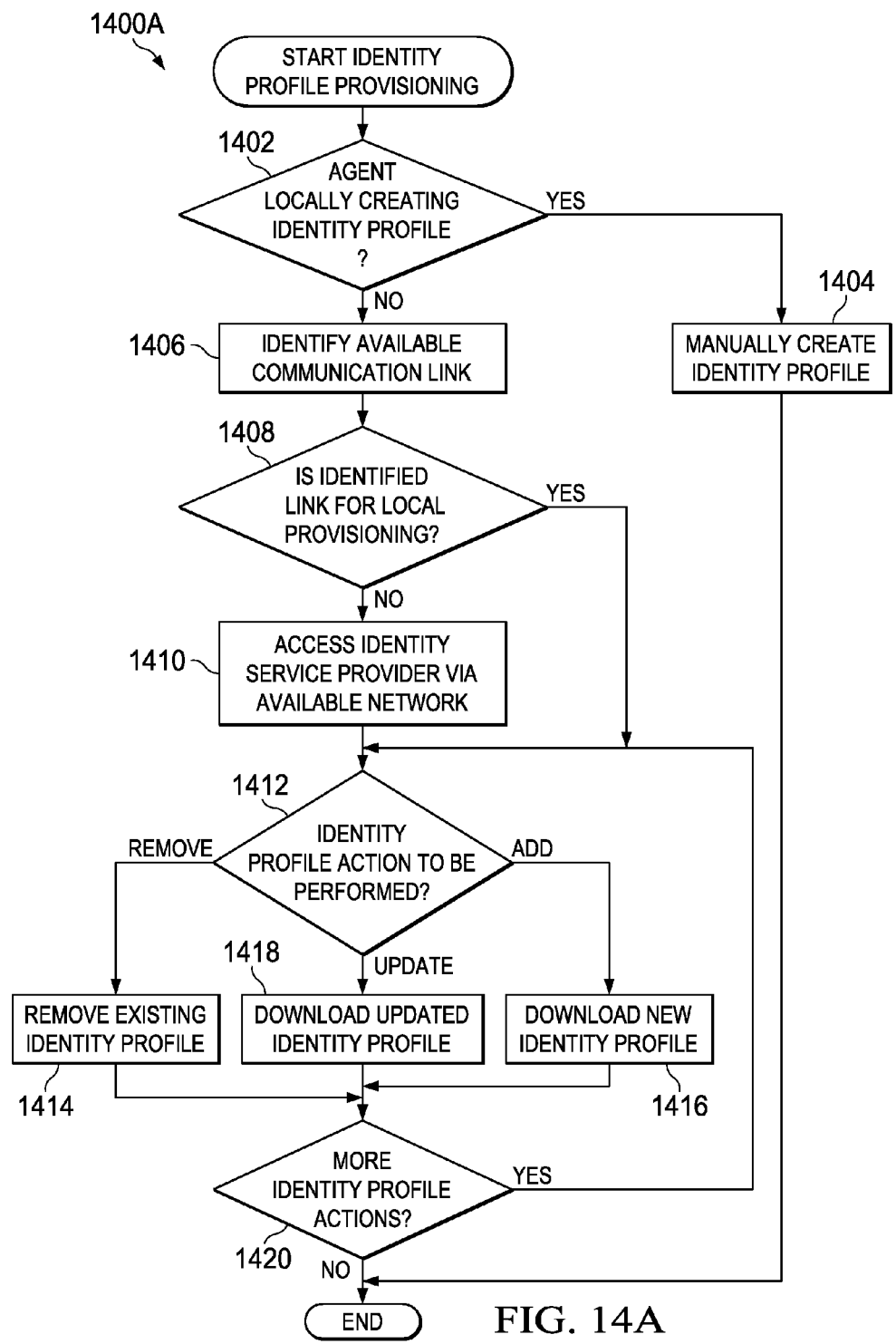
Figure 14B:
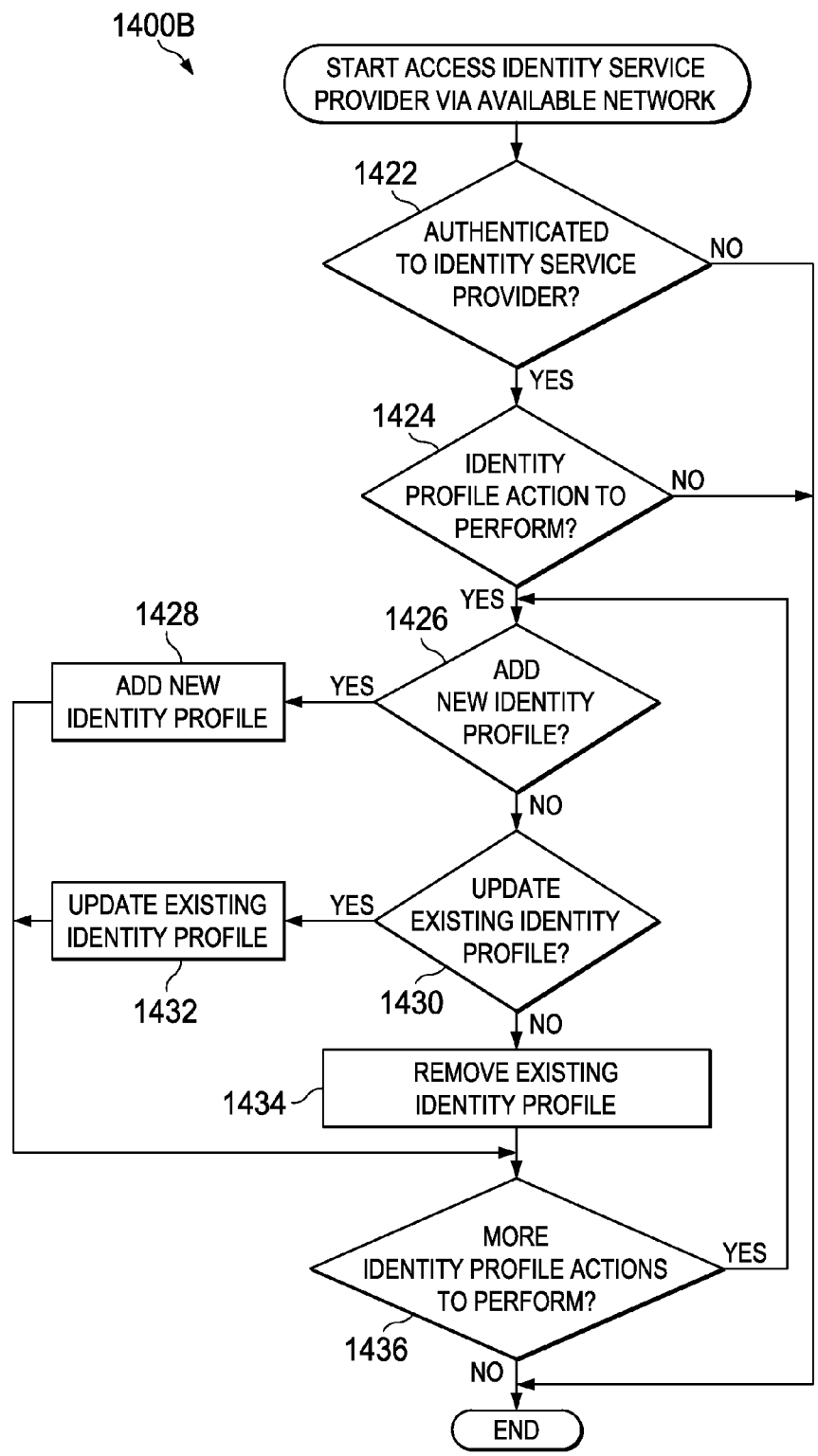

Turning to FIGS. 14A and 14B simplified flowcharts of an identity profile provisioning flow 1400A and another identity service provider access flow 1400B, respectively, are illustrated. Identity profile provisioning flow 1400A may represent at least a portion of the flow of identity profile provisioning module 75 of OBU 30. In one embodiment, flow 1400A can be invoked during authentication to vehicle flow 1100, and also at any time during which an agent is authenticated to OBU 30.

The flow of FIG. 14A begins at decision box 1402 where a determination is made as to whether an agent is locally creating an identity profile. In one embodiment, an agent can manually create an identity profile on OBU 30 by entering profile information directly into OBU 30 through an appropriate user interface. If the agent is locally creating an identity profile, then flow passes to step 1404 where the agent is permitted to manually create an identity profile, and then flow ends.

If it is determined that the agent is not locally creating an identity profile, then flow passes to step 1406 where an available communication link is identified. Various communication links may be used to provision a identity profile, including some form of wireless communication (e.g., WiFi, WiMAX, 3G, 4G, LTE, white space, 802.11x, satellite, etc.) to connect to identity service provider 60, a local network within vehicle 4 (e.g., local WiFi, Bluetooth, Ethernet, etc.) to connect to a mobile device, or a direct connection to a transportable medium (e.g., USB, CD, etc.). If the identified communication link is not for local provisioning, then flow passes to step 1410 to access identity service provider 60 via an available network. Example processing of identity service provider 60 will be described herein in more detail with reference to FIG. 14B.

When a network connection has been established to identity service provider 60 in step 1410, or if the available communication link was identified for local provisioning, flow passes to decision box 1412. In decision box 1412, a determination is made with regard to what identity profile action to perform. If an identity profile is to be removed from OBU 30, then flow passes to step 1414 to remove the identity profile. If an identity profile on OBU 30 is to be updated, then flow passes to step 1418 to download a identity profile using the identified communication link (e.g., from identity service provider 60, from a transportable storage medium directly connected to OBU 30, or from a mobile device) to update an existing identity profile. Finally, if a new identity profile is to be added to OBU 30, flow passes to step 1416 to download the new identity profile using the identified communication link (e.g., from identity service provider 60, from a transportable storage medium directly connected to OBU 30, or from a mobile device).

Once the desired action (i.e., remove, update, or add) has been performed, flow passes to decision box 1420 to determine whether more identity profile actions are to be performed. If more identity profile actions are to be performed, then flow passes back to decision box 1412 to repeat the determination of whether to remove, update, or add a identity profile and to perform the desired action accordingly. This processing may continue until all identity profile actions have been completed.

Turning to FIG. 14B, a simplified flowchart illustrates possible processing steps of identity service provider 60 providing identity services for managing identity profiles, including accessing and downloading identity profiles to connected vehicles. As previously described herein, identity profiles may be managed and stored by identity service provider 60 in a memory element such as identity profile memory element 62. Flow 1400B will be described with reference to a user, which includes a human provisioning the identity profile for any type of agent (e.g., software agent, machine device, authorized entity, human agent), including provisioning the identity profile for himself as a human agent. Flow could start at decision box 1422, where a determination is made as to whether the agent accessing identity service provider 60 has been authenticated to the identity service provider. For example, the user may log on to an account created with identity service provider 60. If the user is not authenticated, then flow ends. Although not shown in FIG. 14B, the user could potentially create a new account with identity service provider 60.

If the user is authenticated to identity service provider 60, then flow passes to decision box 1424 to determine whether there is an identity profile action to perform. If, for example, an identity profile was previously created by the user (e.g., a user on a computer or mobile device creating an identity profile through identity service provider 60), then the user may simply need to access and download the existing identity profile to OBU 30. However, if the user needs to create, update, and/or remove an identity profile, then flow passes to decision box 1426 to determine whether to add a new identity profile to OBU 30. If a request is made to add a new identity profile (e.g., to identity profile database 64), then flow passes to step 1428 to add the new identity profile. If adding a new identity profile is not requested, as determined in decision box 1426, then flow passes to decision box 1430 to determine whether a request was made to update an existing identity profile. If an update request was made, then flow passes to step 1432 where an existing identity profile is updated. If an update request is not made, as determined in decision box 1430, however, then the flow passes to step 1434 where an identified identity profile is removed.

After an identity profile is either added (step 1428), updated (step 1432), or removed (step 1434), flow passes to decision box 1436 where it is determined whether there are more identity profile actions to perform. If more identity profile actions are requested, then flow passes back to decision box 1426 and steps 1426 through 1436 continue to be processed until no more identity profile actions are requested. Once no more identity profile actions are requested, or after it is determined that there are no identity profile actions to perform, then the connection to identity service provider 60 from OBU 30 may continue until one or more identity profiles are downloaded to OBU 30. In addition, it will be apparent that flow 1400B may also occur when a user establishes a network connection to identity service provider 60 from a remote computer or mobile device to manage his identity profiles.

Figure 15:
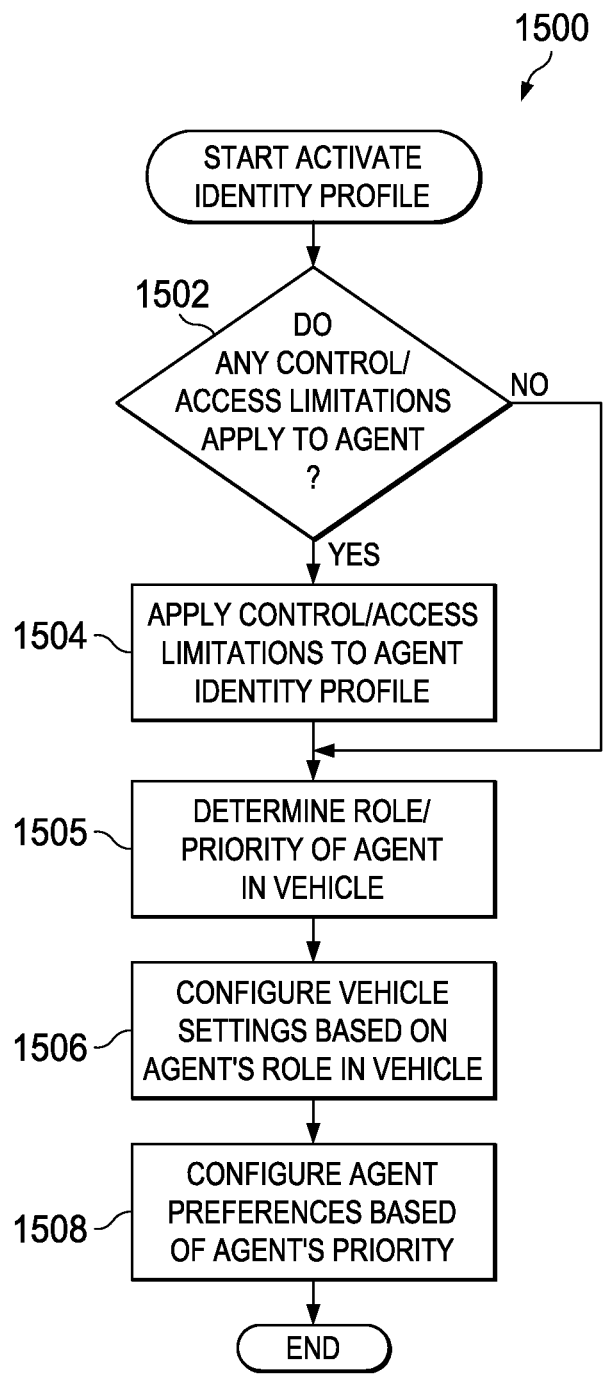

FIG. 15 illustrates a simplified flowchart of example steps for activating an identity profile, as indicated in step 1010 of FIG. 10, after the identity profile has been provisioned in OBU 30 and an associated agent has been authenticated to OBU 30. For example, flow may begin in decision box 1502 where a determination is made regarding whether any control/access limitations have been set by one agent that applies to another agent. Typically, an owner of the vehicle or other superagent will have authority to set such controls/access limitations by configuring policies through an appropriate policy module. Such controls/access limitations may include, for example, parental controls set by a parent of a child (e.g., restrictions on certain web content, media features, any transactions involving credit cards or payments, vehicle functions, etc.). If control/access limitations exist, then flow passes to step 1504 to apply such control/access limitations to the identity profile of the agent.

After the limitations are applied, or if no limitations exist for the agent, then flow may pass to step 1505 to determine the role and priority of the agent in the vehicle. For human agents, role can be determined based on which seat of the vehicle the agent occupies (e.g., driver seat, front passenger seat, rear left passenger seat, rear right passenger seat, etc.). Once the role and priority of the agent are determined, flow passes to step 1506 to configure the vehicle settings based on the agent's role in the vehicle. Depending on the role of the agent, OBU 30 may communicate the agent's identity profile parameters corresponding to actuators and software applications of the particular seat occupied by the agent. For example, seat positioning, air temperature settings, seat heater/cooler, dashboard features, and the like may be configured for the agent if the agent is the driver. If the agent is a passenger, however, the seat positioning, seat heater/cooler, and temperature settings may be applied to the agent's particular passenger seat, if such settings are available for the passenger seat.

Once the vehicle settings are applied in step 1506, flow may pass to step 1508 to configure other identity profile parameters based on an agent's priority. Depending on the agent's priority, OBU may communicate the agent's identity profile parameters corresponding to any appropriate actuators, software applications, and the like related to agent preferences (e.g., radio channel list, phonebook, address book, GPS favorite locations, etc.). For purposes of illustration, it is assumed that a driver has highest priority and driver preferences can override any conflicting passenger preferences. It should be understood, however, that a passenger could be configured with a higher priority and override the driver's preferences for preferences not pertaining to the safety of the vehicle. Additionally, OBU 30 may also configure network interface accounts and network configurations for other mobile devices identified in the agent's identity profile (e.g., in a device list). Moreover, while examples have been provided for human agents, activating an identity profile of other types of agents authenticated to the OBU may also occur for any appropriate identity profile parameters in an authenticated agent's identity profile.

Figure 16:
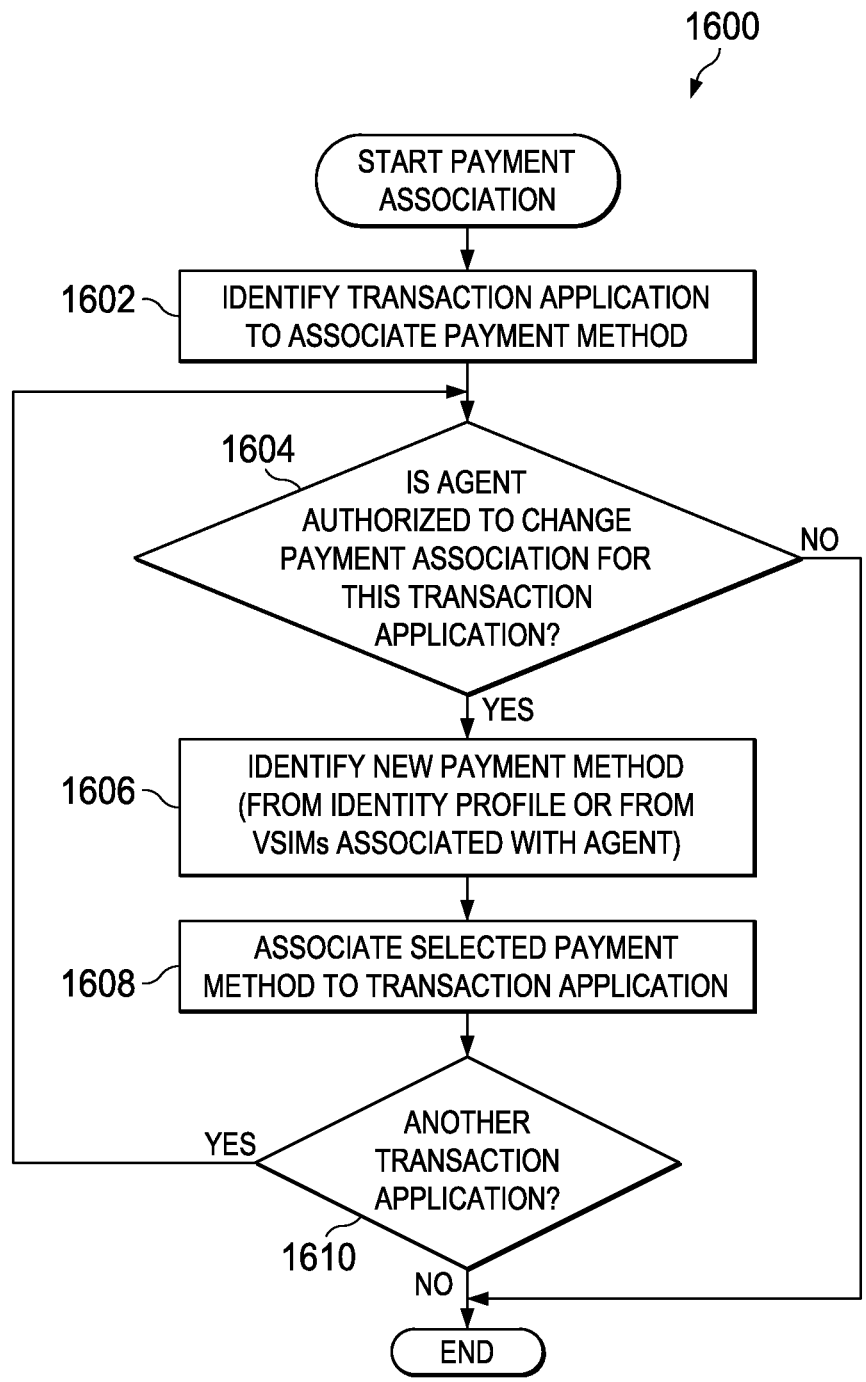

FIG. 16 illustrates a simplified flowchart of example steps of payment association module 79, for associating a payment method to certain transaction applications that are not associated with or initiated by an agent that has an associated payment method (e.g., payment information in identity profile, VSIM). For example, if a toll payment transaction application is configured to pay tolls automatically, then a payment method needs to be associated with the toll payment transaction application. The payment method could be payment information such as a credit card or bank account from an agent's identity profile, or a VSIM to be used as payment on a back end of the corresponding mobile network operator. In addition, over the life of the vehicle, changes to the payment methods associated with such transaction applications may be desired (e.g., each driver of a vehicle owned by a rental car agency may be required to pay their own tolls, a new owner will need to associate a new payment method with such vehicle transaction applications, an owner of a vehicle may have a credit card or banking account change that needs to be updated, someone borrowing a car or sharing trip expenses may want to pay for all certain transactions through a payment method provided in their identity profile, etc.)

Generally, payment association flow 1600 of FIG. 16 represents both automatic and manual payment association to transaction applications. Flow 1600 may be invoked when an agent is being provisioned, as indicated in step 1014 of FIG. 10, or at any time during which an agent is authenticated to the vehicle. In the scenario in which the agent is being provisioned, flow 1600 may occur automatically and, depending on the role and priority of the agent, may automatically associate the agent's payment methods to the identified one or more transactions. In another scenario in which the agent has already been provisioned and authenticated to the vehicle, then flow 1600 may be invoked by the agent through an appropriate user interface of OBU 30 in which the agent may individually or collectively identify which transaction applications to associate with which payment methods.

Flow begins in step 1602 where a transaction application is identified. The identified transaction application may be an application that is not associated with or initiated by an agent that has an associated payment method. Flow then passes to decision box 1604 where a determination is made as to whether the agent attempting to make the payment association is authorized to change payment association for the identified transaction application (e.g., if the agent is being provisioned but is not the driver then the agent may not be authorized, if policies do not allow the agent to change payment associations then the agent will not be authorized, etc.). If the agent is not authorized as determined in decision box 1604, then flow 1600 ends and payment associations are not made.

If is determined in decision box 1604 that the agent is authorized to change payment association for the identified transaction application, then flow passes to step 1606. In step 1606, a new payment method is identified from the agent's identity profile payment information or from the agent's corresponding VSIM. The agent's identity profile payment information may include information for a credit card, a debit card, a bank account, or other payment service providers. Alternatively, a VSIM associated with the agent could be used to provide payment. The VSIM could be used to connect to the associated mobile network operator, the payment could be received from the mobile network operator, and then the mobile network operator could bill the agent on the back end (e.g., with a set periodic or stand-alone bill to the agent). In a manual process of payment association, the agent can simply be provided with suitable options to select a desired payment method from options associated with the agent. In the automatic payment association, however, priority of available payment options can be pre-specified in any suitable way (e.g., an indication provided in the identity profile, etc.).

Once the payment method is determined in step 1606, flow passes to step 1608 to associate the selected payment method to the identified transaction application. In one embodiment, a separate mapping database may be provided to map identified transaction applications to selected payment methods. In another embodiment, an existing mapping database, such as transaction-to-agents mapping database 82, may be used and may include any suitable mechanism (e.g., pointer, link list, additional field, etc.) to indicate which agent to select to retrieve an associated payment method for the transaction application.

After the selected payment method is associated to the identified transaction application, flow passes to decision box 1610 to determine whether another transaction application has been identified. If another transaction application has been identified (e.g., parking transaction application), then flow passes back to decision box 1604 to process the newly identified transaction application. Steps 1604 through 1610 can be repeated until no more transaction applications are identified, and flow ends.

Figure 17:
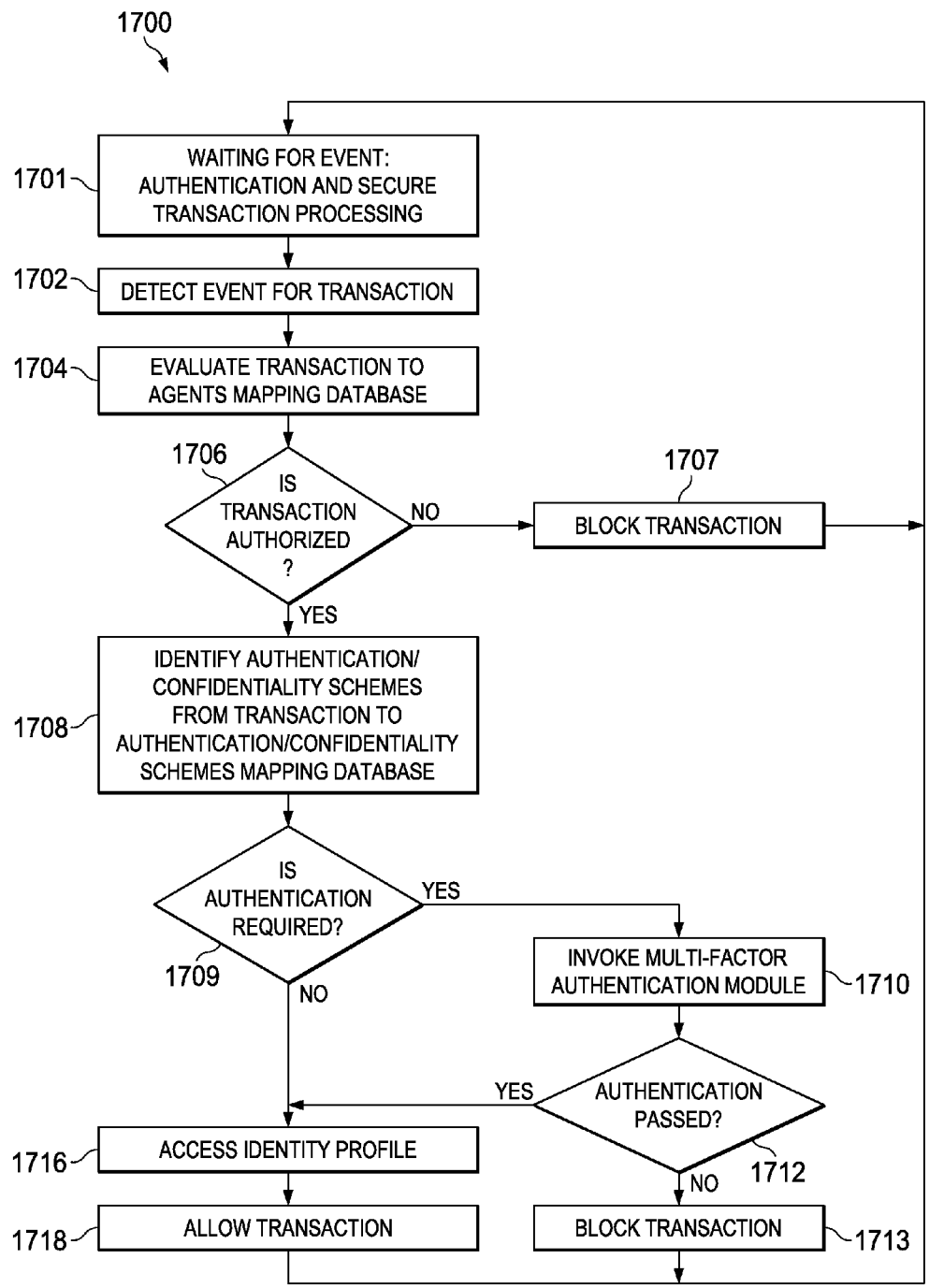
Figure 18:
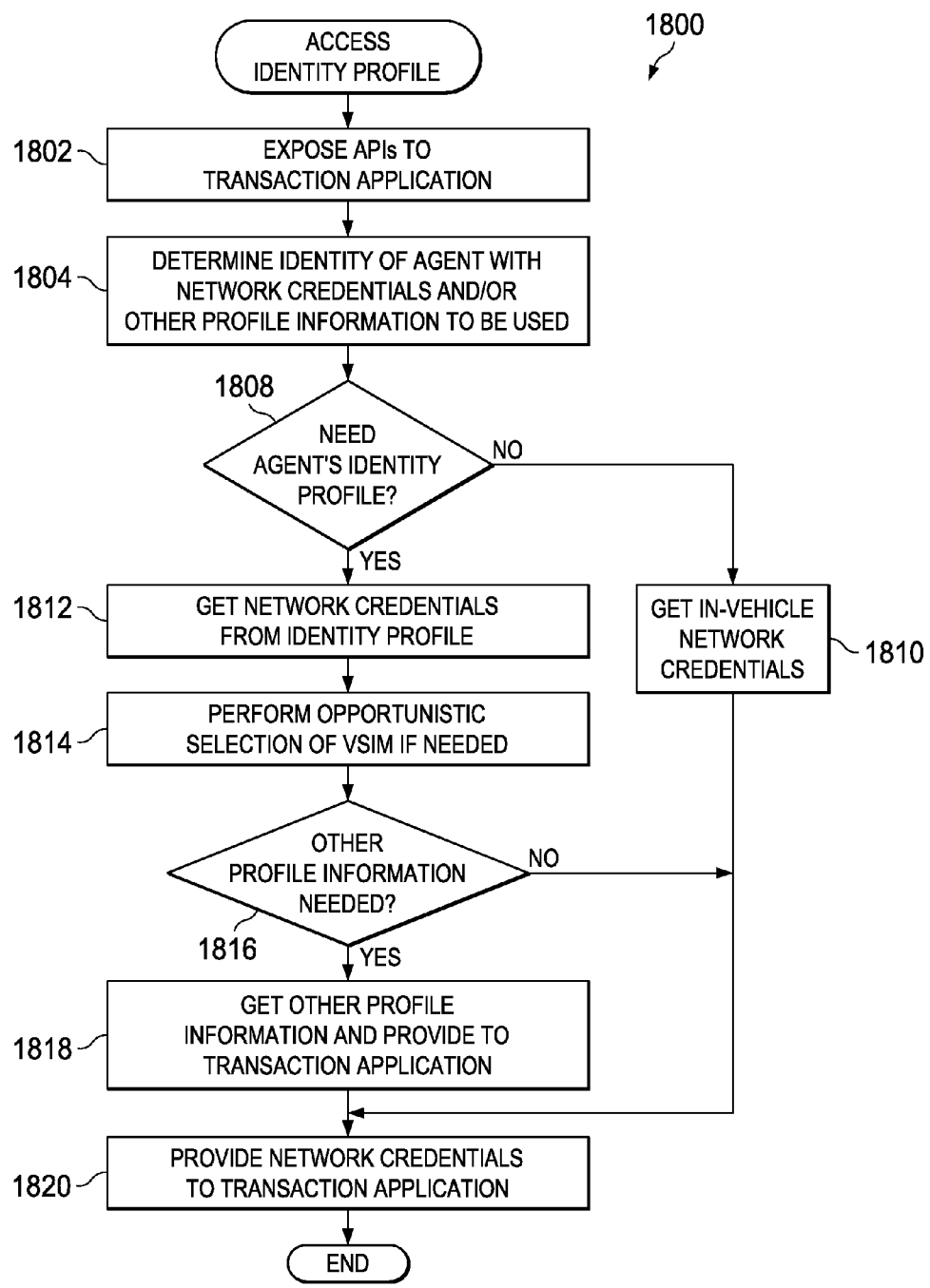

Turning to FIGS. 17 and 18, simplified flowcharts with an authentication and secure transaction flow 1700 and an identity profile access flow 1800 are illustrated. Authentication and secure transaction flow 1700 may be configured as a background process open and running whenever OBU 30 is booted up. Flow starts at step 1701 where the process waits for an event for a transaction, which could have a trigger associated with an agent to initiate the transaction. Triggers could include, for example, a human agent attempting to initiate a transaction (e.g., by pressing a button or otherwise issuing commands through any suitable user interface on display 28, by using a mobile device to access OBU 30), a machine device receiving or transmitting a signal (e.g., a detector receiving a signal from a toll system, a detector receiving a signal from a parking system, a sensor in the vehicle sending a signal to OBU 30, etc.), a software agent attempting to execute (e.g., requesting network credentials to automatically connect to an authorized entity, etc.), or an authorized entity attempting to access OBU 30 (e.g., authorized entity connected to the vehicle and attempting to access transaction applications on the vehicle, etc.).

When an event occurs, the event is detected in step 1702 and then flow moves to step 1704 to evaluate transaction-to-agents mapping database 82. In decision box 1706, a determination is made as to whether the transaction is authorized. If the mapping database 82 does not indicate the transaction is authorized (e.g., the agent is not mapped to a transaction application corresponding to the transaction), then flow passes to 1707 where the transaction is blocked. Flow then passes back to step 1701 to wait for another event.

If transaction-to-agents mapping database 82 indicates the transaction is authorized (e.g., the agent is mapped to a transaction application corresponding to the transaction), as determined in decision box 1706, then flow may pass to step 1708 to identify authentication and confidentiality schemes by evaluating transaction-to-authentication/confidentiality-schemes mapping database 84. Mapping database 84 may include which transactions require authentication of the associated agent. Although the agent should already be provisioned and authenticated to the vehicle when transaction processing occurs, some transactions may be of a sensitive nature, and authentication can be provided again. In addition, in one embodiment, initial authentication to the vehicle may be provided with a single authentication requirement, whereas authentication to conduct certain transactions may require multiple authentication requirements as indicated in agent-to-multi-factor-authentication mapping database 83 and transaction-to-authentication-and-confidentiality-schemes mapping database 84. For example, access to a banking transaction application that facilitates transactions to personal bank accounts of agents, may require re-authenticating the agent with multiple authentication requirements (e.g., biometrics in addition to a key fob used to initially authenticate to OBU 30). In addition, mapping database 84 may also indicate other authentication and confidentiality schemes to be used by a transaction application such as, for example, a particular encryption mechanism for data associated with the transaction application. Additionally, any authentication protocols required for establishing network connections may also be provided in mapping database 84.

After authentication and confidentiality schemes are identified in step 1708, flow passes to decision box 1709 to determine whether agent authentication is required for the transaction. In one embodiment, if authentication is required, then multifactor authentication module 74 may be invoked in step 1710, as previously discussed. If multi-factor authentication is required, the agent could be mapped to one or more of the same or different authentication requirements used during the initial authentication of the agent to OBU 30. Thus, multifactor authentication flow could be configured to distinguish between initial authentication of an agent to OBU 30 and authentication of an agent for particular transactions. If the agent does not pass authentication as determined in decision box 1712, then flow passes to step 1713 where the transaction is blocked. Flow then passes back to step 1701 to wait for another event.

If the agent passes authentication, as determined in decision box 1712, or if authentication of the agent was not required, as determined in decision box 1709, then flow passes to step 1716 in which the identity profile may be accessed to obtain network credentials and any other needed profile information such as payment information for commercial transactions. Accessing the identity profile will be described in more detail herein with reference to FIG. 18. After the network credentials and any needed profile information are provided to the transaction application in step 1716, flow passes to step 1718 to allow the transaction. Flow then returns to step 1701 to wait for another event. Although transactions can be processed by transaction processing flow 1700 sequentially, it can be apparent that transaction processing flow 1700 is intended to initiate each time an event is detected, which can occur simultaneously with other events. Thus, multiple transactions may be occurring on OBU 30 simultaneously.

Turning now to FIG. 18, FIG. 18 illustrates a simplified flowchart of an access identity profile flow 1800, which may occur in step 1716 of FIG. 17. Flow 1800 includes step 1802 where application programming interfaces (APIs) are exposed to a transaction application corresponding to the transaction to enable the transaction application to securely access relevant parts of the identity profile. APIs may be provided to export parts of the identity profile to the transaction application to the extent that the transaction application is authorized to access the profile information. (e.g., credit/payment information, social media web accounts, etc.)

Flow then moves to step 1804 to determine the identity of the agent to be used to provide network credentials and/or other profile information such as payment information. In a simple case, a human agent who initiates a commercial transaction by triggering an Internet commerce transaction application on OBU 30 may have an identity profile that can be used to obtain network credentials and payment information. In other transaction scenarios, however, the agent associated with the event may not have payment information and/or network credentials. Therefore, the determination in step 1804 accommodates certain transaction applications that need profile information from an agent other than the agent associated transaction. For example, a driver or other passenger may want to pay for toll transactions that occur automatically when a detector (agent) senses the toll system and initiates a toll transaction application. Therefore, the identity of the particular agent with the payment information needs to be determined. This can be accomplished in various ways including, for example, a display screen offering a human agent the option to pay the toll using identity profile information. Alternatively, a human agent could preconfigure the payment information through, for example, payment association module 79.

Once the determination is made in step 1804, flow passes to decision box 1808 to determine whether the identity profile of the agent is needed. In some transaction scenarios, network credentials for remote network access (e.g., VSIM, WiFi, etc.) may not be required for a transaction application. For example, a transaction application merely accessing in-vehicle networks and having no commercial component may not need any identity profile information. In this case, flow passes to step 1810 to get network credentials for in-vehicle networks, if the transaction application accesses an in-vehicle network. Flow then passes to step 1820 to provide the in-vehicle network credentials to the transaction application, if needed.

If the identity profile is needed for a transaction application requiring remote network access or a transaction application occurring internally (e.g., not requiring remote network access), as determined in decision box 1808, then flow passes to step 1812. In step 1812, network credentials are obtained from identity profile, if needed. Flow may then pass to step 1814 to perform opportunistic selection of VSIM, if needed, which will be further described herein with reference to FIG. 19. Opportunistic selection of VSIM may be needed if VSIM selection rules apply to the particular agent, the transaction application, and/or vehicle geographical location. Steps 1812 and 1814 may not be necessary if the transaction application does not need remote network access.

After the VSIM is selected, then flow passes to decision box 1816 to determine whether other profile information is needed from the agent's identity profile. Other information includes, for example, payment information, which could be appropriate if the transaction application has a commercial component. If other profile information is needed, then flow passes to step 1818 to get the other profile information and provide such information to the transaction application. Finally, after the profile information is provided to the transaction application in step 1818, or if other profile information is not needed as determined in decision box 1816, flow passes to step 1820 to provide any obtained network credentials, including the VSIM, to the transaction application.

Figure 19:
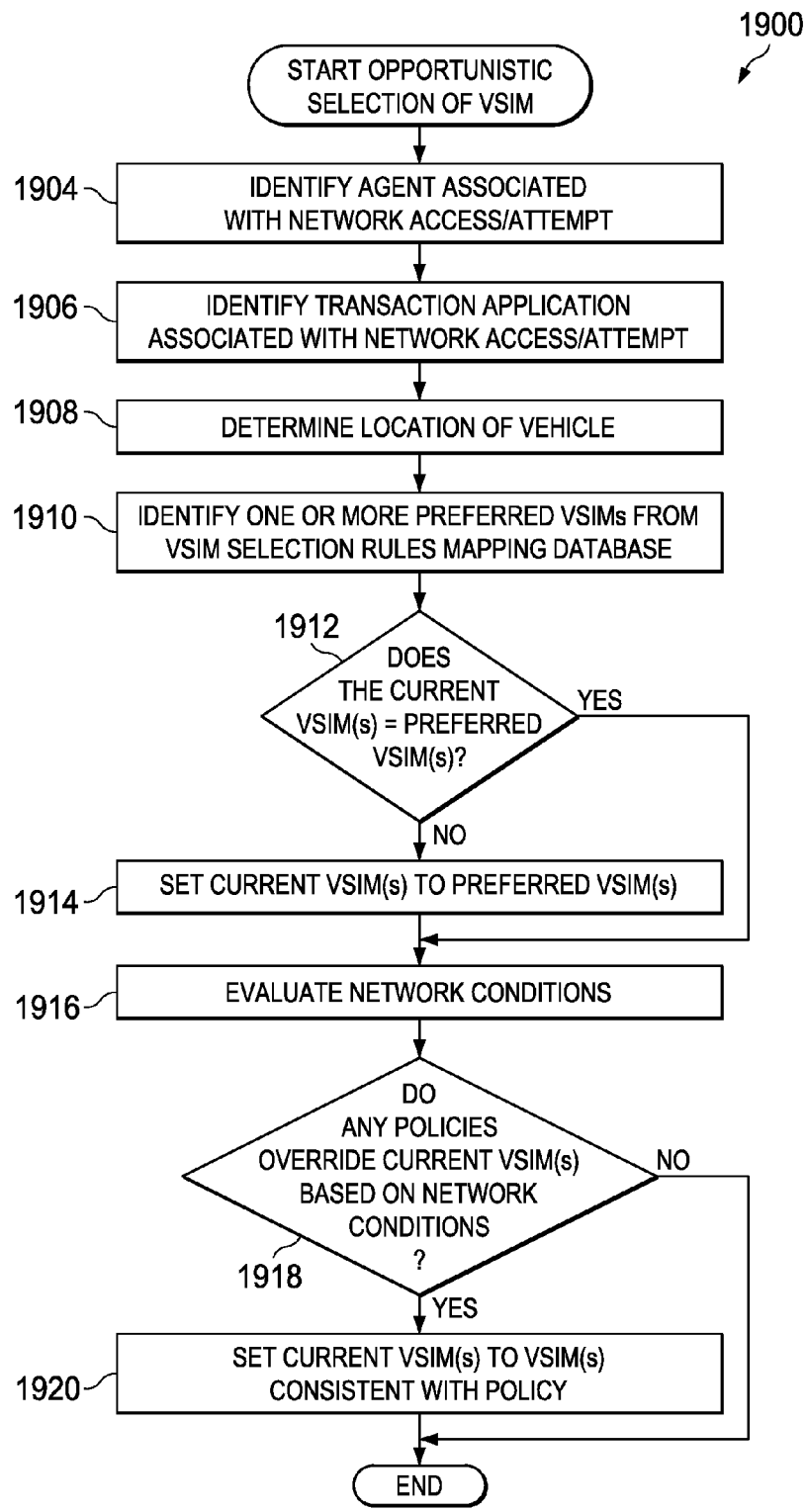

FIG. 19 is a simplified flowchart of an opportunistic VSIM selection flow 1900. Because a vehicle may (at any given time) use multiple VSIMs, the VSIMs may be opportunistically selected for better connectivity, for different traffic and application types, for different locations, and for a better user experience. In one embodiment, opportunistic VSIM selection flow 1900 dynamically evaluates VSIM selection rules database 85 to determine whether a particular VSIM selected for connectivity is the preferred VSIM for a particular set of criteria (e.g., agent identity, location of the vehicle, transaction application). If the set of criteria is mapped to a different VSIM than a currently selected VSIM, then the VSIM can be dynamically changed to accommodate the agent or vehicle owner's preferences. Opportunistic VSIM selection flow 1900 may occur when a transaction has been initiated and a corresponding transaction application is waiting for network credentials, or during an established network connection associated with a transaction application. Although FIG. 19 is described with reference to opportunistically selecting a VSIM, it can be appreciated that other wireless connection options (e.g., WiFi, etc.) may also be opportunistically selected and may be mapped to particular sets of criteria.

Flow may begin in steps 1904 through 1908 where the set of criteria are determined. In 1904, an agent associated with the network access/attempt may be identified. In step 1906, a transaction application associated with the network access/attempt may be identified. Finally, in step 1908, a current location of the vehicle may determined (e.g., by navigation system 17). Flow then passes to step 1910 where one or more preferred VSIMs are identified from VSIM selection rules mapping database 85. In decision box 1912, a determination is made as to whether the current VSIM(s), which could include one or more VSIMs, are equivalent to the preferred VSIM(s) identified from VSIM selection rules mapping database 85. When opportunistic VSIM selection flow 1900 is processing to evaluate an established network connection associated with a transaction application, the current VSIM(s) could be one or more VSIMs currently being used for the established network connection. However, when opportunistic VSIM selection flow 1900 is processing during identity profile access flow 1800 at step 1814, then the current VSIM(s) could be one or more VSIMs selected from an identity profile for a transaction application waiting to receive network credentials. If the preferred VSIM(s) are different from the current VSIM(s), then the flow passes to 1914 where the current VSIM(s) are changed to the preferred VSIM(s). In the case of an established network connection, the network connection may be moved to network access links enabled by the preferred VSIM(s).

After the current VSIM(s) are changed to the preferred VSIM(s) in step 1914, or if the current VSIM(s) are equivalent to the preferred VSIM(s) as determined in decision box 1912, then flow passes to step 1916 to evaluate network conditions. In the next decision box 1918, a determination is made as to whether any policies override the current VSIM(s) because, in one embodiment, various network conditions and policies related to such network conditions may override a VSIM preference. For example, a VSIM preference based on a particular location, such as a preference for using mobile network operator X in New York because it is more cost effective than using mobile network operator Y, may be overridden if the network conditions of mobile network operator X are not suitable. Similarly, multiple VSIMs, or a VSIM associated with another agent may be selected, depending on network conditions and authorization to use the other agent's network credentials. Thus, if policies based on network conditions override the current VSIM(s), then flow passes to step 1920 where the current VSIM(s) are changed to one or more VSIMs consistent with the policy. After the current VSIM(s) are changed in step 1920, or if policies and network conditions did not require a change to the current VSIM(s) as determined in decision box 1918, flow ends, and the associated transaction application may establish a network connection using the current VSIM(s) or may continue network access with the current VSIM(s), as appropriate.

By using the infrastructure described above, a connected vehicle can opportunistically switch between multiple VSIM identities to allow for multiple identity profiles to be used during the vehicle's lifecycle. Thus, the infrastructure enables multiple agents to source communication from the vehicle. To illustrate these features, an example scenario will now be described of a possible lifecycle of a connected vehicle and identities associated with the connected vehicle.

In the beginning of the life of a vehicle (e.g., vehicle 4), a manufacturer of the vehicle may provision an OBU (e.g., OBU 30) configured within vehicle 4 with a physical UICC card that is initialized with an identity associated with the vehicle manufacturer, which can be used for authentication to download soft SIM or VSIM identities issued by mobile network operators. A software agent may also be provisioned in OBU 30 to connect to a desired an identity service provider 60 (e.g., third party identity service provider, mobile network operator, manufacturer identity service provider, etc.) to obtain the VSIM. For example, if vehicle 4 is manufactured in Japan, then software agent may use the manufacturer VSIM to authenticate vehicle 4 to the identity service provider, and then download a VSIM to be used during quality assurance testing before vehicle 4 is exported from Japan to an automotive dealer in the United States (U.S.).

After vehicle 4 is shipped and crosses an international border such as the U.S., the software agent can use manufacturer VSIM identity to download a VSIM of a local mobile network operator (e.g., Verizon, AT&T, T-Mobile, SPRINT, PCS, etc.), by accessing an identity service provider 60 through which the manufacturer has provisioned VSIMs. This may be desirable for the manufacturer to avoid expensive roaming charges. Thus, the manufacturer may be able to negotiate a better rate (e.g., for a particular area) with different mobile network operators at any time and simply update the associated VSIM on vehicle 4.

When a consumer purchases vehicle 4 from the automotive dealer and becomes an owner of vehicle 4, he may provision one or more different VSIMs on the OBU of vehicle 4 for his own network access. The owner may authenticate to a desired identity service provider 60 and download a desired one or more VSIMs to be used for connectivity (e.g., 3G, 4G, LTE) by the owner. The owner may also download an identity profile to allow personalization of contacts and various preferences provided in the identity profile, as previously described herein (e.g., personalized contacts, vehicle settings, payment methods, device lists, etc.). The owner may also configure authentication requirements to authenticate to vehicle 4 (e.g., set up as desired via key fob, user ID and password, biometrics, etc.).

If another member of the owner's family drives vehicle 4, another VSIM may be provisioned. The family member may authenticate to the same or different identity service provider and download his own one or more VSIMs, which could correspond to the same or different mobile network operators. In addition, a separate identity profile for the family member may also be downloaded to allow for personalization of preferences, subject to policies implemented by the owner or other superagent and subject to priorities related to the role of an agent at a particular time (e.g., driver vs. passenger). The family member may also configure authentication requirements, which could be provided in identity profile, in order to authenticate to vehicle 4 each time the family member is in the vehicle as a driver or a passenger.

Finally, if vehicle 4 is sold, the new owner can download his particular one or more VSIMs and/or identity profile from an appropriate identity service provider, and can create authentication requirements for authenticating to the vehicle. The VSIMs and identity profiles associated with the previous owner, any human agent associated with the previous owner, and any mobile devices may be removed from OBU 30. However, other identity profiles and VSIMs associated with agents such as authorized entities, machine devices, and software agents may remain on OBU 30, if appropriate.

In certain implementations and numerous examples provided herein, vehicle 10 is described with reference to an automobile. Communication system 10, however, is not limited to automobiles, but can be applied to a myriad of other types of vehicles (e.g., airplanes, boats, trains, etc.). It can be appreciated that the broad teachings disclosed herein are intended to include any type of vehicle (e.g., motorcycles, scooters, trains, railways, boats, Segways, etc.) used to move from one location to another location, including vehicles that are not designed to transport humans.

In certain example implementations, at least some portions of enabling secure transactions and flexible identity management activities outlined herein may be implemented in software. This could be inclusive of software provided in transaction security framework 70 of OBU 30 and in other modules and elements such as secure communication module 77. These elements and/or modules can cooperate with each other in order to perform the enabling secure transactions and flexible identity management activities as discussed herein. In other embodiments, one or more of these features may be implemented in hardware, provided external to these elements, or consolidated in any appropriate manner. For example, some of the processors associated with the various elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

Any of the memory items discussed herein should be construed as being encompassed within the broad term 'memory element.' Similarly, any of the potential processing elements, modules, and machines described in this Specification should be construed as being encompassed within the broad term 'processor.' Furthermore, OBU 30, and each separate component of OBU 30, may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that teachings of the present disclosure are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    maintaining a list of authorized devices;
    creating an association between a wireless device configured for operation by an end user and an onboard unit (OBU) element of a vehicle, which is provisioned in a vehicle;
    determining one or more authentication requirements associated with the wireless device to authenticate itself to the OBU element of the vehicle;
    after determining that the wireless device passes the one or more authentication requirements associated with the wireless device authenticating itself to the OBU element, establishing a control connection between the wireless device and the OBU element of the vehicle via a first port of the OBU element;
    after the control connection is established, providing a port number associated with a second port of the OBU element to the wireless device;
    establishing a command connection between the wireless device and the OBU element via the second port of the OBU element; and
    allowing access, by the wireless device through the command connection, to one or more resources associated with the vehicle.

2. The method of claim 1, wherein authentication of the wireless device occurs via a wired equivalent privacy (WEP) WiFi access point provided by the OBU element.

3. The method of claim 1, wherein authentication of the wireless device occurs via a radio-frequency identification (RFID) tag.

4. The method of claim 1, wherein the resources include a selected one of a group of resources, the group consisting of:
    a) a speaker;
    b) a display;
    c) a microphone; and
    d) a global positioning system (GPS) receiver.

5. The method of claim 1, wherein the command connection is used to exchange requests for particular data associated with the resources of the vehicle.

6. The method of claim 1, wherein the port number associated with the second port is provided to the wireless device in response to receiving a request from the wireless device on the first port for a new data channel.

7. The method of claim 1, further comprising:
after providing the port number associated with the second port to the wireless device, waiting to establish the command connection until a new connection request is received from the wireless device on the second port.

8. The method of claim 1, further comprising:
receiving heartbeat signals via the control connection from the wireless device at predefined intervals, wherein the heartbeat signals are received at least as long as the command connection is open.

9. The method of claim 1, further comprising:
negotiating with the wireless device, via the control connection, one or more new connections to be established on one or more ports other than the first port.

10. The method of claim 1, further comprising:
receiving a request from the wireless device via the command connection to change a parameter of one of the resources on the OBU element.

11. The method of claim 1, wherein the association is created when a local access network identifier provided by the OBU element is detected by the wireless device.

12. Logic encoded in non-transitory media that includes code for execution and when executed by a processor operable to perform operations comprising:
maintaining a list of authorized devices;
creating an association between a wireless device configured for operation by an end user and an onboard unit (OBU) element of a vehicle, which is provisioned in a vehicle;
determining one or more authentication requirements associated with the wireless device to authenticate itself to the OBU element of the vehicle;
after determining that the wireless device passes the one or more authentication requirements associated with the wireless device authenticating itself to the OBU element, establishing a control connection between the wireless device and the OBU element of the vehicle via a first port of the OBU element;
after the control connection is established, providing a port number associated with a second port of the OBU element to the wireless device;
establishing a command connection between the wireless device and the OBU element via the second port of the OBU element; and
allowing access, by the wireless device through the command connection, to one or more resources associated with the vehicle.

13. The logic encoded in non-transitory media of claim 12, wherein authentication of the wireless device occurs via one of:
a) a wired equivalent privacy (WEP) WiFi access point provided by the OBU element; or
b) a radio-frequency identification (RFID) tag.

14. The logic encoded in non-transitory media of claim 12, wherein the resources include a selected one of a group of resources, the group consisting of:
a) a speaker;
b) a display;
c) a microphone; and
d) a global positioning system (GPS) receiver.

15. The logic encoded in non-transitory media of claim 12, wherein the command connection is used to exchange requests for particular data associated with the resources of the vehicle.

16. The logic encoded in non-transitory media of claim 12, wherein the port number associated with the second port is provided to the wireless device in response to receiving a request from the wireless device on the first port for a new data channel.

17. The logic encoded in non-transitory media of claim 12, wherein the code, when executed by the processor, is operable to perform further operations comprising:
after providing the port number associated with the second port to the wireless device, waiting to establish the command connection until a new connection request is received from the wireless device on the second port.

18. The logic encoded in non-transitory media of claim 12, wherein the code, when executed by the processor, is operable to perform further operations comprising:
receiving heartbeat signals via the control connection from the wireless device at predefined intervals, wherein the heartbeat signals are received at least as long as the command connection is open.

19. The logic encoded in non-transitory media of claim 12, wherein the code, when executed by the processor, is operable to perform further operations comprising:
negotiating with the wireless device, via the control connection, one or more new connections to be established on one or more ports other than the first port.

20. The logic encoded in non-transitory media of claim 12, wherein the code, when executed by the processor, is operable to perform further operations comprising:
receiving a request from the wireless device via the command connection to change a parameter of one of the resources on the OBU element.

21. The logic encoded in non-transitory media of claim 12, wherein the association is created when a local access network identifier provided by the OBU element is detected by the wireless device.

22. A apparatus comprising:
an onboard unit (OBU) element of a vehicle, wherein the OBU element includes a memory element configured to store data and a processor operable to execute instructions associated with the data, wherein the processor and memory element cooperate such that the apparatus is configured to:
maintain a list of authorized devices;
create an association between a wireless device configured for operation by an end user and the OBU element of the vehicle;
determine one or more authentication requirements associated with the wireless device to authenticate itself to the OBU element of the vehicle;
after determining that the wireless device passes the one or more authentication requirements associated with the wireless device authenticating itself to the OBU element, establish a control connection between the wireless device and the OBU element of the vehicle via a first port of the OBU element;
after the control connection is established, provide a port number associated with a second port of the OBU element to the wireless device;
establish a command connection between the wireless device and the OBU element via the second port of the OBU element;
allow access, by the wireless device through the command connection, to one or more resources associated with the vehicle.

23. The apparatus of claim 22, wherein authentication of the wireless device occurs via a wired equivalent privacy (WEP) WiFi access point provided by the OBU element.

24. The apparatus of claim 22, wherein authentication of the wireless device occurs via a radio-frequency identification (RFID) tag.

25. The apparatus of claim 22, wherein the resources include a selected one of a group of resources, the group consisting of:
a) a speaker;
b) a display;
c) a microphone; and
d) a global positioning system (GPS) receiver.

26. The apparatus of claim 22, wherein the command connection is used to exchange requests for particular data associated with the resources of the vehicle.

27. The apparatus of claim 22, wherein the port number associated with the second port is provided to the wireless device in response to receiving a request from the wireless device on the first port for a new data channel.

28. The apparatus of claim 22, wherein the processor and memory element cooperate such that the apparatus is configured to:
after providing the port number associated with the second port to the wireless device, wait to establish the command connection until a new connection request is received from the wireless device on the second port.

29. The apparatus of claim 22, wherein the processor and memory element cooperate such that the apparatus is configured to:
receive heartbeat signals via the control connection from the wireless device at predefined intervals, wherein the heartbeat signals are received at least as long as the command connection is open.

30. The apparatus of claim 22, wherein the processor and memory element cooperate such that the apparatus is configured to:
negotiate with the wireless device, via the control connection, one or more new connections to be established on one or more ports other than the first port.

31. The apparatus of claim 22, wherein the processor and memory element cooperate such that the apparatus is configured to:
receive a request from the wireless device via the command connection to change a parameter of one of the resources on the OBU element.

32. The apparatus of claim 22, wherein the association is created when a local access network identifier provided by the OBU element is detected by the wireless device.

* * * * *